(12) United States Patent  
Lundquist et al.

(10) Patent No.: US 8,605,355 B2
(45) Date of Patent: Dec. 10, 2013

(54) OFF AXIS WALK OFF MULTI-PASS AMPLIFIERS

(75) Inventors: Paul B. Lundquist, Vail, AZ (US);
Samvel Sarkisyan, Tucson, AZ (US);
Eric A. Wilson, Tucson, AZ (US);
Raymond M. Copenhaver, Tucson, AZ (US); Hector Martin, Oro Valley, AZ (US); Steven McCahon, Tucson, AZ (US)

(73) Assignee: Applied Energetics, Tucson, AZ (US)

( * ) Notice: Subject to any disclaimer, the term of this patent is extended or adjusted under 35 U.S.C. 154(b) by 484 days.

(21) Appl. No.: 12/954,387

(22) Filed: Nov. 24, 2010

(65) Prior Publication Data

US 2011/0157689 A1 Jun. 30, 2011

Related U.S. Application Data

(60) Provisional application No. 61/263,982, filed on Nov. 24, 2009.

(51) Int. Cl.
*H01S 3/08* (2006.01)

(52) U.S. Cl.
USPC .............................. 359/333; 359/348; 372/97

(58) Field of Classification Search
USPC ..................................... 359/333, 348; 372/97
See application file for complete search history.

(56) References Cited

U.S. PATENT DOCUMENTS

| | | |
|---|---|---|
| 3,423,693 A | 1/1969 | Chernoch et al. |
| 3,423,697 A | 1/1969 | Chernoch et al. |
| 3,466,569 A | 9/1969 | Chernoch et al. |
| 3,504,295 A | 3/1970 | Chernoch et al. |
| 3,525,053 A | 8/1970 | Chernoch et al. |
| 3,631,362 A | 12/1971 | Almasi et al. |
| 3,942,127 A | 3/1976 | Fluhr et al. |
| 4,093,924 A | 6/1978 | Farcy |
| 4,186,353 A | 1/1980 | Boutineau |
| 4,225,826 A | 9/1980 | Lewis et al. |
| 4,233,567 A | 11/1980 | Chernoch |
| 4,243,942 A | 1/1981 | Glass |
| 5,021,742 A | 6/1991 | Jacob |
| 5,172,263 A | 12/1992 | Hale |
| 5,363,391 A | 11/1994 | Matthews et al. |
| 5,546,222 A | 8/1996 | Plaessmann et al. |
| 5,553,088 A | 9/1996 | Brauch et al. |
| 5,615,043 A | 3/1997 | Plaessmann et al. |
| 5,644,424 A | 7/1997 | Backus et al. |
| 5,689,363 A | 11/1997 | Dane et al. |
| 5,726,752 A | 3/1998 | Uno et al. |
| 6,339,605 B1 | 1/2002 | Vetrovec |

(Continued)

*Primary Examiner* — Mark Hellner
(74) *Attorney, Agent, or Firm* — Duft Bornsen & Fettig, LLP; Gregory T. Fettig

(57) ABSTRACT

Presented herein is a multipass optical amplifier including a thin-disk gain medium, a first reflective element optically coupled to the gain medium, a first parabolic reflector in optical communication with the gain medium and the first reflective element, a second parabolic reflector in optical communication with the first parabolic reflector, and a second reflective element in optical communication with the second parabolic reflector. The amplifier also includes a pump source, a signal beam source, and a chamber having first and second regions configured about the multipass optical amplifier with a port that extracts gas from the chamber. The first region includes the first parabolic reflector, the gain medium, and the first reflective element. The second region of the chamber includes the second reflective element and the second parabolic reflector. An input optic propagates the signal beam through the amplifier to impinge the gain medium multiple times for gain.

4 Claims, 48 Drawing Sheets

(56) References Cited

U.S. PATENT DOCUMENTS

| | | |
|---|---|---|
| 6,347,109 B1 | 2/2002 | Beach et al. |
| 6,370,178 B1 | 4/2002 | Papayoanou et al. |
| 6,384,966 B1 | 5/2002 | Dymott |
| 6,392,791 B1 | 5/2002 | Fork et al. |
| 6,438,152 B2 | 8/2002 | Contag |
| 6,577,666 B2 | 6/2003 | Erhard |
| 6,600,763 B2 | 7/2003 | Ludewigt |
| 6,603,793 B2 | 8/2003 | Vetrovec |
| 6,625,193 B2 | 9/2003 | Vetrovec |
| 6,654,163 B1 | 11/2003 | Du et al. |
| 6,674,939 B1 | 1/2004 | Anderson et al. |
| 6,700,698 B1 | 3/2004 | Scott |
| 6,728,273 B2 | 4/2004 | Perry |
| 6,763,050 B2 | 7/2004 | Zapata et al. |
| 6,765,947 B2 | 7/2004 | Kumkar |
| 6,778,580 B2 | 8/2004 | Erhard et al. |
| 6,804,274 B2 | 10/2004 | Huonker et al. |
| 6,810,060 B2 | 10/2004 | Vetrovec |
| 6,834,070 B2 | 12/2004 | Zapata |
| 6,845,111 B2 | 1/2005 | Sumida et al. |
| 6,873,639 B2 | 3/2005 | Zhang |
| 6,888,872 B2 | 5/2005 | Vetrovec |
| 6,891,874 B2 | 5/2005 | Erhard et al. |
| 6,937,629 B2 | 8/2005 | Perry et al. |
| 6,999,839 B2 | 2/2006 | Vetrovec |
| 7,006,283 B2 | 2/2006 | Lefort et al. |
| 7,039,081 B2 | 5/2006 | Stingl et al. |
| 7,085,304 B2 | 8/2006 | Vetrovec |
| 7,200,161 B2 | 4/2007 | Vetrovec |
| 7,242,520 B2 | 7/2007 | Backus et al. |
| 7,256,931 B2 | 8/2007 | Damzen |
| 7,308,014 B2 | 12/2007 | Eisenbarth et al. |
| 7,310,360 B2 | 12/2007 | Vetrovec |
| 7,359,413 B2 | 4/2008 | Tzuk et al. |
| 7,366,211 B2 | 4/2008 | Perry et al. |
| 7,386,019 B2 | 6/2008 | Klimov et al. |
| 7,508,847 B2 | 3/2009 | Honninger et al. |
| 7,535,633 B2 | 5/2009 | Franjic et al. |
| 7,590,156 B1 | 9/2009 | Richardson et al. |
| 7,599,111 B2 | 10/2009 | Marquis |
| 7,630,424 B2 | 12/2009 | Ershov et al. |
| 7,643,529 B2 | 1/2010 | Brown et al. |
| 8,183,536 B2 * | 5/2012 | Schreiber et al. ............. 250/372 |
| 2002/0001321 A1 | 1/2002 | Perry |
| 2002/0039377 A1 | 4/2002 | Zapata et al. |
| 2002/0105997 A1 | 8/2002 | Zhang |
| 2003/0048456 A1 | 3/2003 | Hill |
| 2003/0053508 A1 | 3/2003 | Dane et al. |
| 2003/0147443 A1 | 8/2003 | Backus et al. |
| 2003/0161035 A1 | 8/2003 | Georges et al. |
| 2003/0161365 A1 | 8/2003 | Perry et al. |
| 2003/0161375 A1 | 8/2003 | Filgas |
| 2003/0189973 A1 | 10/2003 | Doblar |
| 2003/0227956 A1 | 12/2003 | Scaggs |
| 2003/0227962 A1 | 12/2003 | Hintz-Madsen |
| 2004/0000942 A1 | 1/2004 | Kapteyn et al. |
| 2004/0028094 A1 | 2/2004 | Betin et al. |
| 2004/0028101 A1 | 2/2004 | Byren et al. |
| 2004/0165639 A1 | 8/2004 | Lang et al. |
| 2004/0233944 A1 | 11/2004 | Dantus et al. |
| 2005/0053105 A1 | 3/2005 | Shan et al. |
| 2005/0094257 A1 | 5/2005 | Sasaki |
| 2005/0175049 A1 | 8/2005 | Stingl et al. |
| 2005/0195474 A1 | 9/2005 | Lefort et al. |
| 2005/0213630 A1 | 9/2005 | Mielke et al. |
| 2005/0238070 A1 | 10/2005 | Imeshev et al. |
| 2005/0271094 A1 | 12/2005 | Miller et al. |
| 2005/0271098 A1 | 12/2005 | Perry et al. |
| 2006/0078030 A1 | 4/2006 | Altmann |
| 2006/0114961 A1 | 6/2006 | Manni |
| 2006/0158644 A1 | 7/2006 | Silver |
| 2006/0209918 A1 | 9/2006 | Wang et al. |
| 2006/0239304 A1 | 10/2006 | Yin et al. |
| 2007/0002921 A1 | 1/2007 | Perry et al. |
| 2007/0013995 A1 | 1/2007 | Kaertner et al. |
| 2007/0013996 A1 | 1/2007 | Verma et al. |
| 2007/0116081 A1 | 5/2007 | Vetrovec et al. |
| 2007/0116084 A1 | 5/2007 | Rund et al. |
| 2008/0144671 A1 | 6/2008 | Ershov et al. |
| 2008/0165337 A1 | 7/2008 | Ershov et al. |
| 2008/0212217 A1 | 9/2008 | Robert |
| 2008/0225384 A1 | 9/2008 | Betin et al. |
| 2008/0225904 A1 | 9/2008 | Brown et al. |
| 2008/0225908 A1 | 9/2008 | Ershov et al. |
| 2008/0253408 A1 | 10/2008 | Ishihara |
| 2008/0267242 A1 | 10/2008 | Ershov et al. |
| 2008/0267247 A1 | 10/2008 | Marincek et al. |
| 2008/0267248 A1 | 10/2008 | Lee et al. |
| 2008/0273238 A1 | 11/2008 | Fermann et al. |
| 2009/0003402 A1 | 1/2009 | Nunen et al. |
| 2009/0034580 A1 | 2/2009 | Lin et al. |
| 2009/0041061 A1 | 2/2009 | Shkunov et al. |
| 2009/0059991 A1 | 3/2009 | Bossert et al. |
| 2009/0067468 A1 | 3/2009 | Brown et al. |
| 2009/0122825 A1 | 5/2009 | Ershov et al. |
| 2009/0122831 A1 | 5/2009 | Chen |
| 2009/0201575 A1 | 8/2009 | Fermann et al. |
| 2009/0245304 A1 | 10/2009 | Peng et al. |
| 2009/0257464 A1 | 10/2009 | Dantus et al. |
| 2009/0279167 A1 | 11/2009 | Bigroux et al. |
| 2009/0279577 A1 | 11/2009 | Mccarthy |
| 2009/0279587 A1 | 11/2009 | Eriksson et al. |
| 2009/0296199 A1 | 12/2009 | Franjic et al. |
| 2010/0053733 A1 | 3/2010 | Falcoz et al. |
| 2010/0085632 A1 | 4/2010 | Henderson |
| 2010/0085994 A1 | 4/2010 | Resan et al. |
| 2012/0022687 A1 * | 1/2012 | Chen et al. .................... 700/245 |

* cited by examiner

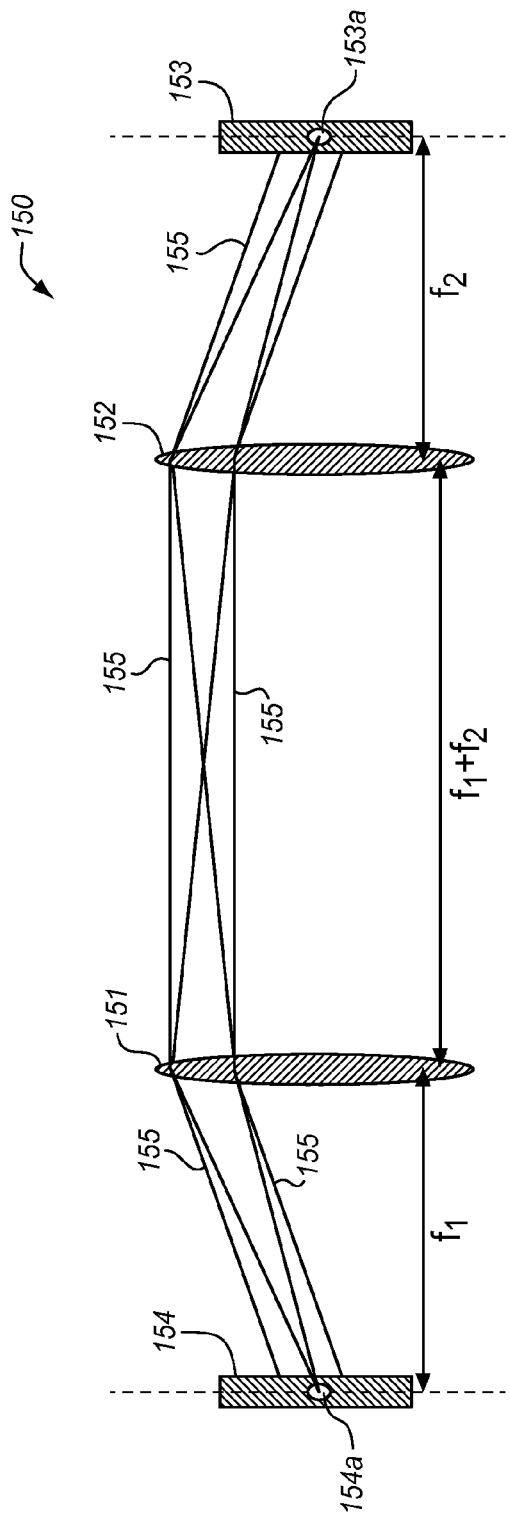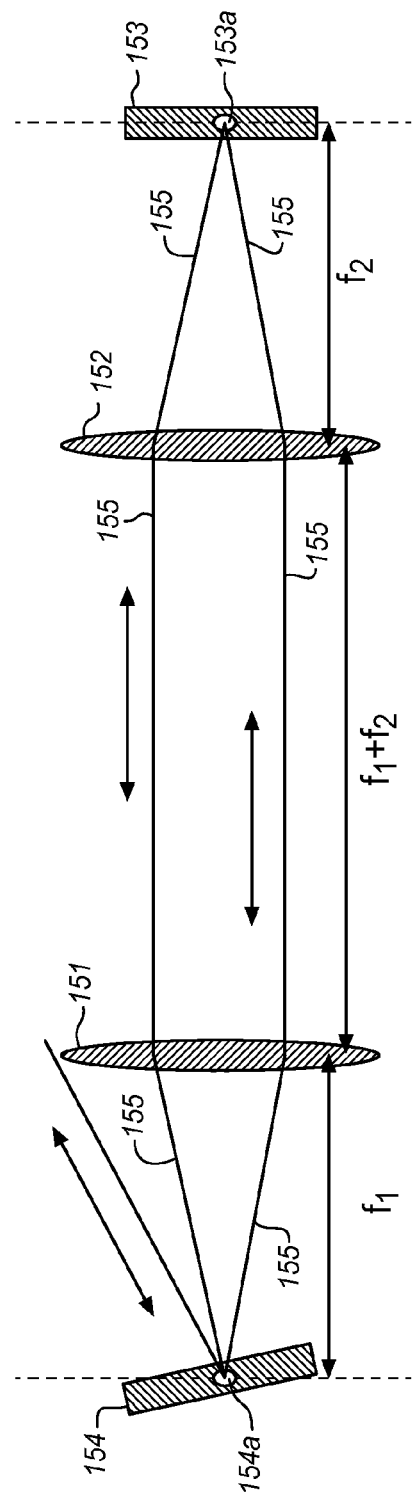
FIG. 1A
FIG. 1B

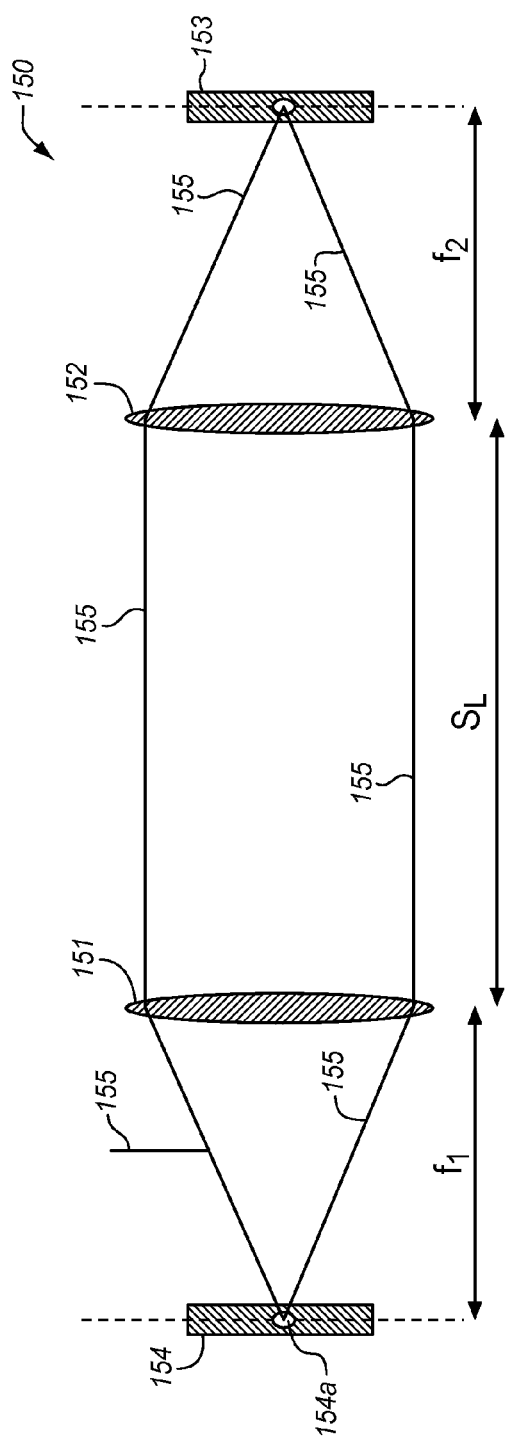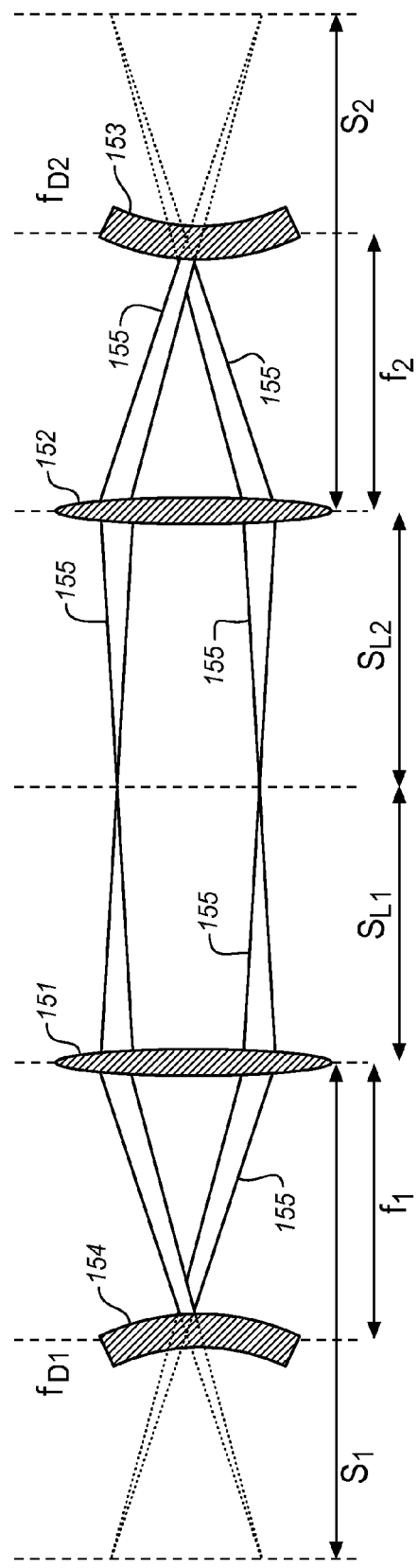
FIG. 3A
FIG. 3B

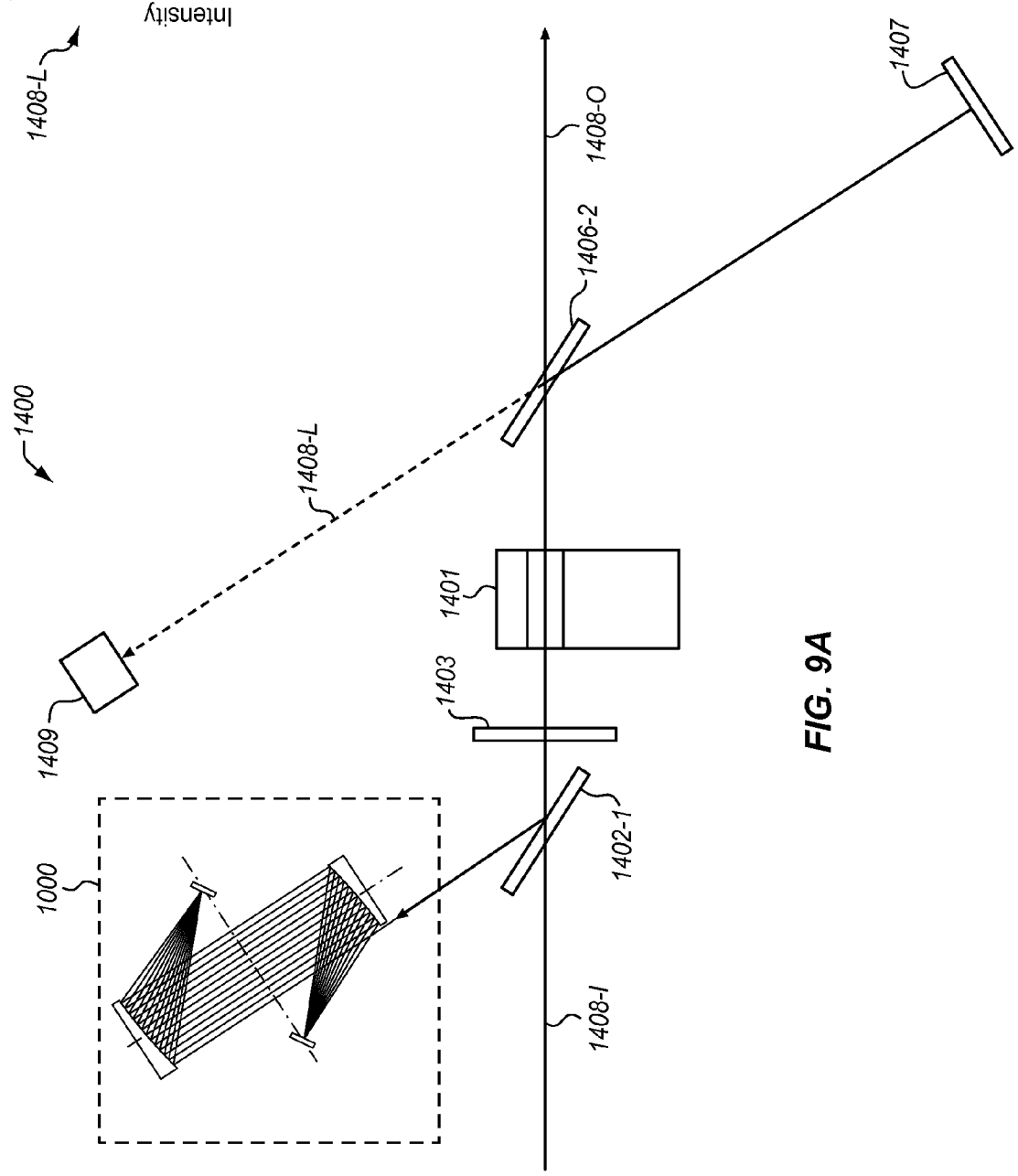

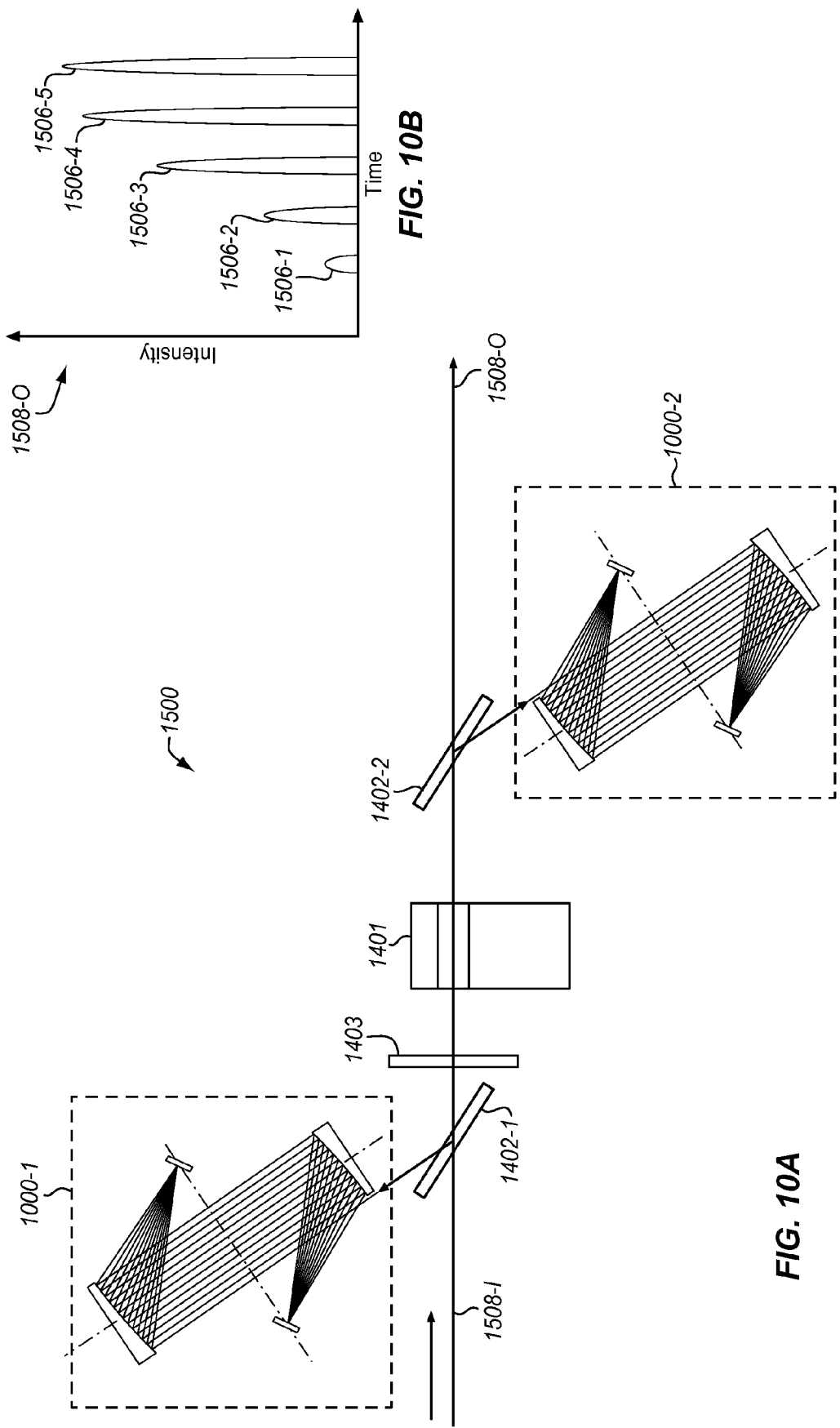

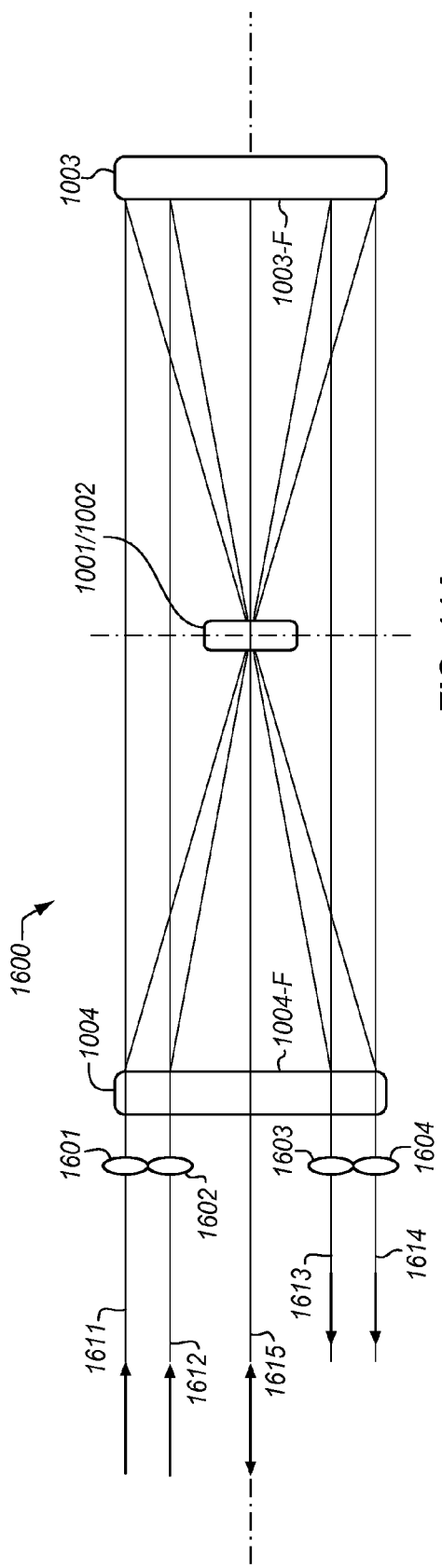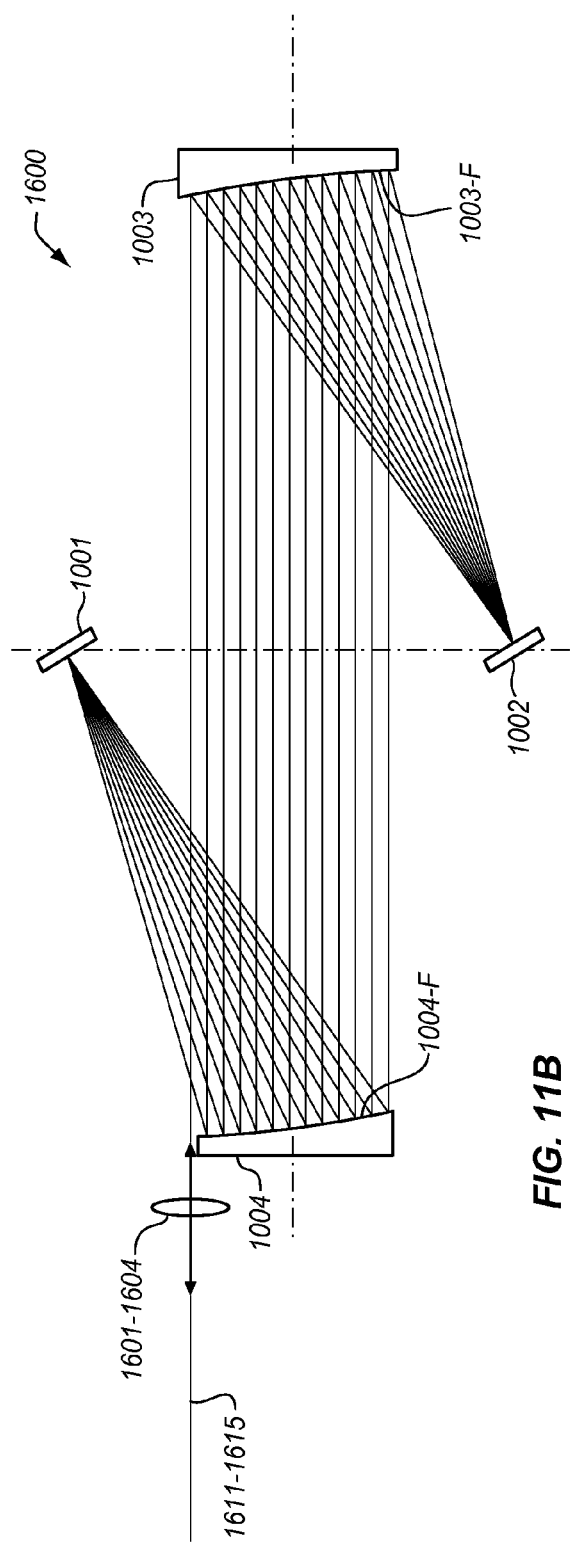

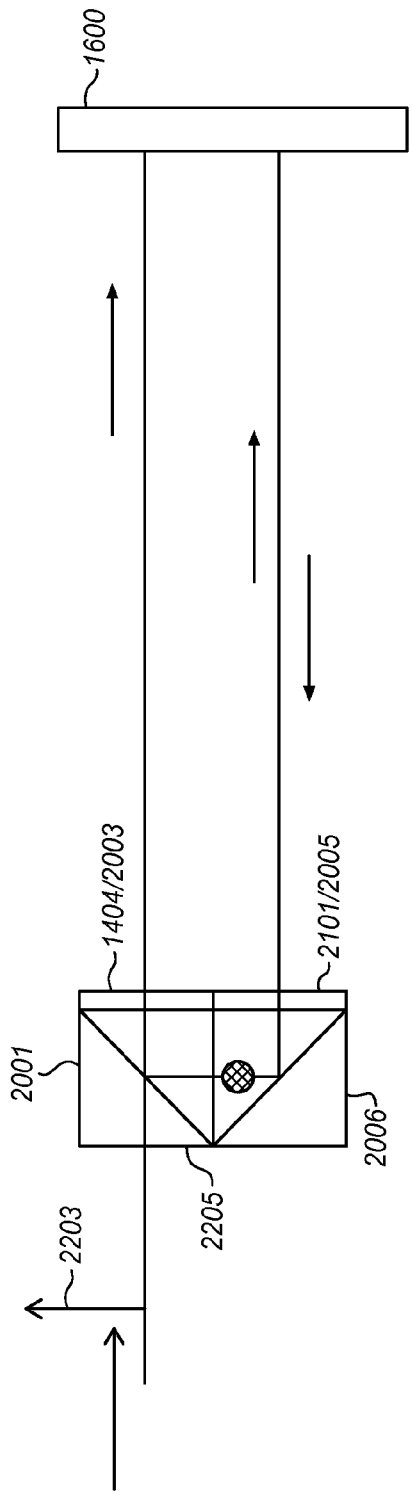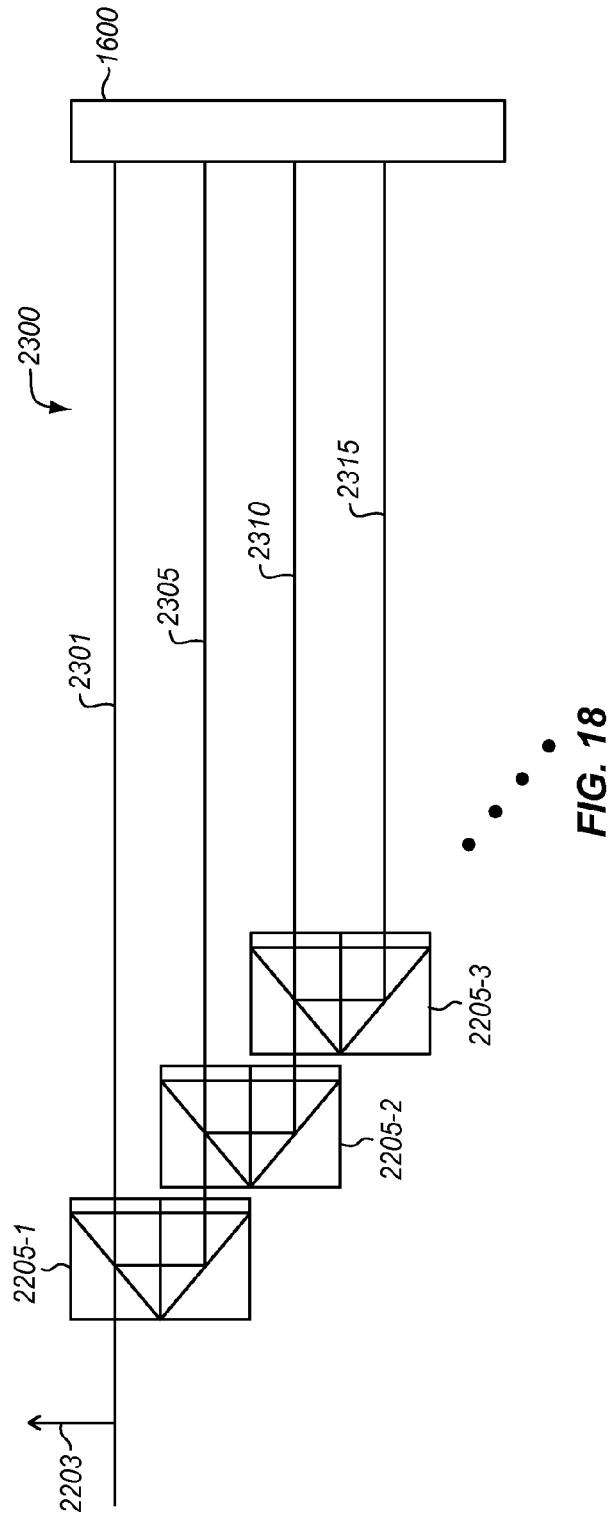

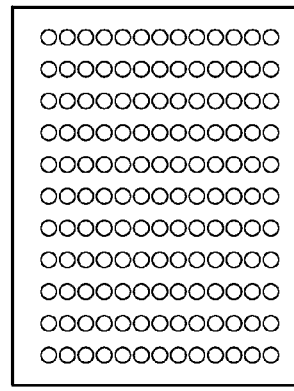
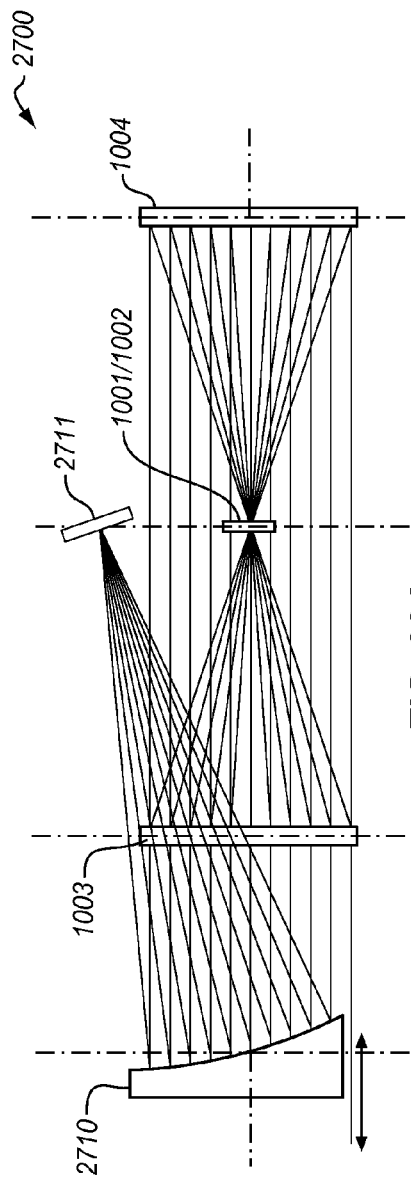
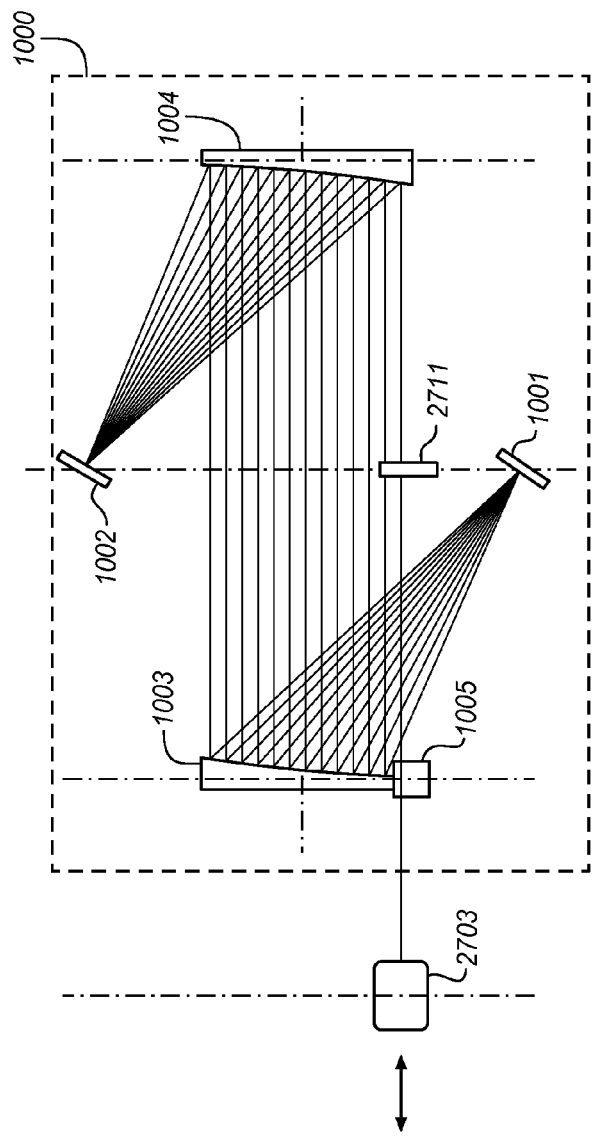

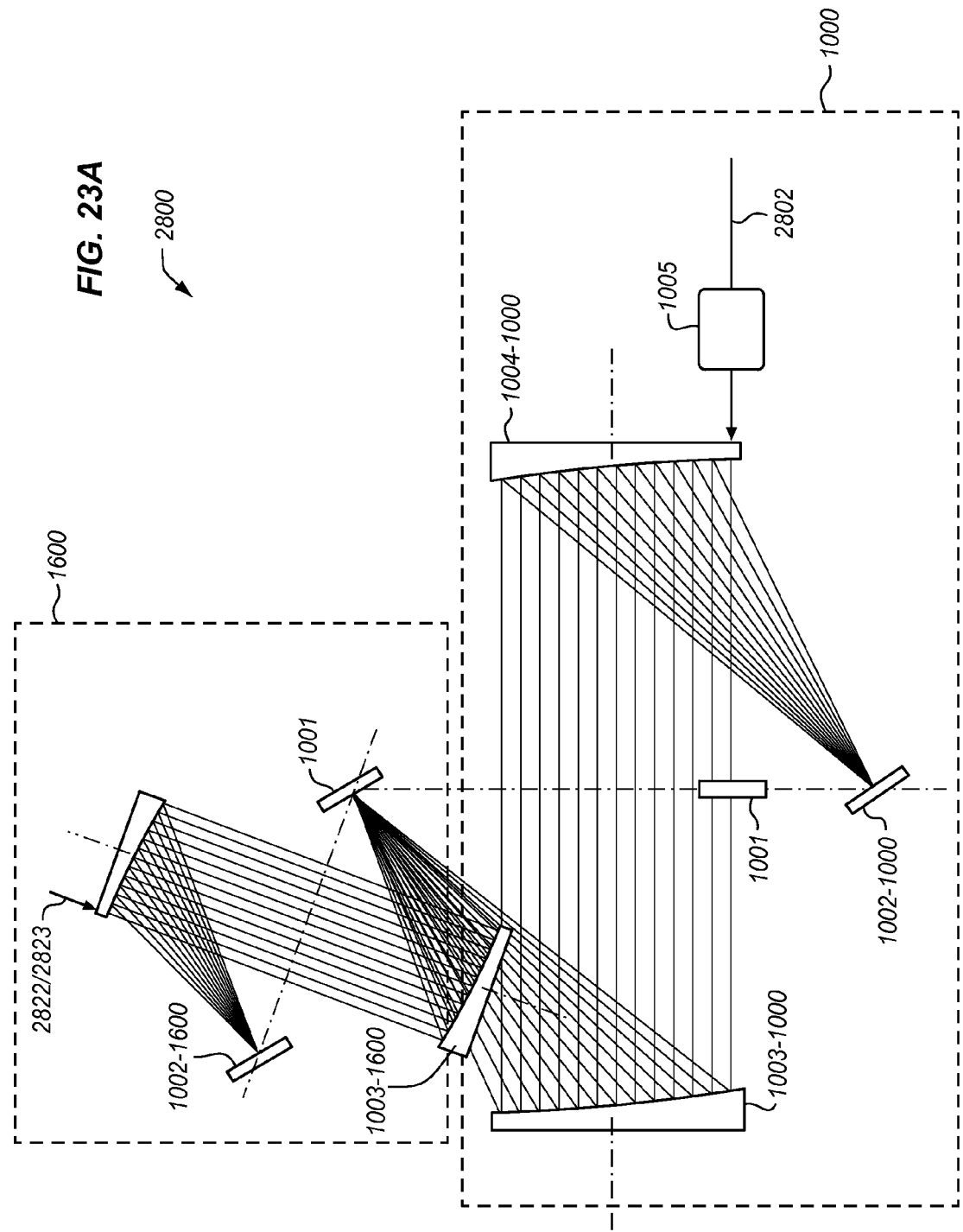

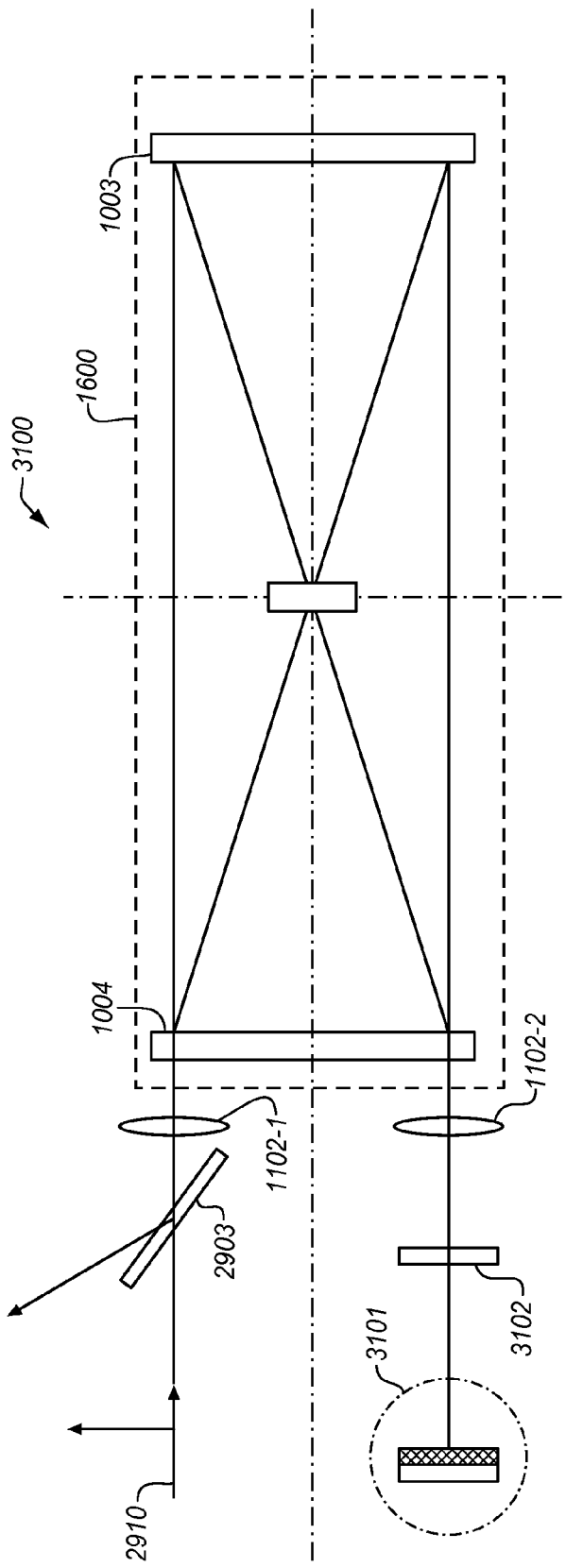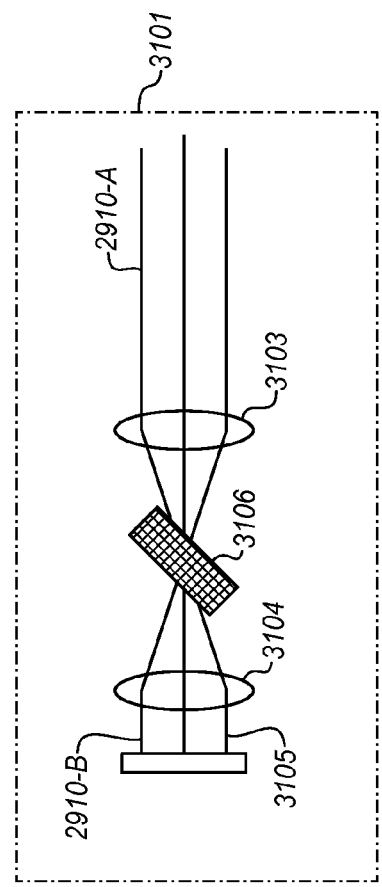
FIG. 26A
FIG. 26B

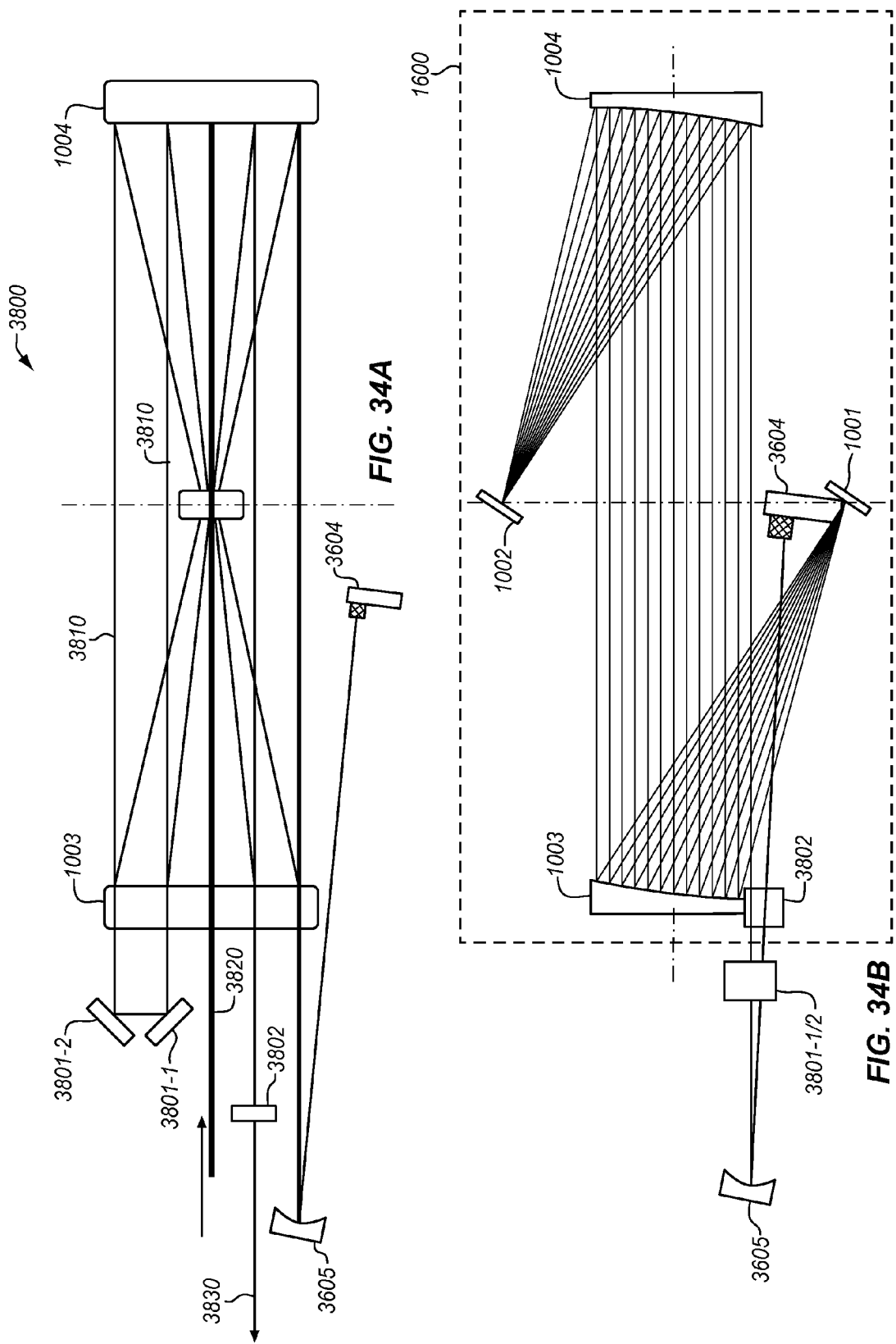

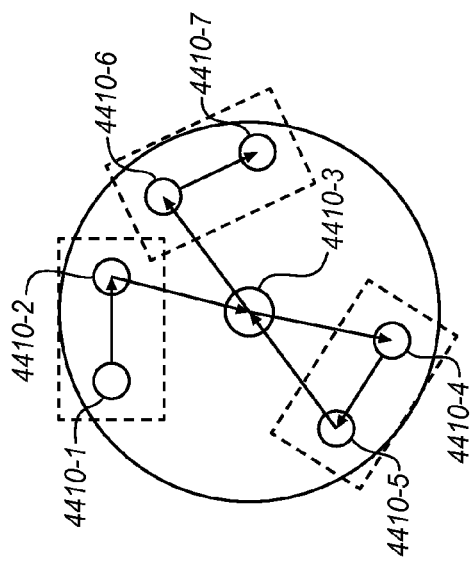
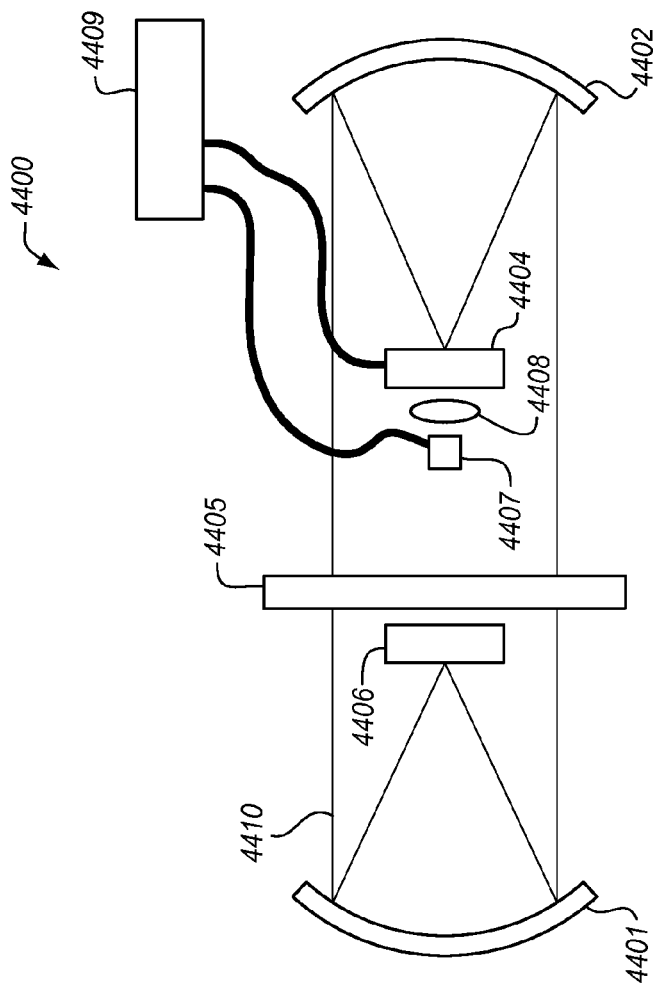
FIG. 36B
FIG. 36A

OFF AXIS WALK OFF MULTI-PASS AMPLIFIERS

CROSS-REFERENCE TO RELATED APPLICATIONS

This patent application claims priority to, and thus the benefit of an earlier filing date from, commonly owned and U.S. Provisional Patent Application No. 61/263,982 (filed Nov. 24, 2009; the "'982 provisional application"), the contents of which are incorporated by reference.

GOVERNMENT LICENSE RIGHTS

This invention was made with government support under contract No. W15QKN-09-9-1001 awarded by U.S. Army. The government has certain rights in the invention.

BACKGROUND

In recent years, there have been significant advances in laser technology including solid state laser technology. This technology is being used in numerous applications including scientific research, manufacturing, medicine, security, communications, and many others. Many laser applications require reliable high power outputs and numerous mechanisms have been developed to achieve such. Indeed, high power laser amplifiers have been developed in a variety of forms to accommodate a wide variety of applications, but each amplifier generally functions to amplify the power of an input pulse or beam to provide an amplified output pulse or beam.

Design of laser amplifiers may be limited by factors related to optical component tolerances in the amplifier to pulses of high-energy laser light and average power loading. For example, in one large class of amplifier designs, known as regenerative amplifiers, multiple passes through a single gain medium or plural gain media are used for efficient extraction of gain. In these regenerative amplifiers, an optical path is defined around which an input pulse makes a number of passes before being coupled out as an amplified pulse.

Regenerative amplifiers are generally used to provide relatively strong amplification of laser pulses. Multiple passes through the gain medium are achieved by placing the gain medium in an optical resonator, together with an optical switch that may be formed by an electro-optic modulator and one or more polarizers. The number of round trips in the resonator is controlled with the optical switch and, when this number is large, a high overall amplification factor (i.e., gain) can be achieved.

While these regenerative amplifiers provide significant gain, they are often difficult to implement due to their complex cavities. Moreover, switching of the laser pulses within the cavity usually decreases the achievable pulse energies or beam due to nonlinear propagation effects within the switch. Additionally, regenerative amplifiers, under some operating conditions, suffer from chaotic or multi-stable operation. In these operating conditions, the residual gain in the gain medium after energy extraction significantly affects the gain that can be imparted on a subsequent signal pulse. Regenerative amplifiers also generally amplify one pulse at a time. Therefore, the repetition rate of the laser system is less than the reciprocal of the time between the injection and ejection of each amplified pulse.

Another concern in high power laser systems regards heat. High average power laser systems typically produce heat and most laser architectures are designed with this in mind because high temperatures within a gain medium can reduce gain and/or cause thermo-mechanical strains that result in stress-induced birefringence. Temperature distributions in a gain medium can also lead to phase distortions which result in poor laser beam quality. At more extreme temperatures, damage to the gain material or optical coatings can occur. High temperatures within a laser system can also lead to mechanical movements that result in optical misalignment.

In order to efficiently extract heat from a solid gain medium, the fraction of cooled surface area per heated volume is generally maximized. Two geometries that have been used for high power laser systems include fibers and thin disks. In the case of fibers, two dimensions are minimized and one dimension is maximized so that a large surface area to volume ratio can be obtained for efficient cooling. Additionally, fiber amplifier geometries support very large gain-length products. Fiber amplifiers, however, are not optimal for high-power short pulses because high intensities may result from transmission of laser pulse energy through a very small cross section of an optical fiber. For high pulse powers and small cross-sections, the peak intensity can be extremely high and lead to deleterious nonlinear propagation effects.

One solution for thermal management of pulsed laser operation includes using disk shaped gain media, in which only one dimension is minimized. This geometry also provides large surface areas for heat extraction per gain volume. The thin disk is typically cooled from one side and is accessed optically from the other. A reflective surface is provided between the cooling system and the gain medium. Alternatively, the disk may be cooled from both sides if a thermally conductive medium is used that can also transmit the laser pump and signal beams of energy. Generally, the signal beam is the desired beam of laser energy that is operated on and/or used in a particular application whereas the pump beam may include any type of energy operable to stimulate the gain medium and amplify the signal beam.

Though the thin disk geometry can be efficiently cooled, the pump absorption-length product and signal gain-length product for typical gain media is small. For this reason, thin disk based lasers generally use a multi-pass optical system for optical pumping, and a multi-pass system for the signal beam. After each pass of the pump beam, a portion of the pump beam is absorbed. However, after multiple passes of the pump beam, most of the pump laser light can be absorbed by the crystal. For example, small gains may be achieved each time the signal traverses through a thin disk. Higher amplitude gains thus require multiple traversals of the signal beam through the thin disk so that a larger effective gain-length product can be achieved. Because greater energy extraction can be achieved by using a larger gain volume, a thin disk may utilize a relatively large pump and signal beam spot size. This allows for higher power without exceeding intensity thresholds for deleterious nonlinear propagation effects.

Although heat can be removed from a thin disk, thermal gradients typically lead to phase distortions due to temperature dependent indices of refraction, thermal expansion, and/or strain effects. For thin disk geometries where a reflective surface is included, thermo-mechanical distortions can lead to especially strong phase distortions and each pass of the signal beam can lead to accumulated phase distortions. These phase distortions can also include birefringent effects, such as strain-induced birefringence.

Accumulated phase distortions in a laser system can also lead to "hot spots" or losses that limit the laser powers that can be achieved. For example, if a thin disk imparts focusing phase distortions to a signal beam, the beam may eventually be focused to such a small spot size that it could damage an optical component with extreme intensities or even ionize the air, losing energy in the process. Accordingly, the laser power would be intentionally "dialed down" to avoid these effects. A signal beam that accumulates a divergence with traversals of the disk can also become too large for an optic, aperture, or an amplified region for a subsequent traversal through the gain medium. Consequently, divergence also results in an energy loss that limits the laser power.

In high power diode pumped laser systems, laser energy from multiple laser diodes may be collected and transmitted to a gain region via fiber. However, such generally requires beam combining mechanisms where multiple diode sources can be independently transmitted to the gain region. This allows for higher pump powers to be used than could be obtained from a single diode source. Additionally, multimode fibers may be used to supply higher average power. In any case, fibers are limited in the amount of power that they can easily transmit. A laser system that provides for simplified beam combining from multiple sources, at the gain medium, would provide a significant benefit.

SUMMARY

The various laser architectures described herein provide increased gain and compensation of optical phase distortions in a thin disk gain medium. In one embodiment, an optical amplifier provides for scalable high energy extraction and gains based on a number of passes of the signal beam through a gain medium. In this regard, new reimaging walk-off multipass amplifier architectures are presented herein that are amenable to simpler methods for clearing gain between laser pulses. Because multiple, spatially separate, optical paths can be passed through the same gain region, gain clearing can be achieved by splitting off a small percentage of an output pulse and sending it back through the amplifier along a slightly different path. By clearing out the residual gain, uniform signal amplitudes can be obtained.

For example, by operating in a bi-stable dynamic regime, every other seed pulse can be used to clear out the gain within the gain medium so that energy extraction pulses can experience gain after a uniform gain build up. The amplified back scattered signal can then be sent to a beam dump. By using a back reflection of a small portion of the output beam to clear out the residual gain, it is possible to achieve stable operation at frequencies that would otherwise provide a chaotic or otherwise unstable operation. In this regard, the back reflected portion may simply be a surface glint that is deflected and then redirected along a beam path through the multi-pass amplifier such that the output is separable from the input.

Focusing may be compensated by reimaging the gain medium onto a second surface. For example, focus compensation may be achieved by choosing the optical spacing in the system for the formation of the image at the second surface. Additionally, reimaging reasonably ensures that the spot size is approximately the same size on the gain medium after each pass even if the thin disk is focusing or defocusing. Since the beam is nearly identical on each pass, birefringence can be compensated by introducing a quarter wave plate between each pass.

The signal beam generally undergoes an intermediate focus between the focusing elements. At high power, the system may be placed in a vacuum or filled with a gas that is difficult to ionize. The pump beam may be reimaged through multiple passes of the disk using the same focusing optics that are used to reimage the signal beam. If the pump beam is provided by fiber, it may be desirable to use a collimating optic so that the fiber surface is imaged onto the disk. In this case, the pump beam may not undergo an intermediate focus and the collimating optical focal length may be chosen to provide the desired magnification in the pump beam image on the disk. Alternatively, free space propagation may be used from the pump laser source and the pump energy may be injected into the laser system in much the same way as the signal beam.

The pump and signal beam may be co-propagated along the same beam path or they may be propagated through the same optics using separate beam paths. Alternatively, a separate multi-pass optical system may used for the pump. In any case, the pump optical system may reimage the pump beam at the disk or onto a second reflective surface.

Signal beam injection optics may be used for the signal beam, where they may provide an intermediate signal beam focus between the imaging optics. By placing the signal beam waist between the imaging optics, a larger beam footprint can be achieved on the gain medium. Additionally, pump beam injection optics may be used to condition the pump beam prior to injection into the multi-pass laser system. If the pump source is provided through a fiber, the pump beam injection optics may, in conjunction with multi-pass optics, form an image of the pump fiber onto the gain medium with a desired magnification. If the pump beam is a spatially coherent source, the pump injection optics may be used to form an intermediate focus or beam waist between the imaging optics.

Multiple beam paths may be utilized, sharing at least one gain medium. Some of the multiple beam paths may be used to sequentially provide additional passes for the signal beam. Some of the multiple beam paths may be utilized for a separate pump beam propagation path. An optical switch may be utilized to select a subset of the multiple beam paths for the gain extraction, so that switching between the multiple beam paths can occur at lower power. Some of the multiple beam paths may be used for gain clearing to stabilize output pulse operations. This may be performed by clipping some fraction of the output beam and sending it back through the amplifier system to extract residual gain. This may have the effect of providing a consistent gain buildup from pulse to pulse and avoid chaotic or multi-stable operation.

Baffles or masks may be used to suppress Amplified Spontaneous Emission (ASE) within the system. For example, the angle subtended by a refocusing element (e.g. parabolic or off axis parabolic) relative to the gain region may be substantial, in order to operate over the multiple separable beam paths. Consequently a significant fraction of the emitted fluorescence may be redirected to additional passes through the gain medium. However, the signal beam (and possibly the pump beam) typically uses only a fraction of the focusing element. In order to suppress ASE, masks or baffles may be used to eliminate reimaging paths that are not used by the amplifier. Ideally, the mask or baffles would be placed between the focusing elements (e.g. parabolic or off axis parabolic) to eliminate unused optical paths.

Reimaging optics may also be used to reimage the signal and/or the pump spot on more than one conjugate image plane so as to share the same optical axis or have a parallel optical axis. If a parallel optical axis is used, the reimaging optics may be cut to optimize the shape for the multiple beam passes of the design. If reimaging is performed with parabolic surfaces, a pair of off axis parabolas may be used with a parallel optical axis.

The spacing between the reimaging optics may be adjusted to compensate for focusing or defocusing within one or more gain mediums. For example, reflectors (e.g., amplifier disk, mirror, adaptive optics, etc.) may be fixed relative to their respective imaging optics and the distance from one reflector/imaging optic set and the second set may be adjusted. This compensation may be performed actively or even automatically (e.g., via feedback control) so that the system remains compensated (e.g., in the event that the pump power increases, the system heats up, and/or as other system parameters are adjusted). An image of the spot size on one of the reflectors can be used to provide focus control compensation. The number of passes within the amplifier may be controlled by the tilt of one or more of the optical elements (e.g. one of the reflectors). The number of passes and output alignment can also be actively controlled via the tilt of the optical elements.

In one embodiment, an optical amplifier includes first and second parabolic reflectors. Each of the first and second parabolic reflectors has an optical axis that is substantially parallel to the other. The optical amplifier also includes a first reflective element in optical communication with the first parabolic reflector and a gain module in optical communication with the second parabolic reflector. The gain module has a gain medium and a second reflective element optically coupled to the gain medium. The second parabolic reflector is operable to reflect optical energy to the gain module from different locations on the second parabolic reflector to impart gain on the optical energy. The second parabolic reflector is further operable to reflect the optical energy to the first parabolic reflector from different locations on the second parabolic reflector. Since the optical axis of the first parabolic reflector is substantially parallel to the optical axis of the second parabolic reflector, a beam of the optical energy may impinge the gain medium is substantially the same location with each pass (e.g., within the same cross-section on the gain medium).

The first and second parabolic reflectors may be mounted on movable mounts that allow the reflectors to be moved further apart or closer to one another. This type of adjustment may allow for various corrections (e.g., phase distortion). In one embodiment, the optical amplifier also includes a detector operable to detect the phase deformation in the beam and a controller operable to process the detected phase deformation to change the position of at least one of the first and the second parabolic reflectors.

Generally, the gain medium is a thin disk gain medium. For example, a relatively thin dopant material may be configured with the second reflective element so as to provide gain to the optical energy each time it reflects off the second reflective element. The thin disk gain medium may be configured from a variety of dopant materials, including ytterbium, erbium, thulium, holmium, chromium, and even various combinations thereof. In one embodiment, a gain medium is alternatively or additionally configured with the first reflective element with the same or different thin disk gain material. For example, the first reflective element may be configured with a thin disk gain medium having a different dopant material so as to provide different gain effects, such as pulse broadening. In any case, the thin disk gain mediums may be configured with host materials selected from a group consisting of: KYW; KGW; Lu2O3; and YAG.

The optical amplifier may be configured with a controller that is operable to tilt the gain module and/or the first reflective element to control the gain of the optical energy. For example, the controller may generate a signal that is used to tilt the gain module and/or the first reflective element such that the number of reflections off the parabolic reflectors changes and correspondingly changes a number of reflections off the gain medium, thereby controlling the gain of the optical energy through the tilt of the reflective elements. In any case, a footprint of the optical energy on the gain medium may be substantially similar after each traversal of the optical energy through the optical amplifier.

In one embodiment, a pump energy source is operable to stimulate the gain medium with pump energy and amplify the optical energy. The first parabolic reflector may have an aperture operable to eject the optical energy from the optical amplifier. In this regard, the optical amplifier may also include reflector module (e.g., highly reflective mirrors, partially reflective mirrors, lenses, etc.) operable to redirect the optical energy ejected from the aperture into the optical amplifier to increase the gain of the optical energy. Alternatively or additionally, the second parabolic reflector has an aperture operable to eject the optical energy from the optical amplifier. In this regard, the optical inputs are may also include a reflector module operable to redirect the optical energy ejected from the aperture into the optical amplifier to increase the gain of the optical energy.

In one embodiment, the first reflective element is a deformable mirror. For example, the optical amplifier may also include a controller and at least one actuator. The controller may be operable to generate a control signal that directs the actuator to deform the deformable mirror to direct propagation of the optical energy along the second parabolic reflector and/or reduce the phase distortion on the optical energy.

The first reflective element and the gain module may be disposed external to a region defined between the first and second parabolic reflectors. The first reflective element may be operable to provide phase correction to the optical energy (e.g., via positioning and/or focusing effects). The first reflective element may be operable to provide a conjugate image plane to the second reflective element. The first and second parabolic reflectors may have different sizes, the smaller of the first and second parabolic reflectors being operable to input the optical energy to the optical amplifier to initially reflect off the larger parabolic reflector.

The first and second parabolic reflectors may be operable to provide multiple spatially distinct beam paths for reimaging on the gain medium. For example, the multiple beam paths may be sequentially connected for multiple loops through the optical amplifier. Alternatively or additionally, multiple beams of optical energy may be propagated into the optical amplifier along different elevations. For example, one of these beam paths may be utilized to clear gain from the gain medium.

The optical amplifier may also include one or more intermediate focusing elements to increase a beam footprint of the optical energy on the gain medium and increase the gain of the optical energy. In one embodiment, the first and second parabolic reflectors maintain an intermediate focus for the optical amplifier.

In one embodiment, the optical energy is a first signal beam of optical energy and the second parabolic reflector is operable to additionally reflect a second signal beam of optical energy to the gain module from different locations reflector on the second parabolic reflector. In such a case, the reflection locations on the second parabolic of the first signal beam are different from the reflection locations on the second parabolic of the second signal beam. In this regard, the second signal beam may be operable to clear gain from the thin disk gain medium and lower a population of an upper energy state in the gain medium. Alternatively, the second signal beam may be operable to clear gain from the thin disk gain medium and lower a population of an upper energy state in the gain medium. In another alternative, the optical energy is a signal beam of optical energy and the second parabolic reflector is operable to additionally reflect a beam of pump energy to the gain module from different locations on the second parabolic reflector to stimulate the thin disk gain medium. In such a case, the reflection locations on the second parabolic of the signal beam are different from the reflection locations on the second parabolic of the pump beam.

In another embodiment, the optical amplifier includes third and fourth parabolic reflectors and a third reflective element in optical communication with the third parabolic reflector. The gain module is in optical communication with the fourth parabolic reflector. The fourth parabolic reflector is operable to reflect pump energy to the gain module from different locations on the fourth parabolic reflector to stimulate the gain medium. The fourth parabolic reflector is further operable to reflect the pump energy to the third parabolic reflector from different locations on the fourth parabolic reflector. The third reflective element is positioned between the third and fourth parabolic reflectors.

The optical amplifier may also include a plurality of baffles between the first and second parabolic reflectors operable to block unintentional fluorescence within the optical amplifier. The optical amplifier may also include a saturable absorber operable to reduce amplified spontaneous emission within the optical amplifier. For example, the saturable absorber may be configured with the first reflective element, the second reflective element, the first parabolic reflector, the second parabolic reflector, or a combination thereof.

The optical amplifier may also include a switch and a background suppression module operable to remove amplified spontaneous emission from the optical energy. The switch is operable to synchronize propagation of the optical energy into the optical amplifier and leave the amplified spontaneous emission within the background suppression module. The background suppression module may include a saturable absorber operable to reduce the amplified spontaneous emission.

The optical amplifier may also include a reflective configuration external to the first and second parabolic reflectors. The reflective configuration is operable to provide an optical cavity that oscillates the optical energy through the optical amplifier. For example, the reflective configuration may include a saturable absorber mirror operable to provide a mode locked cavity. Alternatively or additionally, the optical amplifier may include means for injecting the optical energy into the optical cavity to provide a regenerative amplifier.

In one embodiment, the first and second parabolic reflectors, the gain module, and the first reflective element provide a first optical configuration and the optical amplifier includes a second optical configuration. The second optical configuration includes third and fourth parabolic reflectors, a third reflective element in optical communication with the third parabolic reflector, and another gain module in optical communication with the fourth parabolic reflector. The other gain module has a gain medium and a fourth reflective element optically coupled to the gain medium of the other gain module. The fourth parabolic reflector is operable to reflect the optical energy to the gain module from different locations on the fourth parabolic reflector to impart gain on the optical energy. The fourth parabolic reflector is further operable to reflect the optical energy to the third parabolic reflector from different locations on the fourth parabolic reflector. The second optical configuration is operable to provide sequential amplification of the optical energy from the first optical configuration. The first and second optical configurations may be separated to by two focal lengths (e.g., so as to maintain conjugate image planes).

The optical amplifier may also include a first optical configuration operable to input the optical energy into the optical amplifier and a second optical configuration operable to eject the optical energy from the optical amplifier after amplification. In this regard, the first optical configuration includes a dynamic optic operable to change a wavefront of the optical energy impinging the gain medium and the second optical configuration includes a detector operable to provide feedback to change a focusing aspect of the dynamic optic and change the wavefront of the optical energy.

The optical and both are may also include a redirection module operable to redirect the optical energy into the optical amplifier for additional amplification. The redirection module includes a pair of reflective elements operable to separate inputs to the optical amplifier by two focal lengths. The redirection module may also include a plurality of lenses operable to, in conjunction with the pair of reflective elements, provide conjugate image planes throughout the optical amplifier.

In another embodiment, an optical system includes first and second parabolic reflectors. Each of the first and second parabolic reflectors has an optical axis that is substantially parallel to the other. The optical system also includes a first reflective element in optical communication with the first parabolic reflector and a second reflective element in optical communication with the second parabolic reflector. The first parabolic reflector is operable to reflect optical energy to the first reflective element from different locations on the first parabolic reflector. The first parabolic reflector is further operable to reflect the optical energy to the second parabolic reflector from different locations on the first parabolic reflector. The second parabolic reflector is operable to reflect the optical energy to the second reflective element from different locations on the second parabolic reflector. The second parabolic reflector is further operable to reflect the optical energy to the first parabolic reflector from different locations on the second parabolic reflector. The first and second parabolic reflectors have different sizes. The smaller of the first and second parabolic reflectors is operable to input the optical energy to the optical amplifier to initially reflect off the larger parabolic reflector. The first reflective element, the second reflective element, or a combination thereof may be configured with a thin disk gain medium that is operable to impart gain on the optical energy.

In another embodiment, an optical amplifier is operable to impart gain on optical energy and includes first, second, and third parabolic reflectors. The first parabolic reflector has a larger reflective surface than the second and third parabolic reflectors. The second and third parabolic reflectors are in optical communication with the first parabolic reflector. The optical amplifier also includes a gain module in optical communication with the first parabolic reflector. The gain module has a first reflective element and a gain medium optically coupled to the first reflective element to impart the gain on the optical energy. The optical ample fire also includes a second reflective element in optical communication with the second parabolic reflector. The optical and fire also includes a third reflective element in optical communication with the third parabolic reflector. The third parabolic reflector may have an aperture operable to eject the optical energy from the optical amplifier. The optical amplifier may also include a reflector module operable to redirect the optical energy ejected from the aperture into the optical amplifier to increase the gain of the optical energy. The second parabolic reflector may have an aperture operable to eject the optical energy from the optical amplifier. The optical ample fire may also include a reflector module operable to redirect the optical energy ejected from the aperture into the optical amplifier to increase the gain of the optical energy: Each of the first, second, and third parabolic reflectors may include an optical axis. The optical axes of the second and third parabolic reflectors intersect the optical axis of the first parabolic reflector at angles of substantially the same magnitude. More specifically, the second and third parabolic reflectors may be disposed in such way that the angles of the optical axes of these reflectors with respect to the optical axis of the first parabolic reflector have essentially the same magnitude. Again, this may assist in ensuring that the optical energy impinges again medium at substantially the same location/beam cross-section cross-section.

In another embodiment, a method includes propagating optical energy into a multipass amplifier. While in the multipass amplifier, the method includes directing the optical energy to a thin disk gain medium multiple times via first and second parabolic reflectors to increase optical gain in the optical energy. Each of the first and second parabolic reflectors has an optical axis that is substantially parallel to the other. The method also includes ejecting the optical energy from the multipass amplifier.

In another embodiment, an optical amplifier includes a thin disk gain medium operable to impart gain on optical energy and first and second parabolic reflectors operable to reflect the optical energy to the thin disk gain medium multiple times. Each of the first and second parabolic reflectors has an optical axis that is substantially parallel to the other.

It should be noted that each of the above concepts may be combined in various ways to provide multipass amplification. With each of these concepts in mind, various embodiments of Walk Off Multi-Pass Amplifiers (WOMPAs) are now presented in the following drawings and their descriptions. In some embodiments, Off Axis Parabola (OAP) WOMPAs are presented while in other embodiments Axial Reimaging (ARI) WOMPAs are presented. The details of such are provided to show exemplary WOMPA embodiments and are not intended to limit the invention to any particular architecture.

BRIEF DESCRIPTION OF THE DRAWINGS

Some embodiments of the present invention are now described by way of example and with reference to the accompanying drawings. The same reference number represents the same element or the same type of element on all drawings.

FIGS. 1-4 illustrate various exemplary focal considerations for a multipass laser architecture.

FIGS. 6-10 illustrate various exemplary optical configurations employing the WOMPA laser architecture.

FIGS. 11 and 12 illustrate other exemplary WOMPA laser architectures.

FIGS. 15-37 illustrate various exemplary optical configurations employing a WOMPA laser architecture.

DETAILED DESCRIPTION OF THE DRAWINGS

Figure 2:
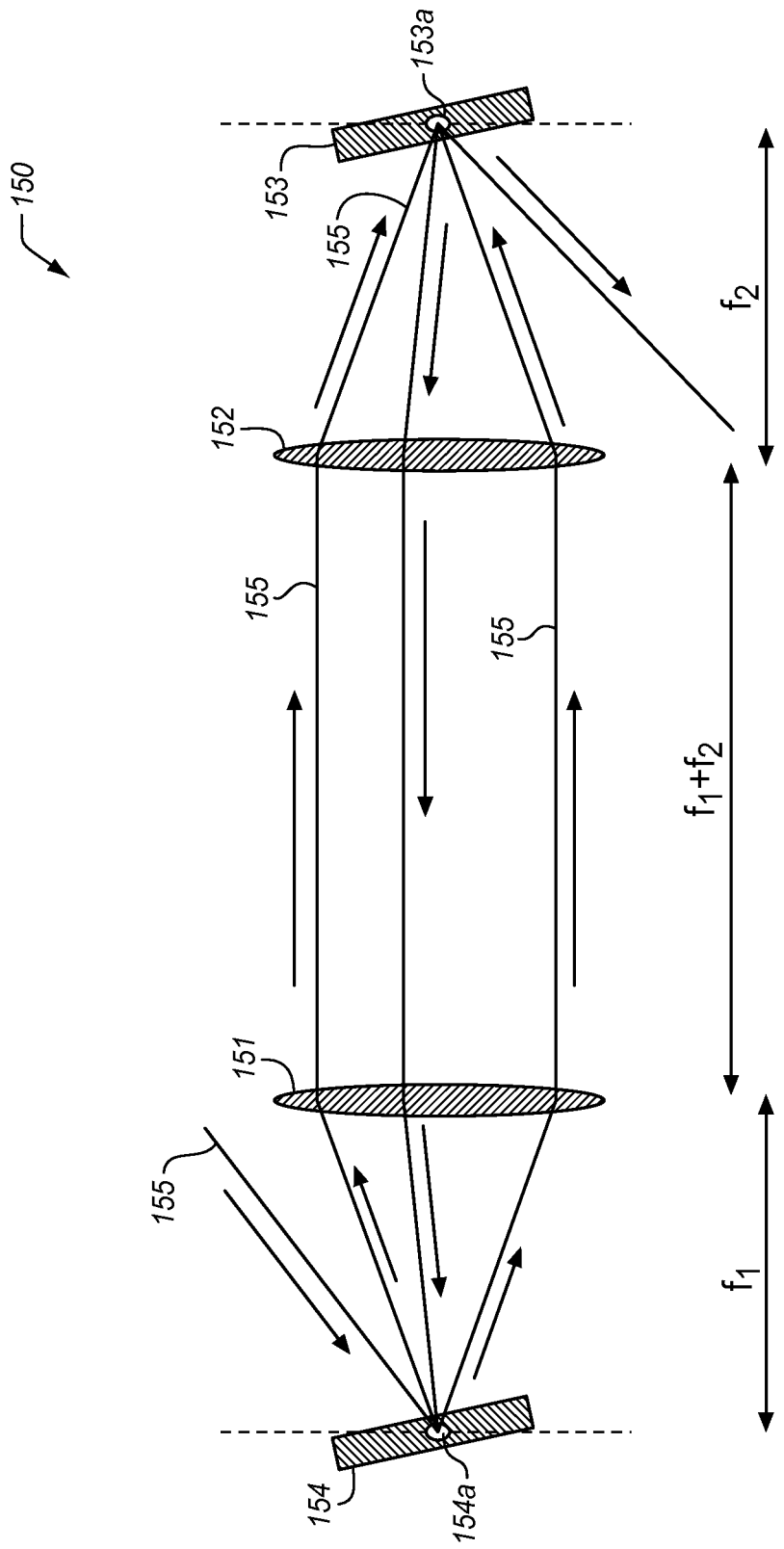

The figures and the following description illustrate specific exemplary embodiments of the invention. Various arrangements that, although not explicitly described or shown herein, may be devised to embody the principles of the invention and are, therefore, included within the scope of the invention. Furthermore, any examples described herein are intended to aid in understanding the principles of the invention and are to be construed as being without limitation to such specifically recited examples and conditions. As a result, the invention is not to be limited to the specific embodiments or examples described below.

The embodiments shown and described herein are categorized to assist the reader in understanding the various aspects of the invention. The categories are as follows: 1. Design Choice Considerations; 2. Multi-Pass Amplifier Configurations; 3. Gain Control of a Multi-Pass Amplifier; 4. Components Operable with a Multi-Pass Amplifier; and 5. Exemplary. Systems Employing Multi-Pass Amplifiers.

1. Design Choice Considerations

To provide a modular, compact, and efficient high average power/high energy amplifier module with little optical distortion and relatively good beam quality, an appropriate pump absorption and temperature distribution should be maintained. In this regard, low net thermal loading may be achieved by incorporating near-resonant wavelength pumps that are available in certain gain media. Additionally, a large system gain may require a long effective propagation distance through the material of the gain medium. Such may be accomplished via the laser architectures presented herein as they provide a relatively large number of amplification passes through the gain medium.

Thermal management is fundamental to scaling any solid-state laser architecture to high average power. Temperatures need to be maintained at low enough levels to provide sufficient gain. Temperature gradients also need to be minimized to avoid beam deformation effects. Within the laser gain medium, non-uniform thermal distributions with gradients transverse to the laser beam propagation direction modify the index of refraction and lead to optical phase distortions of the laser beam. Elevated temperatures also lead to a reduction in gain due to increased occupancy of lower laser energy levels, especially for a quasi-three level system, such as a Yb:YAG gain medium.

In general, cooling of solid state gain media can be performed in two fundamentally different ways. Cooling may be performed on the surfaces of the gain medium where heat is conducted through the material to the surface where the heat can be extracted through any number of approaches. A second approach is to cool a volume through optical cooling. This type of volumetric cooling utilizes optical energy to extract heat within the gain medium. Volumetric cooling can occur through certain optical processes where fluorescence extracts more power than is deposited into the gain medium. Though optical cooling is generally difficult to achieve, a detailed analysis of fluorescence in a low quantum defect system can provide insights on pumping strategies to minimize a thermal load. For example, antistokes cooling may be performed while pumping the gain medium as heating may occur during amplification of ultrashort pulses. This can be achieved if the pump wavelength is longer than the average fluorescence wavelength. Though, most materials do not prove a sufficiently large absorption cross-section above the average fluorescence wavelength to make this very practical.

In conventional laser systems, cooling is performed through the surface of the gain material. In order to efficiently extract heat from the surface of a solid gain medium, the fraction of cooled surface area per heated volume is maximized. Two geometries that maximize this ratio for high power laser systems are fibers and thin disks. In the case of fibers, two dimensions are minimized and one dimension is maximized so that a large surface area to volume ratio can be obtained for efficient cooling. Additionally, fiber amplifier geometries support very large gain-length products and tend to have negligible thermal gradient effects. Fiber amplifiers, however, are not optimal for high-peak-power short pulses because extreme intensities are produced through very small cross sections of optical fibers. Nonlinear propagation effects generally occur at high intensities and limit the peak power that can be propagated through a fiber amplifier. Additional limitations in fiber amplifiers are related to amplification of spontaneous emission if a pulse repetition rate is too low.

To decrease the peak intensity of an optical pulse, one can imagine the gain volume of fiber being distorted into the shape of a rod. In this case, the same peak power can be propagated through a much larger spatial cross-section at much lower intensities to avoid the onset of nonlinear propagation effects. However, the fraction of surface area to gain volume is lower and the heat generated within a rod gain medium has a further distance to travel prior to exiting through the surface. For this reason, rod geometries tend to have much greater thermally-induced phase distortion issues than fiber geometries.

Alternatively, a reduced thermal load in a low quantum defect system, in combination with surface cooling, may provide certain advantages as one may imagine the rod geometry being shortened until a disk geometry is obtained. This disk geometry has a high surface to volume ratio and the efficiency of surface cooling is much better than a rod. In this case, multiple signal passes are used to achieve a reasonable amplification. Similarly, the pump beam may be repeatedly passed through the disk to achieve efficient absorption. Cooling from a back face of the disk is generally more efficient than cooling around the perimeter of a rod as thermal gradients are generally along the direction of optical propagation. Such may reduce the effects of thermally-induced phase deformations. High peak-power pulses can also be amplified using thin disks because power can be distributed over a larger cross sectional area, maintaining peak intensities and fluence levels well below thresholds for damage and/or deleterious nonlinear propagation effects. Accordingly, thin disks are generally advantageous for high average-power and high peak-power ultrashort laser pulse systems.

Many of the technical challenges with thin disks are related to long optical paths and thermally-induced phase distortions. Although heat can be efficiently removed from a thin disk, thermal gradients, temperature dependent indices of refraction, thermal expansion, and/or strain effects typically lead to phase distortions. For thin disk geometries where a reflective surface is included, thermo-mechanical distortions can lead to especially strong phase distortions. These distortions can also include depolarization effects, such as strain-induced birefringence. Therefore, each pass of the signal beam can lead to large accumulated phase distortions. Because of the optical path length (OPL) between each pass of the signal beam through a thin disk, phase distortions from each pass can lead to focusing or defocusing of the beam on subsequent passes. Without compensation, such may lead to optical damage when a signal beam becomes too small. Moreover, losses may occur if the signal beam "overfills" a pump spot.

Other performance factors may also influence laser design configuration with a multi-pass amplifier. For example, in FIGS. 1A and 1B, a multi-pass laser system 150 is illustrated in an unfolded form with reflectors 153 and 154 on opposite ends of the multi-pass laser amplifier optics to perform reimaging. One or both of the reflectors 153 and 154 may be configured with a gain medium so as to impart gain on optical energy 155 entering the multi-pass laser amplifier optics 150.

In order to configure the multi-pass laser amplifier optics 150 with conjugate image planes on the reflectors 153 and 154, the reflectors 153 and 154 are at the focal planes for their corresponding focusing elements (i.e., with focus f1 and f2). However, even if the two reflectors 153 and 154 are at conjugate image planes, the beam of optical energy 155 that is transmitted from one reflector to the other is approximately collimated at the reflectors 153 in 154 so that the beam of optical energy 155 does not substantially reduce or expand after each round trip. This leads to an additional requirement that focusing elements 151 and 152 be separated by approximately the sum of their two focal lengths. In order to allow the beam to enter and exit the multi-pass laser amplifier optics 150, a slight tilt can be introduced into one of the reflectors (e.g., reflector 154). FIG. 1A shows a beam emanating from one reflective surface 154, coming to an intermediate focus between focusing elements 151 and 152, and being redirected to a second reflective surface 153. A ray trace overlays the beam to show that a first point 154a on reflective surface element 154 is imaged onto a second point 153a on reflective surface element 153. This optical configuration reimages one reflective surface to the next and maintains approximately the same beam size on each surface.

In FIG. 1B, the beam of optical energy 155 enters the amplifier 150 and is incident upon the tilted reflector 154. After multiple passes, the beam is at normal incidence on the tilted reflector 154 and passes back through the same path in the opposite direction. If the beam of optical energy 155 exits along the same path as the entrance path, it can be separated using a ¼ wavelength plate. Alternatively, if the beam of optical energy 155 approximately reverses paths, it may be spatially separated from the incident beam at the exit. FIG. 1B shows the central ray for the beam of energy 155, without showing the focusing aspect that was previously shown in FIG. 1A.

Extending this concept, more than one of the reflectors 153 and 154 may be tilted or adjusted for a walk-off beam path as illustrated in FIG. 2. The multi-pass laser amplifier optics 150 may be configured to enter and exit the beam of the optical energy 155 at either end of the multi-pass laser amplifier optics 150. For example, the beam of optical energy 155 may enter the multi-pass laser amplifier optics 150 via the reflective element 154 as illustrated in FIG. 3A. If at least one of the reflective elements 153 and 154 has a focusing or defocusing effect (e.g., via a deformable mirror or thermally induced focusing/defocusing phase deformation), the optical power of the optical energy 155 can be compensated by adjusting the distance between the main focusing elements 151 and 152 as illustrated in FIG. 3B. The convergence/divergence of the beam of optical energy 155 incident on the reflector 154 matches the divergence/convergence of the beam after reflection, as shown by the distances $S_{L1}$ and $S_{L2}$. Note that the distances ($f_1$ and $f_2$) between the reflectors 153 and 154 and a given focusing element (152 and 151, respectively) remains at the total focal length $S_L$ of the focusing elements 151 and 152. The distances and focal lengths can be summarized as follows:

1) $1/s_1 + 1/S_{L1} = 1/f_1$ $$\frac{1}{s_1} + \frac{1}{s_{LI}} = \frac{1}{s_{fI}} \qquad 1)$$

$$\frac{1}{S_{L1}} = \frac{1}{f_1} - \frac{1}{-2f_{D1} + f_1} \qquad 3)$$

$$S_{L1} = f_1 - \frac{f_1^2}{2f_{D1}} \qquad 4)$$

$$S_{L1} = \frac{f_1(-2f_{D1} + f_1)}{2f_{D1}} = f_1 - \frac{f_1^2}{2f_{D1}} \qquad 5)$$

$$S_L = +(f_1 + f_2) - \left(\frac{1}{2(f_1^2 D_1 + f_1^2 D_2)}\right) \qquad 6)$$

Thus, only the distance between the focusing elements 151 and 152 is adjusted. It should be noted that these distances are merely approximate values and that corrections and/or other adjustments may depend on the distance of the beams of the optical energy 155 from the optical axis and the focusing aspects of the focusing elements 151 and 152. Departures for the above derivation may be due to, for example, geometrical factors from non-idealized focusing elements. However, in more detailed simulations, we have shown that most of the effects of typical focusing variations in the reflectors 153 and 154 can be compensated by adjustments in the separation distance between the focusing elements 151 and 152.

Note that the focal lengths of the focusing elements 151 and 152 need not be identical. For example, if the focal lengths are different, the signal spot size on the reflectors 153 may be magnified with respect to the signal spot size on reflector 154. If the reflector 154 is a deformable mirror, the required packing density of actuators or the required damage threshold can be reduced by increasing the size of the signal spots on the reflector. This can be done without changing the signal spot size on the reflector 154 by making focal length f1 larger than f2. The capability for asymmetric imaging, and its application for deformable mirror design freedom, can be applied to the descriptions of WOMPA embodiments described below.

Figure 4A:
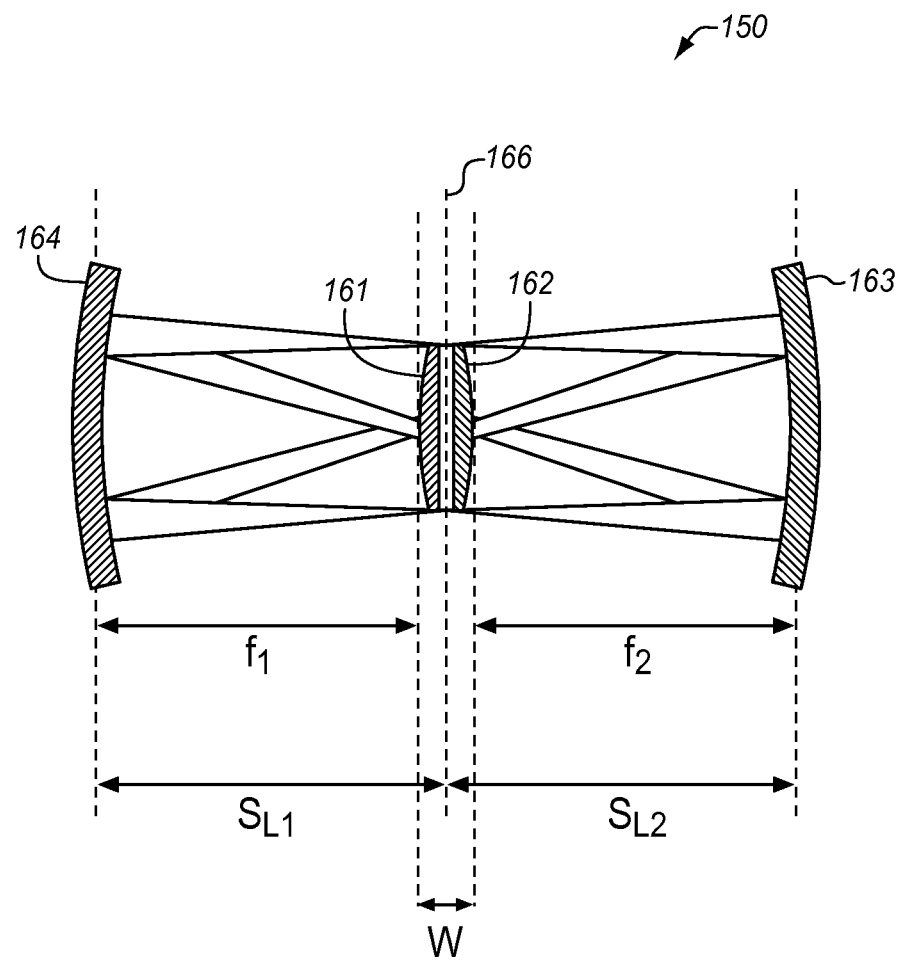
Figure 4B:
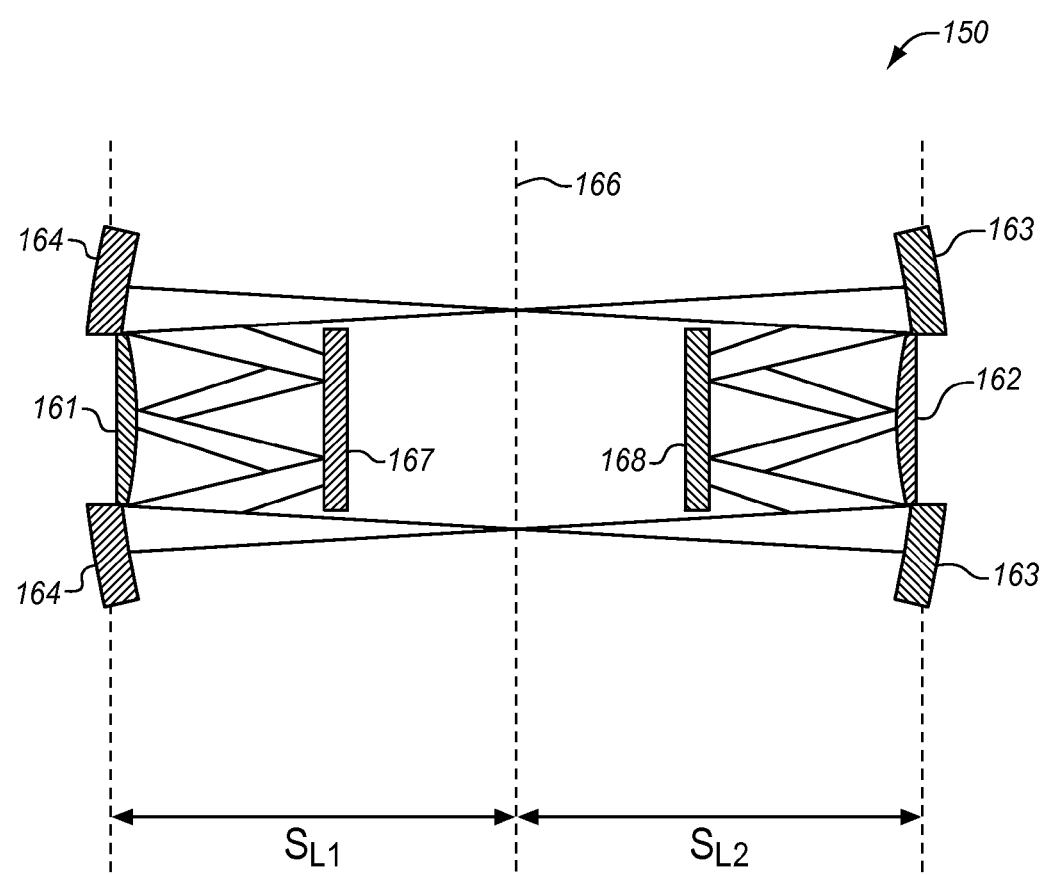

With these concepts in hand, the multi-pass laser amplifier optics 150 may be "folded" by replacing the focusing elements 151 and 152 with reflectors 161 and 162 as illustrated in the multi-pass laser amplifier optics 150 of FIGS. 4A and 4B. In FIG. 4A, the distance between the two reflectors 163 and 164 is now greater than $f_1+f_2$ in order to have enough room to fit the reflectors 161 and 162. This can be achieved if at least one of the reflectors 161 and 162 has a sufficiently negative focal length so that the distance W is greater than zero. The "walk off" is not discernable from this side view but an intermediate beam focus is illustrated in the middle 166 of the multi-pass laser amplifier optics 150. This optical configuration is advantageous because it can easily be fit into a vacuum chamber with a "tube geometry" so as to prevent optical breakdown at the intermediate beam focii. FIG. 4B illustrates a modification of the embodiment illustrated in FIG. 4A. Additional fold mirrors are inserted between the mirrors and focusing elements. This configuration allows either focusing or defocusing of the reflectors. For example, focusing elements can be mirrors instead of lenses. In this instance, however, the optical distance between the two reflectors 161 and 162 may be greater when positioned between the fold mirrors 167 and 168 the focusing elements 163 and 164. The distance $S_{L1}+S_{L2}$ can therefore be made smaller or even less that $f_1+f_2$. This provides more flexibility in compensating for focus variations in the reflectors 161 and 162. Additionally, there are several diagnostic advantages in using the fold mirrors 167 and 168. For example, by allowing some leakage through the fold mirrors to cameras or other optical sensors, beam profiles that would also be incident on the focusing elements 163 and 164 or the reflectors 161 and 162 can be obtained. Additionally, if light from fluorescence on a thin disk gain medium leaks through the fold mirrors 167 and 168, a camera may be used to image the pump beam spot on the gain media. Alternatively, pump radiation may be transmitted through a fold mirror to be incident on a thin disk gain medium attached to a reflector.

While each of the figures illustrating the multi-pass laser amplifier optics 150 are shown with respect to the beam of optical energy 155 propagating along center axis of the multi-pass laser amplifier optics 150 in this "axial walk-off multi-pass" configuration, the walk-off multi-pass concepts in the multi-pass laser amplifier optics 150 may be extended into other "off axis walk-off multi-pass" configurations. Examples of axial and off-axis walk off multi-pass configurations are illustrated in the various WOMPA systems shown and described below in the section entitled Multi-Pass Amplifier Configurations.

2. Multi-Pass Amplifier Configurations

Each of the embodiments mentioned herein may be used to implement a relatively a high power laser systems, such as CPA laser systems. For example, in one embodiment, a Walk-Off Multi-Pass Amplifier (WOMPA) thin disk architecture provides: flexible repetition rate selection; reconfigurable gain selection; disk focus correction for signal beam; and chirped volume Bragg grating (CVBG) stretching and compression. This reimaging WOMPA system may be seeded by a mode-locked oscillator, but may also be seeded by other CW or pulsed optical sources.

Figure 5:
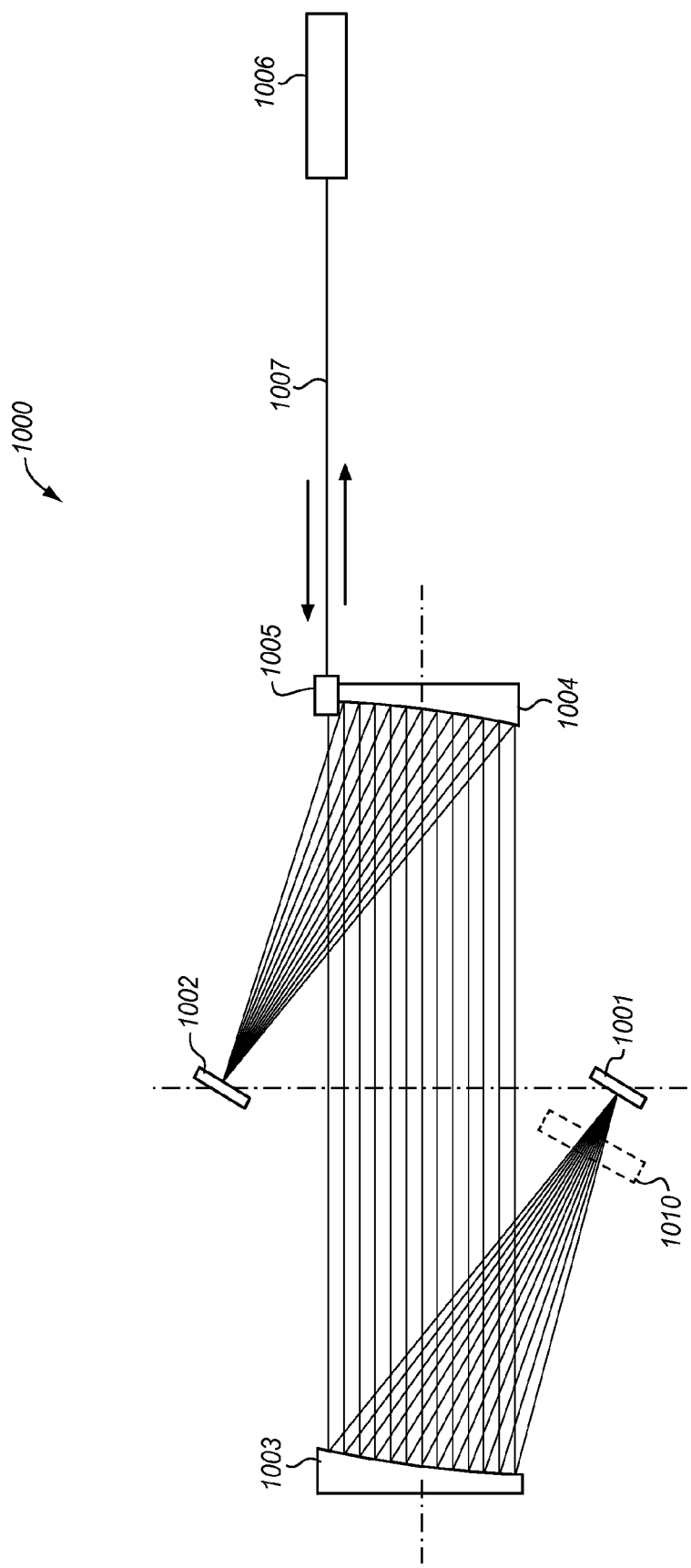
FIG. 5 illustrates an exemplary WOMPA laser architecture.

One exemplary optical design of the WOMPA laser architecture is depicted in the off axis WOMPA system 1000 of FIG. 5. The WOMPA system 1000 includes a pair of off axis parabolic mirrors (OAPs) 1003 and 1004 and a pair of reflective elements 1001 and 1002 (e.g., highly reflective mirrors). Configured with one of the reflective elements 1001 and 1002 is a thin disk gain medium. For example, the reflective element 1001 may have a thin disk gain medium disposed on the surface of the reflective element 1001 so as to provide optical gain to the signal beam 1007 when the thin disk gain medium is pumped with energy (e.g., optical energy from edged pumping diodes, surface pumping optical energy, or the like). In this regard, the reflective element 1001 is generally referred to herein as the thin disk gain medium. Although, the invention is not intended to be limited to a thin disk gain medium simply affix to the reflective element 1001, as other embodiments may implement gain mediums in other manners.

In this embodiment, the optical design of the WOMPA system 1000 is essentially a "4-f" system in which a reflecting thin disk gain medium 1001 and a second reflector 1002 are at conjugate image planes. Multiple passes through the gain medium of the reflective element 1001 are achieved through angular multiplexing. The OAPs 1003 and 1004 shown in the diagram are imaging elements, which provide flexibility for the design. The signal beam 1007 from the laser 1006 propagates through the optical element 1005 (e.g., a lens, filter, beam splitter, or the like) to enter the WOMPA system 1000 and is brought to an intermediate focus between the two OAPs 1003 and 1004 so that the beam is collimated after reflection from the OAP 1003. After reflection from the thin disk gain medium of the reflective element 1001, the signal beam is reflected again from the OAP 1003. Thereafter, the signal beam again passes through an intermediate focus and is incident on the OAP 1004. The beam is collimated by the OAP 1004 and is incident on the reflective element 1002. The signal spot on the reflective element 1002 is an image of the signal spot on the thin disk gain medium of the reflective element 1001. A slight tilt of the reflective element 1002 directs the reflected beam on the OAP 1004. After multiple passes, the signal beam eventually intercepts the thin disk gain medium of the reflective element 1001 (or the reflective element 1002) at normal incidence (as viewed from above) and reverses its path (as viewed from above). The total number of bounce passes is selected by the tilt on the mirror 1002. By inserting polarization rotation optics, thin film polarizers at the input to the system (e.g., the optical element 1005), the input and output beams can be separated. Additionally, if any depolarization effects are observed, a quarter wave plate 1010 can be inserted in front of the thin disk gain medium or the reflective elements 1001 and 1002 for effective correction.

One advantage of the WOMPA system 1000 is that the gain medium of the reflective element 1001 need not be flat so that it may impart a focusing or defocusing effect on the signal beam 1007. The reimaging and uniform spot size aspects of the WOMPA 1000 can be recovered by simply changing the distance between the two OAPs 1003 and 1004, while keeping the distance between the OAPs 1003/1004 and the reflective elements 1001/1002 at their respective focal planes fixed. Adjustment of a translation stage may compensate for thermally induced focus on the disk 1001, thereby avoiding the daunting challenge of thermal deformation compensation found in many thin disk lasers.

With a few tens of passes, pulse amplification has been experimentally proven to increase by a factor of $10^4$ (e.g., 10 nJ to 100 µJ). Additionally, laser amplification may be controlled via the tilting of one or both of the reflective elements 1001 and 1002. For example, tilting the reflective element 1002 may cause the signal beam to be incident on the OAP 1003 fewer or more times (i.e., depending on the degree of the tilt) causing the signal beam to correspondingly impinge the gain medium. The advantages of the WOMPA system 1000 include increased gain through multiple passes of the thin disk gain medium within a compact yet increased optical path length.

Although shown and described with respect to a thin disk gain medium being configured with the reflective element 1001, the invention is not intended to be so limited. For example, a gain medium may be configured with either or both of the reflective elements 1001 in 1002. Alternatively, the WOMPA system 1000 may be configured without a gain medium so as to provide a compact amplifier or laser oscillator with a predetermined or controllable path length (e.g., based on the controlled tilt of the reflective elements 1001 and/or 1002) and a correspondingly controllable delay for passing through the system. Additionally, this WOMPA system 1000 may be used to provide certain focusing aspects on a beam passing through. Other embodiments of the WOMPA system 1000 and their various implementations in laser systems and optimal configurations are shown and described below.

Figure 6:
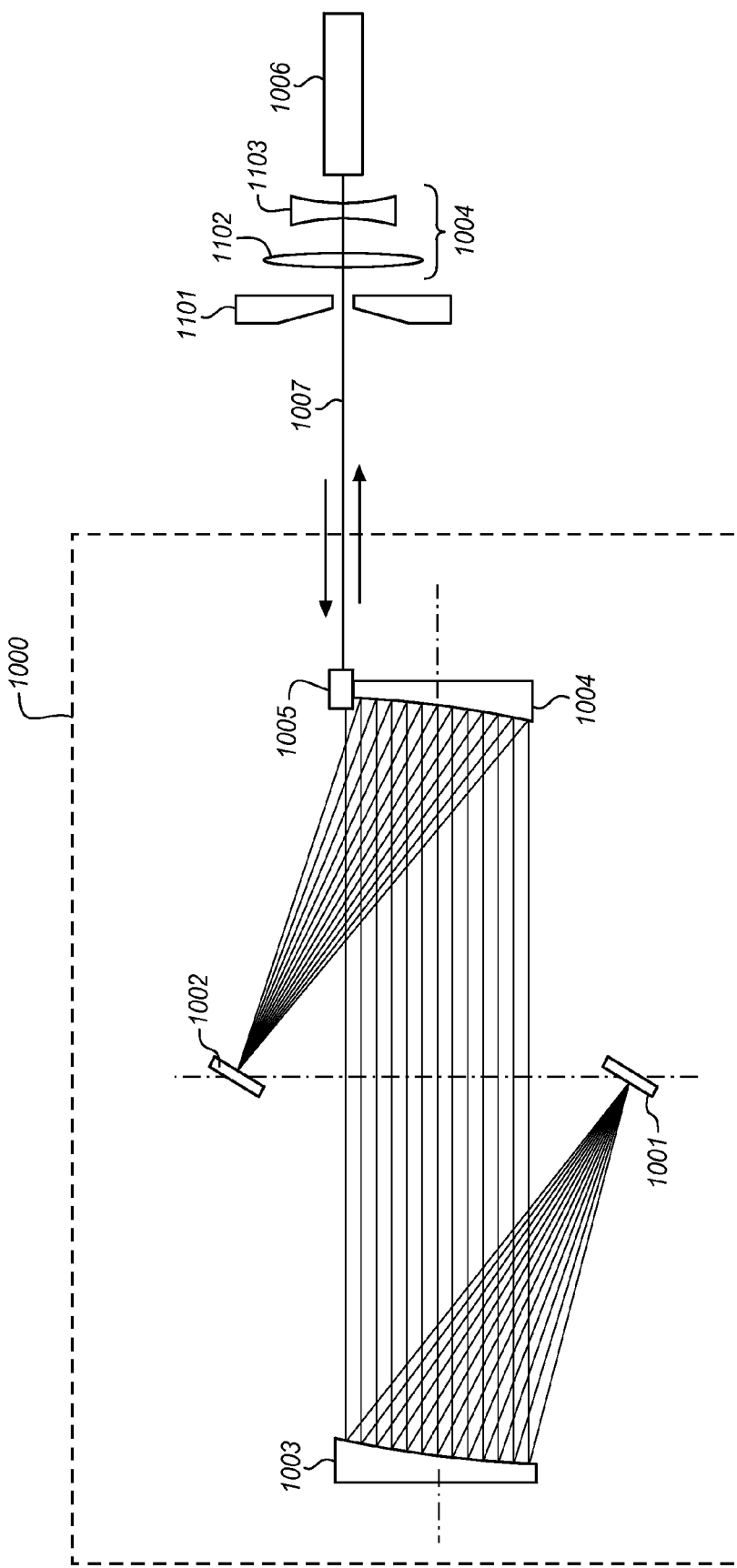

FIG. 6 illustrates the WOMPA system 1000 in another exemplary embodiment. In this embodiment, the WOMPA system 1000 is configured with optical elements 1101, 1102, and 1103 that impart certain optical effects on the signal beam 1007. More particularly, the lenses 1102 and 1103 form a beam expander module 1104 that expands/compresses the signal beam 1007 through a diaphragm 1101 prior to entering the WOMPA 1100. By focusing the signal beam 1007 through the diaphragm 1101, the diameter of the signal beam 1007 can be altered to change the beam spot size on the thin disk 1001 and the mirror 1002. The diaphragm may be positioned at a plane that is imaged on the reflectors 1001 and 1002. For example, for a perfect 4-f system where 1005 is a 1-f lens, the diaphragm may be placed a distance of 1-f behind the lens. By imaging the diaphragm 1101 onto the reflectors, a virtual mask is obtained which prohibits light from being incident on the thin disk gain medium outside of a prescribed region. This is particularly useful if higher-order phase distortions outside of a sub-region on the disk result in the down-stream development of "hot-spots". The placement of the diaphragm substantially reduces or eliminates the possibility of these higher-order phase distortion sub-regions being illuminated even if the input beam is spatially varying. The diaphragm may also be used to decrease the beam spot size on the OAPs 1003 and 1004, allowing for more round trips of the optical energy through the gain medium so as to increase the gain of the optical energy. That is, by increasing the number of passes of the signal beam through the WOMPA system 1000 via the multiple impingements of the OAPs 1003 and 1004, the gain of the signal beam 1007 increases dramatically as each impingement of the signal beam 1007 on an OAP 1003/1004 constitutes a pass of the signal beam 1007 through the material of the thin disk gain medium 1001 that further increases the gain of the signal beam 1007. Thus, the gain of the signal beam 1007 may be scaled according to the number of passes through the thin disk gain medium 1001 via control of the beam spot size of the signal beam 1007 and/or the change in the number of impingements on the OAPs 1003 and 1004. It should be noted that the diaphragm 1101 may be a simple optical aperture or may include a more complete beam shaping capability including gradient intensity filters.

Figure 7:
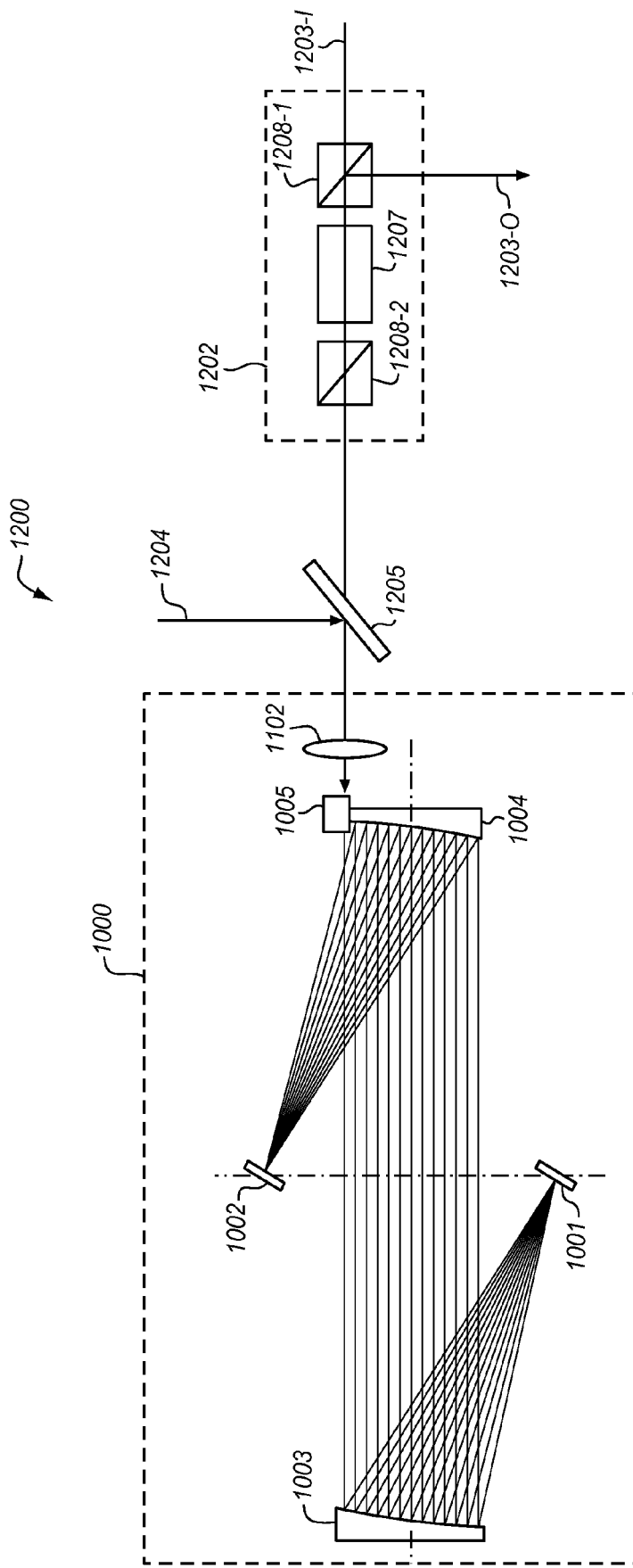

FIG. 7 illustrates another exemplary optical configuration 1200 with the off axis WOMPA system 1000. In this embodiment, the optical configuration 1200 is configured with an optical isolator 1202 in conjunction with the WOMPA system 1000. The optical isolator 1202 provides separation of input and output signal beams 1203-I and 1203-O, respectively. For example, the optical isolator 1202 receives the input signal beam 1203-I with a polarization beam splitter 1208-1 that filters off any undesired polarizations in the signal beam 1203-I. The signal beam 1208-1 then passes through the optical element 1207 to change the polarization of the signal beam (e.g., rotate the phase of the signal beam). Additionally, the optical element 1207 may impart certain optical effects on the signal beam 1203-I (e.g., certain focusing aspects to change the spot size of the signal beam). Thereafter, the signal beam 1203-I passes through another beam splitter 1208-2 that is subsequently used to filter off any undesirable polarizations on the output beam 1203-O once it returns from the WOMPA system 1000.

The laser system 1200 also includes an optical splitter 1205 (e.g. dichroic mirror) that is used to input the pump beam 1204 and the input signal beam 1203-I to the WOMPA system 1000. For example, the laser system 1200 may be configured with a pump energy source that is used to stimulate the thin disk gain medium of the reflective element 1001 via multiple passes of the pump beam 1204 through the WOMPA system

1000. In this regard, the pump beam 1204 may be implemented in a particular polarization that allows the beam to reflect off the beam splitter 1205 and into the WOMPA system 1000. The signal beam 1203-I entering the WOMPA system 1000 extracts the energy provided by the pump beam 1204, thereby amplifying the signal beam 1203-I with each pass through the gain medium in the WOMPA system 1000. The amplified signal beam 1203-O then exits the WOMPA system 1000 and passes through the beam splitter 1205 by having a polarization opposite to that of the pump beam 1204. As mentioned, the amplified signal beam 1203-O then passes through the optical beam splitter 1208-2 to filter off any undesirable effects imparted on the signal beam 1203-O during the amplification process. The optical element 1207 rotates the polarization of the signal beam 1203-O such that it may be reflected off the beam splitter 1208-1 to eject the signal beam from the laser system 1200.

Figure 8:
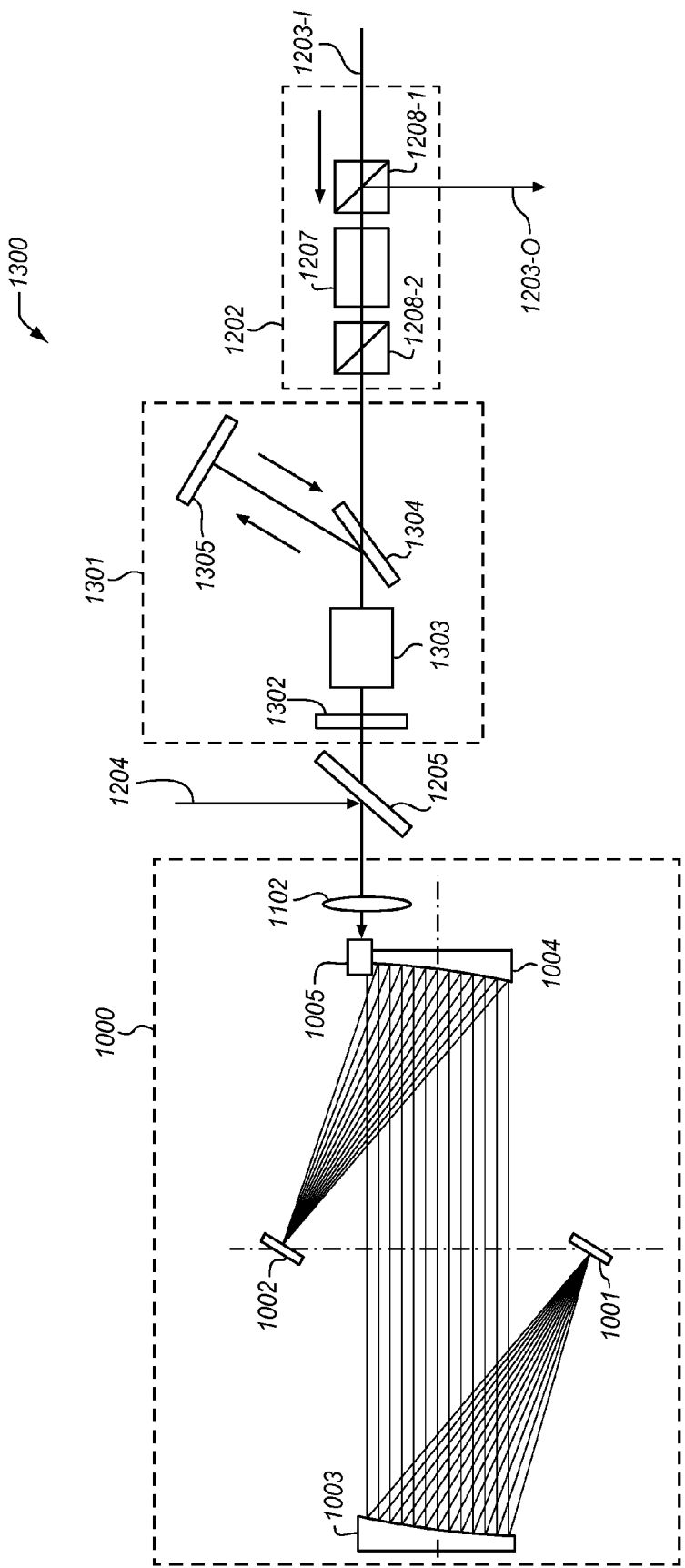

FIG. 8 illustrates the WOMPA system 1000 in another exemplary optical configuration 1300. In this embodiment, the optical configuration 1300 is also configured with the optical isolator 1202, the optical beam splitter 1205, and the pump energy source 1204, in conjunction with the WOMPA system 1000. The optical configuration 1300 also includes an optical module 1301 that provides a double loop regime to further increase amplification of the signal beam 1203. For example, the optical module 1301 may be used to propagate the signal beam 1203-I into the WOMPA system 1000 for a single loop amplification by the WOMPA system 1000, where the term loop refers to propagation in and out of the optical element 1005 and may include many reflections from the reflectors 1002 and 1001. Once the amplified signal beam 1203 exits the WOMPA system 1000, the signal beam 1203 propagates into the optical module 1301 such that it may be reflected back into the WOMPA system 1000 for additional amplifications before exiting the laser system 1300. In FIG. 8, the lens 1102 is explicitly shown as a separate component from the optical element 1005.

In this embodiment, the optical module 1301 includes a 45° quartz rotator 1302, a Faraday rotator 1303, a thin film polarizer 1304, and a highly reflective mirror 1305. The input signal beam 1203-I passes through the thin film polarizer 1304 and into the Faraday rotator 1303 where it receives a change in polarization. The thin-film polarizer 1304, like the optical beam splitters 1208 serve to filter off any undesirable polarizations from the signal beam 1203-I. The Faraday rotator 1303 rotates the polarization of the signal beam 1203-I by 45° where it passes through the 45° quartz rotator 1302 and the optical beam splitter 1205 to enter the WOMPA system 1000. On return, the signal beam 1203 passes through the optical beam splitter 1205 and the 45° quartz rotator 1302 into the Faraday rotator 1303. The Faraday rotator 1303 rotates the signal beam 1203-I again by 45° such that it reflects off the thin-film polarizer 1304 into the highly reflective mirror 1305. Thereafter, the signal beam 1203-I passes through the Faraday rotator 1303 and quartz rotator 1302 to rotate polarization by another 90° such that it again passes into the WOMPA system 1000. The WOMPA system 1000 then amplifies the signal beam 1203-O a second time and propagates the signal beam through the optical module 1301 into the optical isolator 1202. That is, the Faraday rotator 1303 rotates the polarization of the signal beam 1203-O such that it passes through the thin-film polarizer 1304 and into the optical isolator 1202 for ejection from the optical configuration 1300.

FIG. 9A illustrates the WOMPA system 1000 in another exemplary embodiment. In this embodiment, the optical configuration 1400 is a multi-loop configuration that allows an input beam 1408-I to pass through the WOMPA system 1000 multiple times before exiting the optical configuration 1400. For example, the input beam 1408-I enters the laser system 1400 where it passes through the thin-film polarizer 1402-1. The input beam 1408-I then passes through a half wave plate 1403 ($\lambda/2$, e.g., where the polarization of the input beam is changed from s polarization to p polarization). The input beam 1408-I then passes through the electro-optic modulator 1401 without additional rotation so that it reflects of off thin-film polarizer 1402-2 and into the highly reflective mirror 1407. The electro-optic modulator 1401 may then be electronically triggered, so that after the input beam is reflected from thin film polarizer 1402-2 its polarization is rotated by 90 degrees, first by electro-optic modulator 1401 and then again by the half-wave plate 1403, resulting in the input beam 1408-I reflecting from thin film polarizer 1402-1 and being injected into WOMPA system 1000. After the electro-optic modulator 1401 is configured to rotate the input beam polarization of the input beam 1408-I, the input beam continually reflects off the thin-film polarizers 1402 and is trapped within a cavity that includes the WOMPA system 100 and the highly reflective mirror 1407. In this regard, the input beam 1408-I may continually pass into and out of the WOMPA system 1000 until the electro-optic modulator 1401 is turned off, and no longer rotates the polarization of the input beam 1408-I, allowing the input beam 1408-I to pass through the thin-film polarizers 1402. Once the electro-optic modulator 1401 is turned off the input beam 1408-I, the input beam 1408-I may exit the laser system 1400 as the amplified output beam 1408-O by propagating through the thin-film polarizer 1402-2 as opposed reflecting therefrom. Accordingly, amplification of the input beam 1408-I may be controllably scaled based on the number of passes through the WOMPA system 1000. That is, control of the electro-optic modulator 1401 may be based on a predetermined number of passes through the WOMPA system 1000 and a desired level of amplification. A photo-detector 1409 may be configured to detect leakage through thin film polarizer 1402-2. Leakage pulses from each successive round trip are depicted by pulses 1406-1 through 1406-5 in FIG. 9B. For example, laser pulse intensity increases over time as the input beam 1408-I makes multiple trips through the WOMPA system 1000. Such is illustrated in the leakage pulses 1406-1 through 1406-5 detected by the photo-detector 1409 in the beam 1408-L. After the gain begins to saturate and the leakage pulse energies are maximized, the electro-optic modulator 1401 may be turned off to allow the pulse the exit the cavity through thin film polarizer 1402-2 along the beam path 1408-O.

FIG. 10A illustrates WOMPA systems 1000-1 and 1000-2 in another exemplary embodiment of an optical configuration 1500. In this embodiment, the optical configuration 1500 employs another WOMPA system 1000-2 in place of the highly reflective mirror 1407 illustrated in the laser system 1400 of FIG. 9. In this regard, each pass of the input beam 1508-I through the WOMPA system 1000-1 constitutes twice the amplification of the input beam as the input beam also passes through the WOMPA system 1000-2. That is, the WOMPA system 1000-2 may also be configured with a gain medium that also provides gain to the input beam 1508-I prior to emission from the optical configuration 1500. The invention, however, is not intended to be limited simply to twice the amplification as the optical configuration 1500 may be implemented in other ways. For example, the optical configuration 1500 may be implemented with additional WOMPA systems 1000 that may be used to further scale the amplification of the input beam 1508-I. Alternatively, one of the WOMPA systems 1000-1 and 1000-2 may not be configured with a gain medium such that the WOMPA system is used to provide focusing and/or timing affects on the input beam 1508-I. For example, assuming that the WOMPA system 1000-2 is not configured with a gain medium, the WOMPA system 1000-2 may extend the path of the input beam 1508-I in a relatively compact manner. Additionally, such a WOMPA system 1000-2 may be used to impart certain focusing effects in the input beam 1508-I via the OAPs and/or the reflective elements of the WOMPA system 1000-2. Specifically, the time of traversal for the input beam 1508-I through the WOMPA system 1000-2 allows for a longer time for the electro-optic modulator 1401 to switch from a passive state to a fully activated polarization rotating state, after the first traversal of the input beam 1508-I through the electro-optic modulator 1401. This increased switching time allows greater flexibility in the selection of the electro-optic modulator 1401 and the overall system design.

FIG. 10B illustrates the laser pulse intensity increase over time as the input beam 1508-I makes multiple trips through the optical configuration 1500 (i.e., and the WOMPA systems 1000-1 and 1000-2). For example, the laser pulse intensity increases in the output beam 1508-O be a multiple passes of the laser energy 1508 through the WOMPA systems 1000-1 and 1000-2 as illustrated by the laser pulses 1506-1 through 1506-5.

FIGS. 11A and 11B illustrate an exemplary multiple input and multiple output WOMPA system 1600. FIG. 11A is illustrative of a side view of the WOMPA system 1600 whereas FIG. 11B is illustrative of an overhead view of the WOMPA system. The WOMPA system 1600 employs optical elements that are similar to the WOMPA system 1000. For example, the WOMPA system 1600 includes the OAPs 1003 and 1004 and the reflective elements 1001 and 1002, one or more of which may include a gain medium. In this embodiment, the WOMPA system 1600 has two input beams 1611 and 1612 corresponding to two output beams 1614 and 1613, respectively. Another beam 1615 is illustrated as an input/output beam. Each of the beams 1611, 1612, and 1615 enters the WOMPA system 1600 and impinges the gain medium a certain number of times based on the tilt of the reflective elements 1001/1002 (e.g., 12 times in this example). Each beam, however, exits the WOMPA system 1600 along a different path. For example, the input beam 1611 enters the WOMPA system 1600 through the optical element 1601 (e.g., a lens) and exits the WOMPA system 1600 as the beam 1614 through the optical element 1604 (e.g., a lens). However, the input beam 1612 enters the WOMPA system 1600 through the optical element 1602 and exits the WOMPA system through the optical element 1603 with each input path and output path being different from the input path and output path of the beams 1611 and 1614. Additionally, the beam 1615 enters and exits the WOMPA system 1600 along the same path. In this regard, the WOMPA system 1600 presents the ability to input different types of beams for different purposes. For example, the beams 1611 and 1612 may be used to pump the gain medium at different wavelengths. This may be useful if multiple gain media are chosen, or if antistokes cooling approaches are used. Alternatively, the beam 1611 and 1612 may be used as scaling pump beams to controllably adjust the pump power to the gain medium and/or serve as a backup in case one of the pump sources fails. In yet another alternative, the WOMPA system 1600 may be used to propagate a plurality of signal beams along different paths. Such may be the case for communication purposes. For example, the gain medium of the reflective element 1001 may be edge pumped such that a plurality of communication signal beams 1611, 1612, and 1615 are amplified external to other more sensitive optics.

It should be noted that while the WOMPA system 1600 is shown and described with respect to three input beams and three corresponding output beams, the invention is not intended to be so limited. For example, the WOMPA system 1600 may be configured with as many input and output beams as desired limited in general to the spot sizes of those beams. That is, the spot size of each beam occupies a certain amount of real estate on the OAPs 1003 and 1004. So long as the individual beams do not overlap (at least not substantially), the number of beams may be simply limited to the spot sizes of the beams and the amount of real estate on the OAPs 1003 and 1004. Examples of such beam spot sizes on the OAPs are shown and described below in greater detail in FIGS. 13 and 14. It should also be noted that the optical elements 1601-1604 are optional elements that may be used to place beam waists between the OAP's or otherwise change the beam spot sizes (e.g., via focusing) and/or impart other optical effects on the beams.

Figure 12:
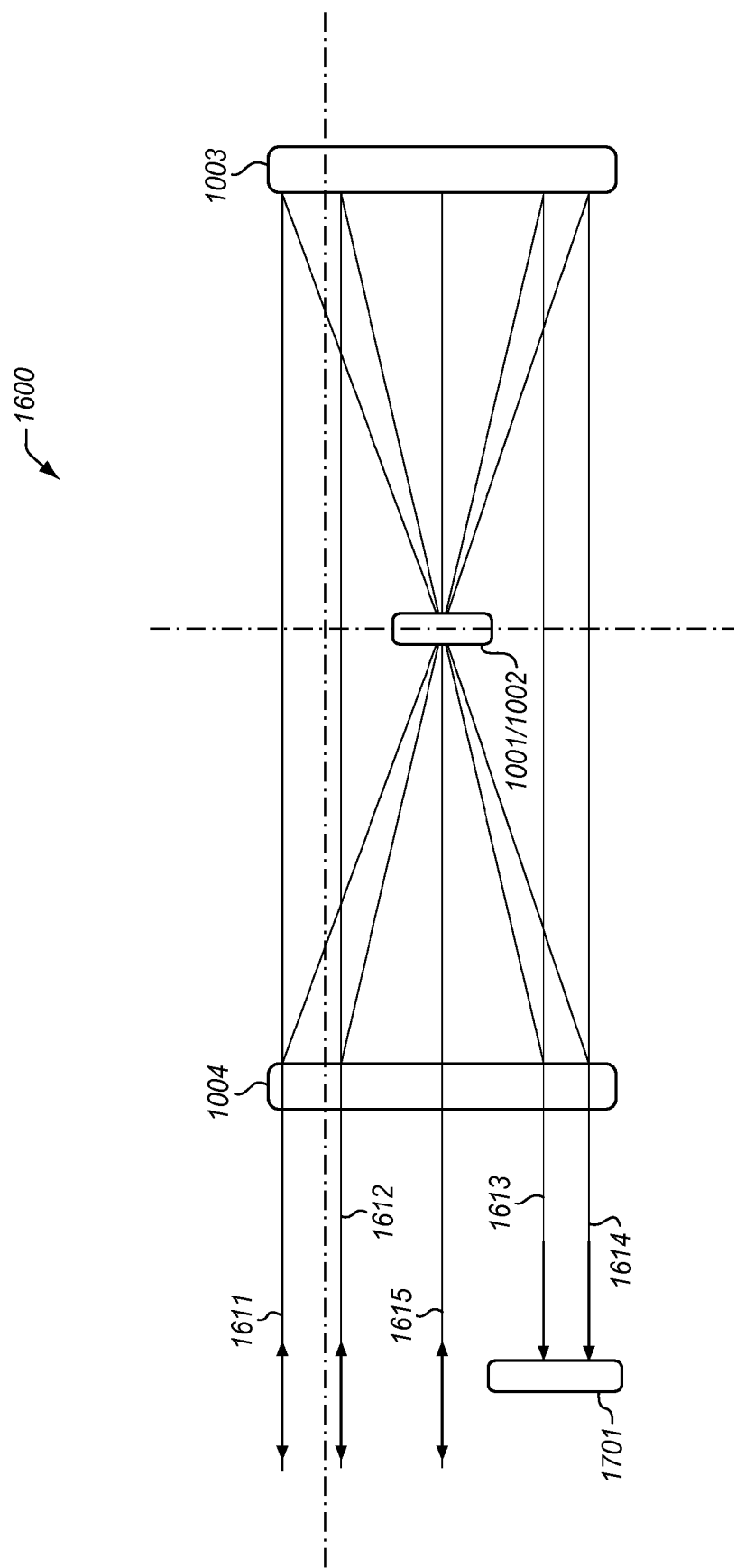

FIG. 12 illustrates another exemplary embodiment of the multiple input and multiple output WOMPA system 1600 as viewed from the side, as illustrated in FIG. 11A. As with the previous embodiment, the input beams 1611 and 1612 enter the WOMPA system 1600 and exit the WOMPA system as the corresponding output beams 1613 and 1614. Differing from the previous embodiment is the highly reflective mirror 1701 that is used to reflect the output beams 1613 and 1614 back into the WOMPA system 1600 so as to provide two passes of the beams through the gain medium. For example, once the output beams 1613 and 1614 exit the WOMPA system 1600 and reflect off the highly reflective mirror 1701, these output beams become input beams to the WOMPA system 1600 and once again impinge the gain medium configured with the reflective element 1001 (and/or 1002) and exit the WOMPA system 1600 via the paths of the input beams 1611 and 1612.

Figure 13:
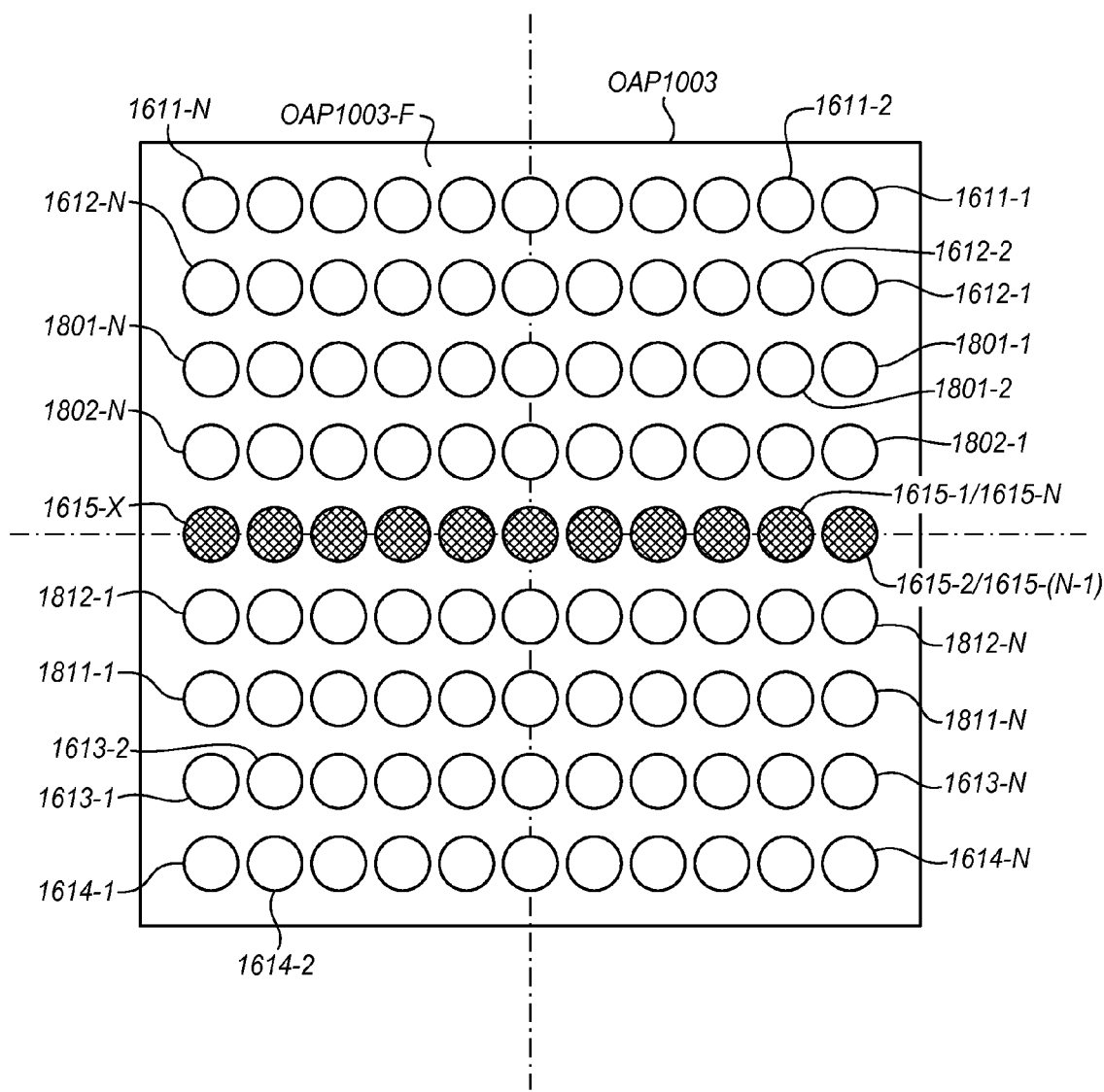
FIGS. 13 and 14 illustrate exemplary beam spot patterns of an off axis parabolic mirror (OAP) used in the WOMPA laser architecture.
Figure 14:
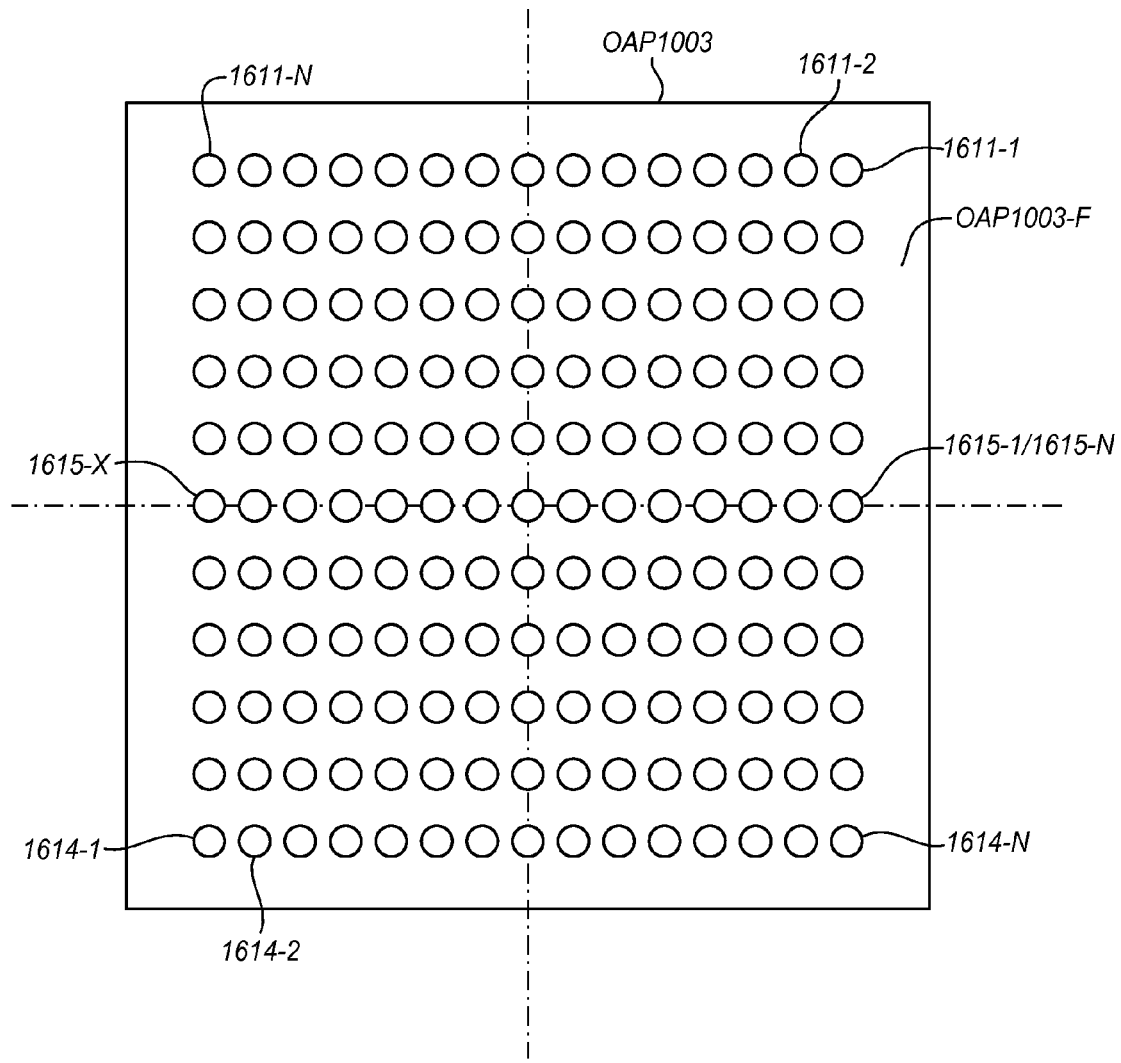

FIGS. 13 and 14 illustrate beam spot sizes on the OAPs 1003 and 1004 in greater detail. Since the OAPs 1003 and 1004 are similar, the discussion will focus on the OAP 1003 for the sake of clarity. In this embodiment, the face 1003-F of the OAP 1003 of FIGS. 11A and 11B is shown with a plurality of beams spots representing the reflections of the beams 1611-1615. For example, the beam spot 1611-1 represents the first point on the OAP 1003 that the beam 1611 impinges (i.e., reflects off) before propagating to the optical element 1002. After propagating from the reflective element 1002, the beam 1611 impinges the face 1003-F of the OAP 1003 at the beam spot 1614-1 and proceeds to the OAP 1004. The beam 1614 proceeds to the optical element 1001 to reflect off the face 1004-F of the OAP 1004 to the face 1003-F of the OAP 1003 at the beam spot 1611-2. These reflections continue until the beam 1614 exits the WOMPA system 1600 by reflecting off the face 1003-F of the OAP 1003 at the beams spot 1614-N (where N is merely intended to represent an integer greater than one and not necessarily equal to any other N designations described herein). The beam 1612 similarly impinges the face 1003-F of the OAP 1003 at the beam spot 1612-1 and exits the WOMPA system 1600 from the beam spot 1614-N. The beam 1615, due to the point at which the beam 1615 first impinges the face 1003-F of the OAP 1003, enters the WOMPA system 1600 at the beam spot 1615-1 and exits at the same location (1615-N) after traversing through the WOMPA system 1600 (i.e., via the OAPs 1003/1004 and the reflective elements 1001/1002). For example, the beam impinges the OAP 1003 at point 1615-1 and traverses to the point 1615-X (where X is an integer like N merely representing a number greater than one) before traversing back through the WOMPA system 1600 to the point 1615-N (i.e., 1615-1) of the OAP 1003 and exiting the system.

Although illustrated with a particular number of beams spots and input/output beams, the invention is not intended to be so limited. For example, input beams 1801 and 1802 may be additional input beams having corresponding output beams 1811 and 1812. Generally, the number of beams spots, and thus the number of input beams, available to the face 1003-F of the OAP 1003 depends on the amount of available real estate on the face of the OAP 1003-F and/or the beam spot size of each impinging beam. As mentioned above, certain optical elements may be configured with the WOMPA system 1600 to change the beam spot sizes. Smaller beam spot sizes mean that more beams can impinge the OAP 1003. FIG. 14 illustrates such beam spot adjustment via smaller beam spot sizes resulting in more beams spots in the same amount of available real estate than illustrated in FIG. 13. Physical reductions to practice have shown that a 3 inch square face 1003-F with a 5 mm spot size can result in 198 passes of optical energy through a gain medium affixed to one of the optical elements 1001/1002. A 3 mm spot size can result in 330 passes through the gain medium. Note that, while FIG. 13 illustrates the beam spots arranged in a perfect rectilinear grid, the actual spot sizes may be formed on a curvilinear grid due to geometrically based distortions from the OAP or parabolic reflective surfaces. Thus, the invention is not intended to be limited to any particular pattern of beam spots on the OAP.

Figure 15:
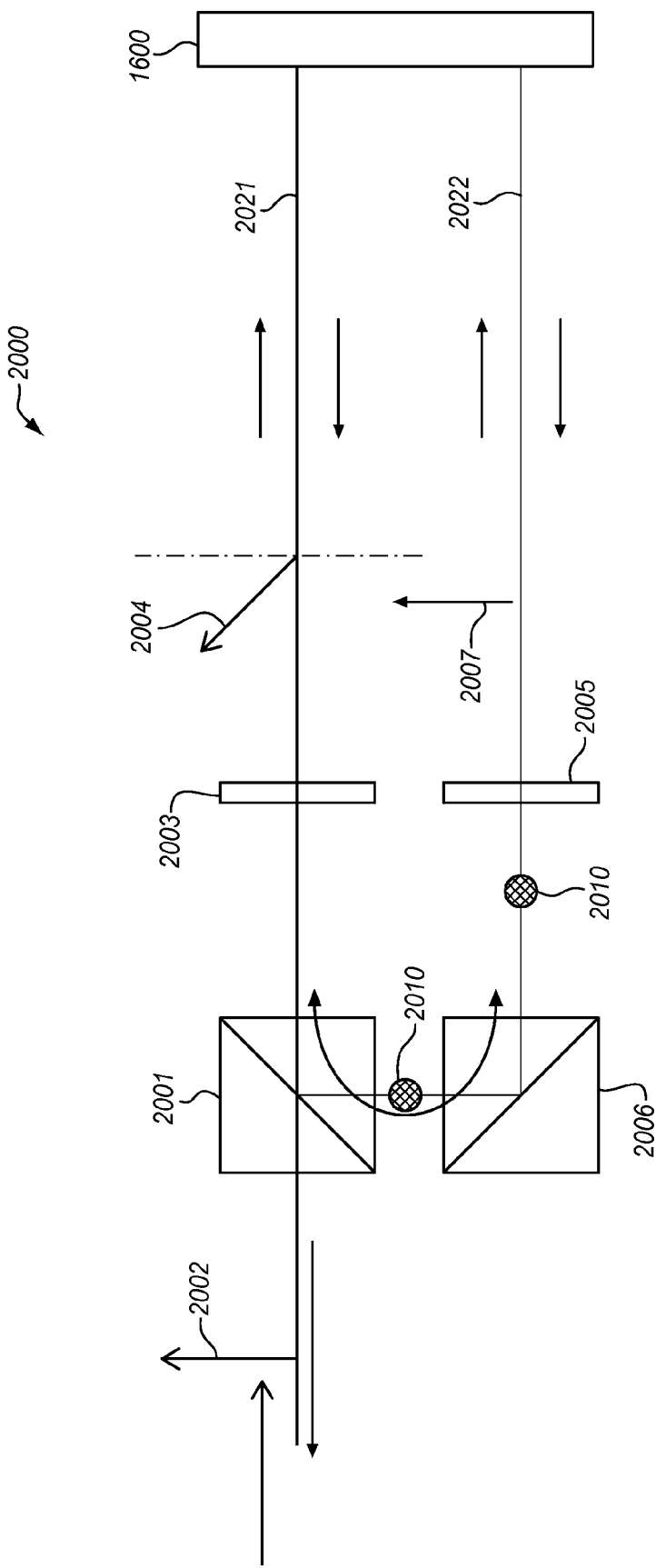

FIG. 15 illustrates the WOMPA system 1600, from the side, in another exemplary optical configuration 2000. In this embodiment, linearly polarized laser energy 2002 enters the optical configuration 2000 through a polarization beam splitter (or a thin-film polarizer) 2001 to filter off any undesired polarizations. The laser energy 2002 is then rotated in polarization by 45° via a polarization rotator 2003 where it enters the WOMPA system 1600 as the 45° rotated laser energy 2004. Afterwards, the laser energy 2004 exits the WOMPA system 1600 at another elevation (e.g., into the page of FIG. 15) and reflects off a mirror (not shown) back into the WOMPA system 1600. From there, the laser energy 2004 exits the WOMPA system 1600 where it is rotated in phase again by 45° via the rotator 2003. In this regard, the laser energy 2004 is now horizontally polarized with respect to the laser energy 2002 such that it reflects off the polarization beam splitter 2001 and into the polarization beam splitter (or highly reflective mirror) 2006. The horizontally polarized laser energy 2010 then propagates through an optional polarization rotator 2005 which rotates the polarization of the laser energy by 90° such that it is again linearly polarized laser energy (2007) in the vertical direction. The linearly polarized laser energy 2007 propagates through the WOMPA system 1600 and again exits at another elevation (e.g., into the page of FIG. 15) and reflects off a mirror (not shown) back into the WOMPA system 1600. Thereafter, the laser energy exits the WOMPA system 1600 to pass through the optional polarization rotator 2005 where it again becomes the horizontally polarized laser energy 2010. The horizontally polarized laser energy 2010 reflects off the polarization beam splitters 2006 in 2001 back into the WOMPA system 1600 through the rotator 2003. The rotator 2003 rotates the polarization of the optical energy 2010 by 45° before and after propagating through the WOMPA system 1600 such that it may exit the optical configuration 2000 as vertically polarized laser energy 2002. In this regard, the laser energy 2002 is filtered to a single polarization and makes six passes through the WOMPA system 1600. Depending on the configuration the WOMPA system 1600, the gain of the laser energy 2002 can be increased dramatically. For example, assuming that the WOMPA system 1600 includes a thin disk gain medium disposed upon one of the reflective elements 1001/1002, the optical configuration 2000 provides that the laser energy 2002 receives six times as many passes through the gain medium of the WOMPA system 1600. Depending on the number of beams spots with the OAPs 1003/1004, the optical configuration 2000 may dramatically increase the total number of passes of the optical energy 2002 through the gain medium. Alternatively, the optical configuration 2000 may be configured with the WOMPA system 1600 of FIG. 14. For example, the path 2021 may be likened to the path 1611 while the path 2022 may be likened to the path 1612.

Figure 16:
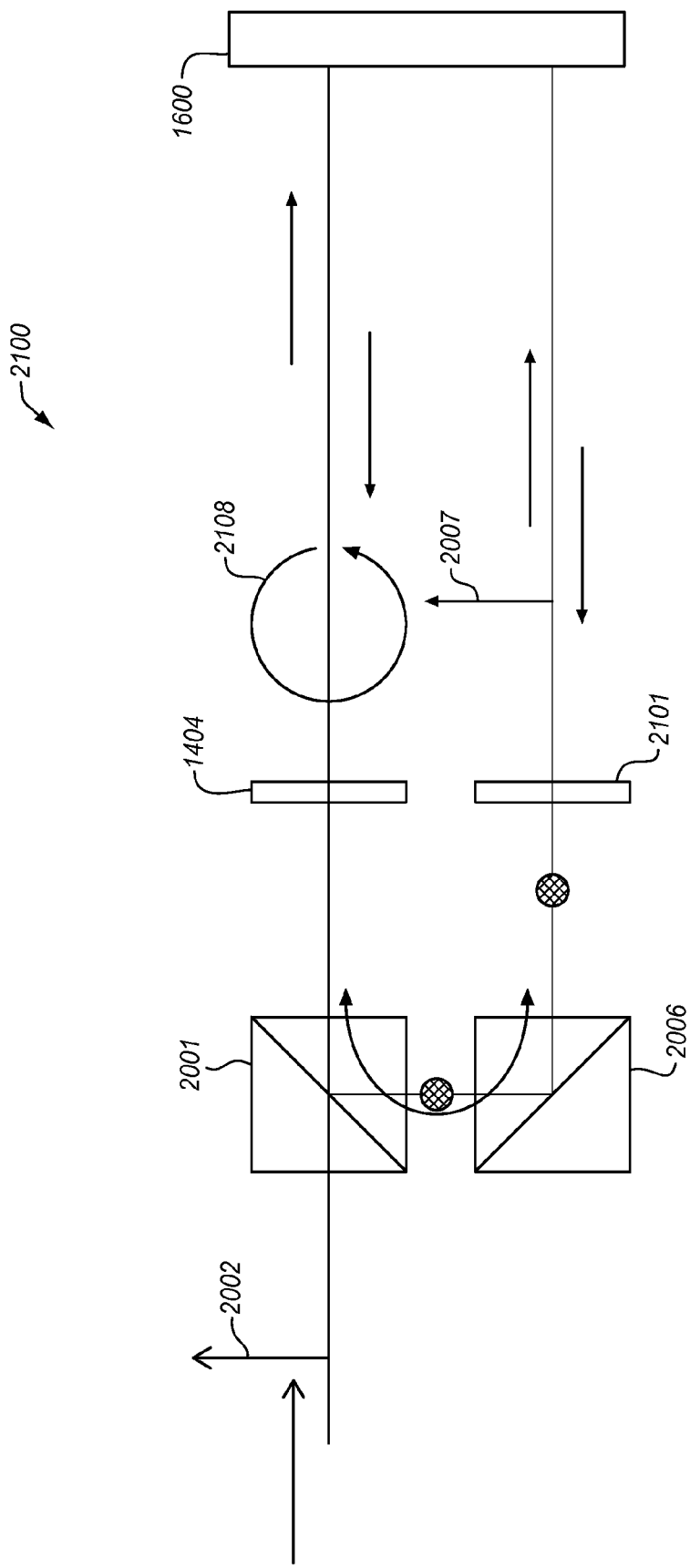

FIG. 16 illustrates the WOMPA system 1600 in another exemplary optical configuration 2100. In this embodiment, linearly polarized laser energy 2002 again enters the optical configuration 2000 through a polarization beam splitter (or a thin-film polarizer) 2001 to filter off any undesired polarizations. In this configuration, however, the laser energy 2002 propagates through a quarter wave plate ($\lambda/4$) 1404 such that it is circularly polarized before entering the WOMPA system 1600. With the use of the half wave plate ($\lambda/2$) 2101, the laser energy 2002 can revert back to linear polarization and exit the optical configuration 2100 with six passes through the WOMPA system in a manner similar to that shown and described in the optical configuration 2000 of FIG. 15.

FIG. 17 illustrates the WOMPA system 1600 in another exemplary optical configuration. In this embodiment, the polarization beam splitters 2001 in 2006 are combined with the optical elements 2003 and 2005 of FIG. 17 (or the optical elements 1404 and 2101 of FIG. 16) to provide a gain scaling module 2205. The gain scaling module 2205 optically communicates with the WOMPA system 1600 such that the laser energy 2203 makes six passes through the WOMPA system 1600 before exiting the system in the same manner as illustrated in FIGS. 15 and 16. The advantage of the gain scaling module 2205 comes from the ability to combine with other gain scaling modules 2205 to further scale the gain of the laser energy 2203 in a compact manner. An example of such is shown in the optical configuration 2300 of FIG. 18. The optical configuration 2300 includes a plurality of gain scaling modules 2205-1 . . . N that may be configured proximate to one another so as to increase the number of passes through the WOMPA system 1600 by two with each additional gain scaling module 2205. For example, the laser energy 2203 entering the gain scaling module 2205-1 along the path 2301 passes through the gain scaling module into the WOMPA system 1600. The laser energy 2203 then exits the WOMPA system 1600 at another elevation (e.g., into the page of FIG. 17), reflects off a mirror (not shown) back into the WOMPA system 1600, and returns by passing through the gain scaling module 2205-2 along the path 2305. The laser energy 2203 exits the WOMPA system 1600 at another elevation (again into the page of FIG. 17) to reflect off a mirror (not shown) into the WOMPA system 1600. The laser energy 2203 then propagates to the WOMPA system 1600 in a similar manner through the gain scaling module 2205-3 along the path 2310. The laser energy 2203 then traverses from the gain scaling module 2205-3 back to the gain scaling module 2205-1 for a total of fourteen passes through the WOMPA system 1600. However, the invention is not intended to be so limited as the number of gain scaling modules 2205 may be increased or decreased as a matter of design choice.

Figure 19:
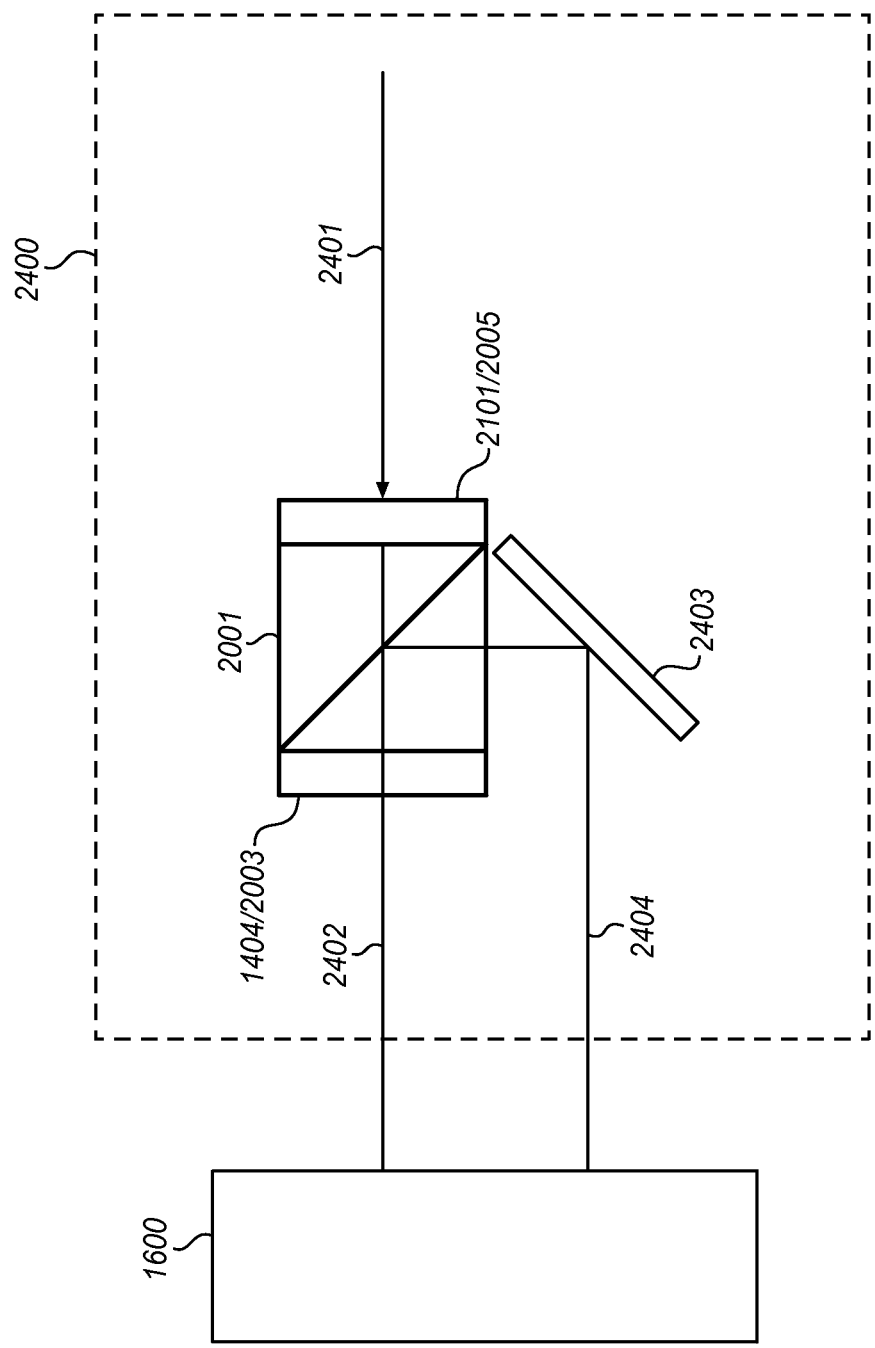
Figure 20:
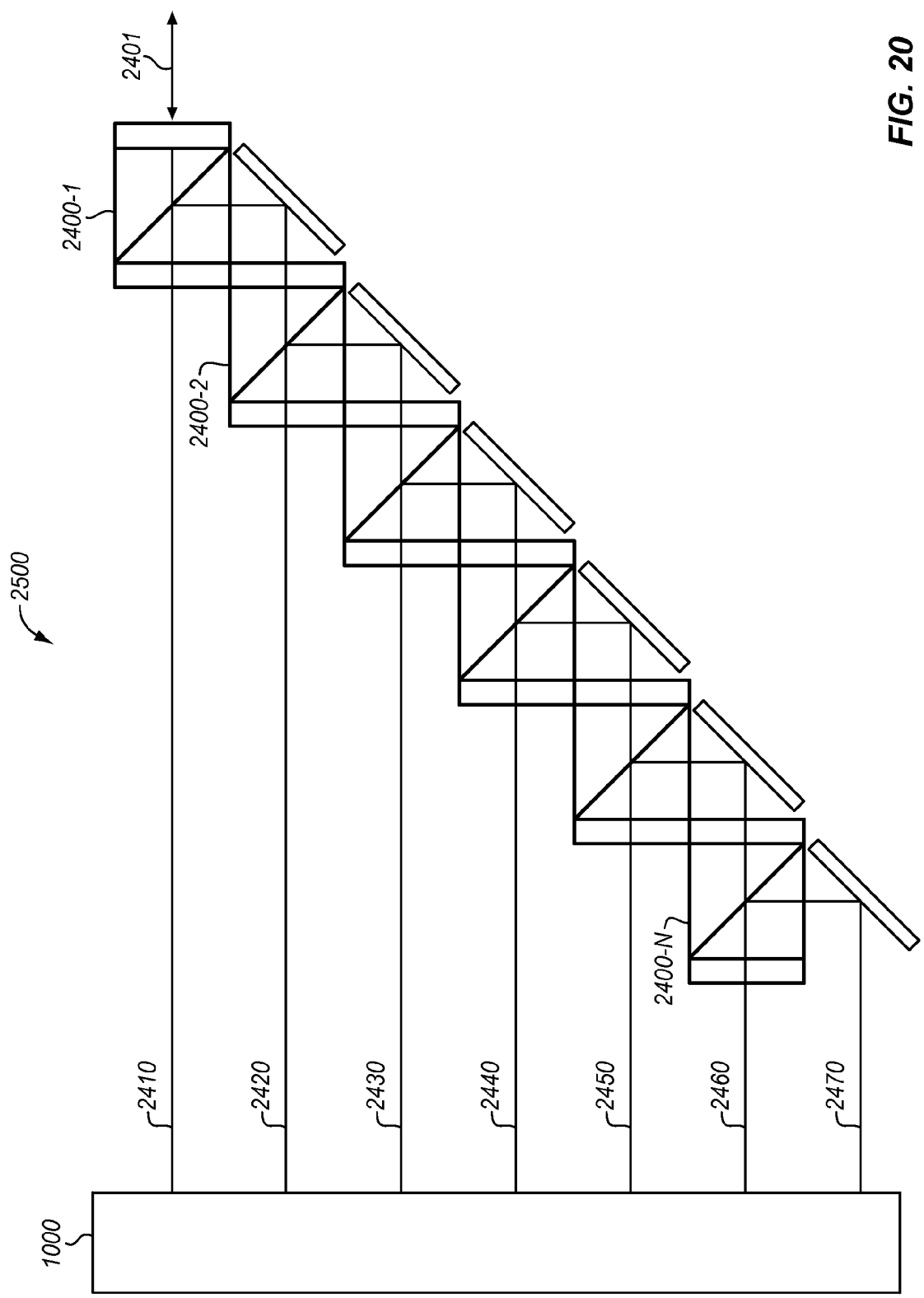

FIGS. 19 and 20 illustrate another embodiment for scaling the gain of laser energy via the optical configuration 2400. In this embodiment, the laser energy 2401 passes through the quartz 90° rotator 2005 (or half wave plate 2101) where the polarization of the laser energy is rotated by 90° such that it passes through the polarization beam splitter 2001. Thereafter, the laser energy polarization is modified via the 45° polarization rotator 2003 (or quarter wave plate 1404) before it enters the WOMPA system 1600 along the path 2402. The laser energy 2401 exits the WOMPA system 1600 at another elevation (e.g., into the page of FIG. 19), reflects off a mirror (not shown) back into the WOMPA system 1600. Thereafter, the laser energy 2401 exits the WOMPA system 1600 along the path 2402 again passing through the 45° polarization rotator 2003 (or quarter wave plate 1404) such that it reflects off the polarization beam splitter 2001 to the highly reflective mirror 2403. The mirror 2403 reflects the laser energy along the path 2404 into the WOMPA system 1600 and then exits along the same path 2404 (i.e., after another trip through the WOMPA system 1600 at another elevation) to the mirror 2403 for reflection off the polarization beam splitter 2001. The laser energy then undergoes another pass through the WOMPA system 1600 as well as two more polarization modifications via the 45° rotator 2003 (or quarter wave plate 1404). The two additional polarization modifications rotate the polarization of the laser energy 2401 to its original polarization (i.e., when laser energy 2401 initially entered the optical configuration 2400) such that it passes through the polarization beam splitter 2001 and exits the optical configuration along its entering path. With this particular optical configuration 2400, the laser energy 2401 makes a total of six passes through the WOMPA system 1600. Note that if the laser energy 2404 is at the same elevation as the optical axis of the WOMPA system 1600 OAPs, then the total number of passes would be five.

The optical configuration 2400 can be extended to increase the number of trips of the laser energy 2401 through the WOMPA system 1600. For example, in FIG. 20, the laser energy 2401 enters the optical scaling configuration 2500 and passes through the optical configuration 2400-1 along the path 2410 to the WOMPA system 1000 for two trips therethrough. The laser energy 2401 returns along the path 2410 to the optical configuration 2400-1 where it is reflected to the optical configuration 2400-2 to pass through the WOMPA system 1600 via the path 2420 (i.e., for two trips). The laser energy 2401 returns along the path 2420 to the optical configuration 2400-2 where it is further reflected downstream along the paths 2430, 2440, 2450, and 2460 until it reaches the optical configuration 2400-N. The laser energy 2401 then propagates to the optical configuration 2400-N as described above returning from the WOMPA system 1600 via the path 2470 to pass through the WOMPA system 1600 via the path 2460 again, thus propagating upstream along the paths 2460, 2450, 2440, 2430, 2420, 2410 until the laser energy 2401 exits via the optical configuration 2400-1. The laser energy 2401, in this regard, makes a total of 4N+1 passes through the WOMPA system 1600 when configured with N optical configurations 2400.

Figure 21:
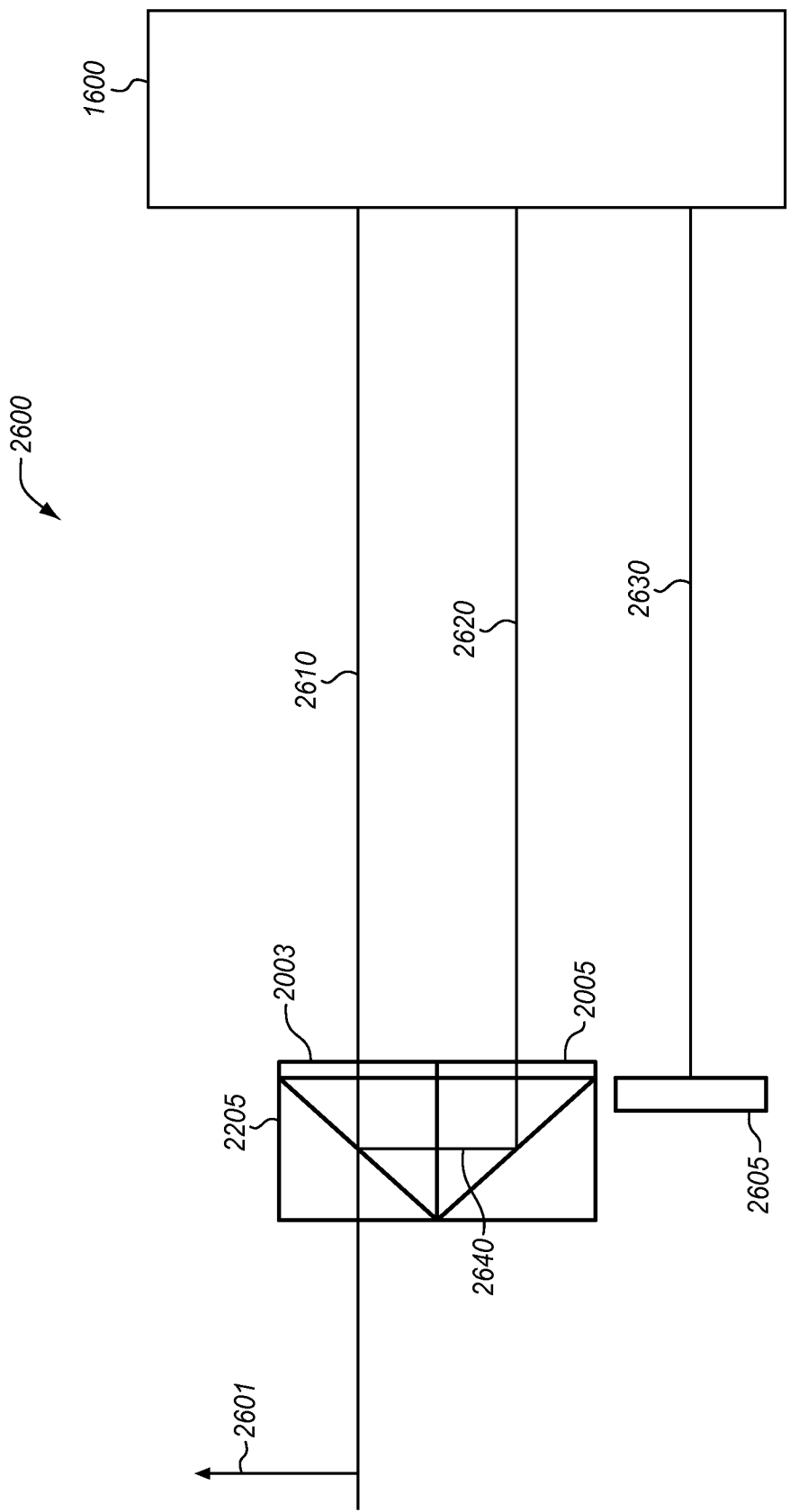

FIG. 21 illustrates another multi-pass optical configuration 2600 employing the WOMPA system 1600. In this embodiment, the optical configuration 2600 is configured with the gain scaling module 2205 to pass the laser energy 2601 multiple times through the WOMPA system 1600. Initially, the laser energy 2601 passes through the gain scaling module 2205 where the phase is rotated after passing through the 45° polarization rotator along the path 2610. The phase rotated laser energy enters the WOMPA system 1600 along the path 2610 and exits the WOMPA system 1600 along the path 2630 where it is reflected by the reflective element 2605.

The reflective element 2605 reflects the laser energy 2601 to the WOMPA system 1600 along the path 2630 where it exits the WOMPA system 1600 along the path 2610. From there, the laser energy 2601 propagates to the gain scaling module 2205 after being rotated in phase by another 45° via the 45° polarization rotator 2003. This rotation causes the laser energy 2601 to reflect along the path 2640 within the gain scaling module 2205. For example, the gain scaling module 2205 may include polarization beam splitters that reflect light at one polarization while passing light at another polarization. In this regard, the gain scaling model 2205 propagates the laser energy 2601 along the path 2620 to the WOMPA system 1600 where it enters the WOMPA system 1600 and exits along the same path 2620. Before entering the WOMPA system 1600, the laser energy 2601 is rotated in phase by 90° via the 90° polarization rotator 2005. The laser energy 2601 is then rotated again by 90° on the return trip along the path 2620 via the 90° polarization rotator 2005. The laser energy 2601 reflects and propagates through the gain scaling module 2205 along the path 2640 where it exits the gain scaling module 2205 along the path 2610 after being rotated by the 45° polarization rotator 2003. The laser energy 2601 then again enters the WOMPA system 1600 along the path 2610, exits along the path 2630, reflects off the reflective element 2605 to enter the WOMPA system 1600, and exit the WOMPA system 1600 along the path 2610. The laser energy 2601 undergoes another 45° phase rotation as it passes through the 45° polarization rotator 2003. This final 45° rotation of the laser energy 2601 causes the laser energy 2601 to pass through the gain scaling module 2205 to exit the optical configuration 2600 after making a total of five passes through the WOMPA system 1600. Thus, the optical configuration 2600 provides a means for multiplying the number of passes through a gain medium of the WOMPA system 1600. For example, assuming that the WOMPA system 1600 provides 30 passes through the thin disk gain medium 1001, then the optical configuration 2600 provides a means for multiplying that number of passes by a factor of five for a total number of 150 passes through the gain medium 1001.

It should be noted that the reflective element 2605 may be configured in other ways as a matter of design choice. For example, the reflective element 2605 may be a highly reflective mirror that reflects substantially all of the laser energy impinging the reflective element 2605. Alternatively, the reflective element 2605 may be configured to pass a certain portion of the optical energy while reflecting the remaining optical energy to the WOMPA system 1600. Such an embodiment may have advantages in that the optical configuration 2600 may be configured with a controller that is used to control the gain of the optical configuration 2600. For example, the reflective element 2605 may include a detector that receives the laser energy passing through the reflective element 2605 to determine the gain being imparted on the laser energy 2601 by the WOMPA system 1600. This information may be passed to the controller such that adjustments may be made to certain reflective elements within the WOMPA system 1600 to adjust the gain of the optical configuration 2600 (e.g., via the tilting of mirrors within the WOMPA system 1600 that change the number of locations where the laser energy 2600 may impinge the OAPs of the WOMPA system). Alternatively or additionally, the reflective element 2605 may be configured with a saturable absorber, such as a SESAM. Such a mirror may be used for the generation of ultrashort pulses by passive mode locking when the optical configuration 2600 exists within a cavity. Additionally, the SESAM may be used to prevent ASE. For example, a SESAM may be used as reflective element 2605 absorb light at certain low intensities while reflecting higher intensity light regardless of the wavelength so as to "filter off" undesirable fluorescence, such as ASE. Each of the SESAMs and saturable absorbers described in the embodiments below may be used for such purposes. In this regard, SESAMs and other saturable absorbers may be configured with the WOMPA systems described herein in a variety of ways as a matter of design choice. In some embodiments, a saturable absorber may even be configured with the thin disk gain medium 1001 to prevent ASE within the WOMPA system 1600.

In another embodiment, depicted in FIGS. 22A-22C, a WOMPA system 2700 significantly increases the number of round trips through the gain medium 1001. In implementing such, an OAP 2710 is used in addition to the WOMPA system 1000. This third OAP 2710 and an additional angular multiplexing mirror 2711 provide angular multiplexing in two directions, allowing for many more round trips. FIGS. 22A and 22B are side and top views, respectively, whereas FIG. 22 provides a footprint view of the any of the OAPs 1003, 1004. The top view of FIG. 22B is very similar to the WOMPA system 1000 described in FIG. 5, where horizontal multiplexing mirrors 1001/1002 are used to control the angular multiplexing in the horizontal direction. Since the signal beam is injected below the thin disk gain medium 1001, after numerous disk "bounces" (i.e., reflections of the gain medium 1001), the beam 2705 is ejected from the OAP 1003/1004 imaging pair at an elevation that is above the elevation of the thin disk gain medium 1001. After the signal beam 2705 passes the OAP 1003, it is reflected off the OAP 2710 and an image of the gain medium 1001 is created at the vertical multiplexer mirror 2711. The vertical multiplexer mirror 2701 directs the signal beam 2705 back to OAP 2710, which injects the beam 2705 back into the OAP imaging pair 1003/1004 at a new elevation. In this regard, the WOMPA system 2700 uses both vertical and horizontal angular multiplexing to produce a relatively large number of signal beam 2705 passes to efficiently extract energy from the thin disk gain medium 1001, even with a relatively low energy seed. This multi-pass system 2700 may also compensate thermal effects from multi-pass pumping, disk geometry, and various round trip losses due to the length of the region. FIGS. 22A and 24B illustrate the case where the optical axis of OAP 7210 is above the optical axis of the OAP 1003 and the OAP 1004. However it should be understood that the optical axis of OAP 7210 may be along any line approximately parallel to the optical axis of OAP 1003 and/or OAP 1004.

In one physical reduction to practice, the system 2700 is configured with the parameters listed in the table below:

| Parameter | Value |
| --- | --- |
| Disk Type | Yb:YAG (5%) |
| Disk Gain Thickness | 225 μm |
| Pump Power | 500 W or 1 kW |
| Pump Losses (initial) | 7% |
| Pump Losses (R.T.) | 0.5% |
| Pump Round Trips | 30 |
| Signal Seed Energy | 10 nJ |
| Signal Rep Rate | 1 kHz |
| Signal/Pump Area Fill Factor | 64% |
| Signal Losses | 5%/round trip |
| Water Temperature | 13 degrees |
| Heat Transfer Coefficient | 105 W/m2/K |

The WOMPA system 2700 is operable to substantially increase the output pulse energy for a 10 nJ input pulse and 500 W pump based on the pump spot size and the number of disk bounces. For example, if the WOMPA system 2700 is configured to provide eight rows and eight columns of beam spots on the OAPs 1003, 1004, and 2710, 64 round trips may be achieved with a pump spot size of 4 mm, yielding up to 75 mJ per pulse. With a 1 kW pump source, about 150 mJ may be achieved.

Previously, nanoJoule to milliJoule amplification in an ultrashort pulse laser system called for the use of a regenerative amplifier. Traditionally, a regenerative amplifier is electronically controlled to switch pulses into and out of the region via a Pockets cell or an electro-optic modulator. Such switches, however, are fairly expensive and difficult to operate and align. The switches also require high voltage and are significant sources of loss. Moreover, optical switching technology that is fast enough for a regenerative amplifier application typically can only accommodate a signal beam through a small aperture and requires propagation through a refractive material. Consequently, the pulse energy cannot exceed a certain value at which nonlinear propagation effects cause damage. The optical switch is typically the fundamental constraint on the maximum powers that can be achieved with a traditional regenerative amplifier. For example, amplification to tens of millijoules generally requires a linear amplifier downstream from the regenerative amplifier. The concepts demonstrated in the prototype WOMPA system 2700 and others above may be used to replace the regenerative amplifier and linear amplifier with one device having fewer parts, thereby reducing system complexity and cost.

Figure 23B:
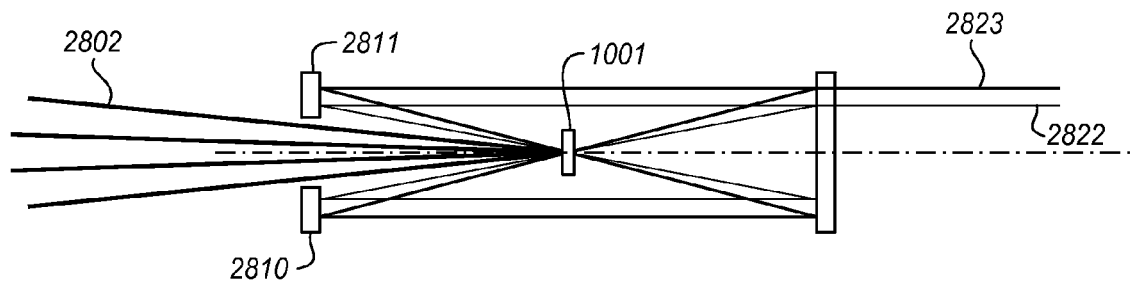
Figure 23C:
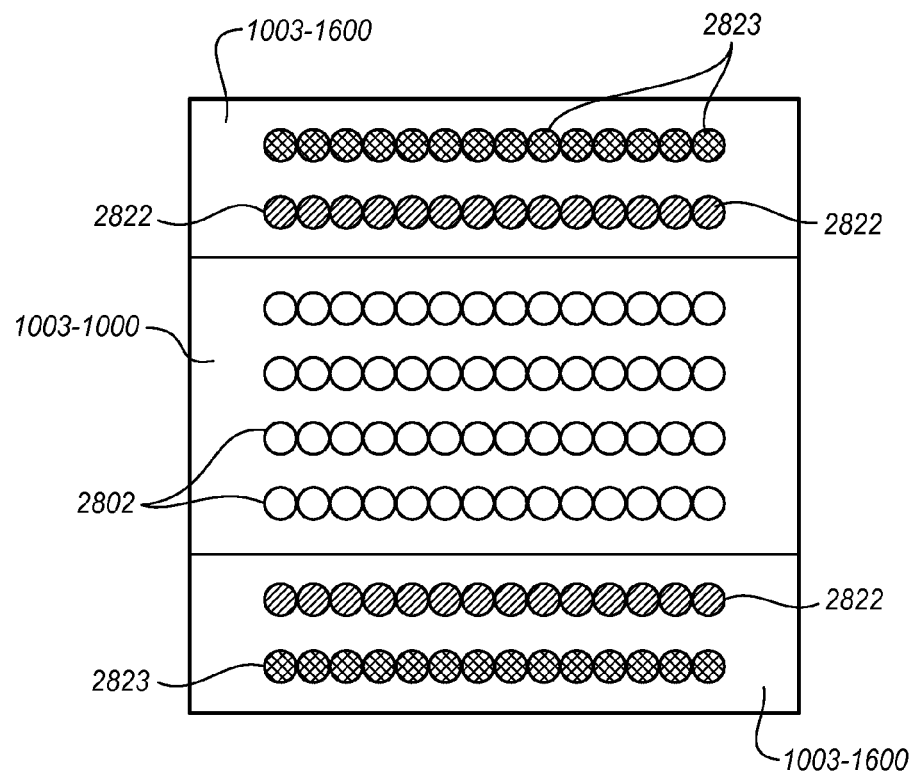

In another embodiment, a new pumping architecture may be based on similar reimaging concepts for the signal beam as presented herein. In this regard, FIGS. 23A-23C depict an exemplary an optical configuration 2800 employing such a pump architecture with the WOMPA system 1600 in combination with the signal beam architecture of the WOMPA system 1000. FIG. 23A is a top view of the optical configuration 2800. As seen in this figure, the WOMPA system 1000 shares a thin disk gain medium 1001 with the WOMPA system 1600. FIG. 23B illustrates a side view of the optical configuration 2800. The optical configuration 2800, as seen in the side view of FIG. 23B with an aperture 2810, allows the signal beam 2802 to pass along multiple paths to the thin disk gain medium 1001. FIG. 23C thus illustrates the view 2811 of the OAPs 1003-1600 and 1003-1000 from the perspective of the thin disk gain medium 1001.

In this embodiment, two separate pump beams 2822 and 2823 are provided to the WOMPA system 1000 entering at two separate elevations. These elevations are illustrated with the view of the OAP 2811 of the OAP 1003-1600 of FIG. 23C. For example, the input pump beam 2823 impinges the OAP 1003-1600 at a location that is different from the input pump beam 2822. Similarly, the signal beam 2802 impinges the OAP 1003-1000 in the center portion of the view 2811 due to the elevation of the signal beam 2810 after passing through the WOMPA system 1000.

The pumping architecture of the optical configuration 2800 may provide several advantages. For example, this architecture may allow a selection of a much larger number of pump passes. With more pump passes, efficient absorption into even thinner disks may be accomplished, which is advantageous because thinner disk gain mediums enable more effective cooling and reduce thermal focusing and birefringence effects as mentioned above. A selection of the number of pump passes may be determined by adjusting the tilt of the pump horizontal multiplexing mirrors 1001 and/or 1002-1600 of the WOMPA system 1600. Another advantage of this architecture resides in scaling. For example, since the pump beams 2822/2823 are combined with the signal beam 2802 on the thin disk gain medium 1001, multiple diode pump systems may be combined and coupled as a single high power fiber for transmission pump laser. As such, lower power pumps may be used with separate fibers to perform beam combining on the thin disk gain medium 1001. Such provides the capability of relatively high power scaling, since the pump power is not limited by the power that could be transmitted by a single fiber. Moreover, should one or more pumps fail, pumping of the thin disk gain medium 1001 may still occur since there is no single point of failure within the WOMPA system 1000. For example, if a system utilizes 10 separate pump fibers to deliver the pump to the WOMPA system 1000, and if one pump goes fails, 90% of the power may still be delivered to the thin disk gain medium 1001. Such may provide a robust packaging solution suitable for military and industrial applications where complete system failure cannot be tolerated.

Combining pump and signal beams on the disk also provides some flexibility in the multi-pass pump design of the WOMPA system 1000. For example, by using multiple pump delivery fibers, any particular fiber diameter can be reduced for the same total pump power. Various optical design constraints related to the pump spot size on the OAPs 1003/1004, focal lengths of the OAPs 1003/1004, and/or numerical apertures of fibers, also make it easier to image surfaces of smaller diameter fibers onto the thin disk gain medium 1001 with an appropriate magnification factor.

Figure 24:
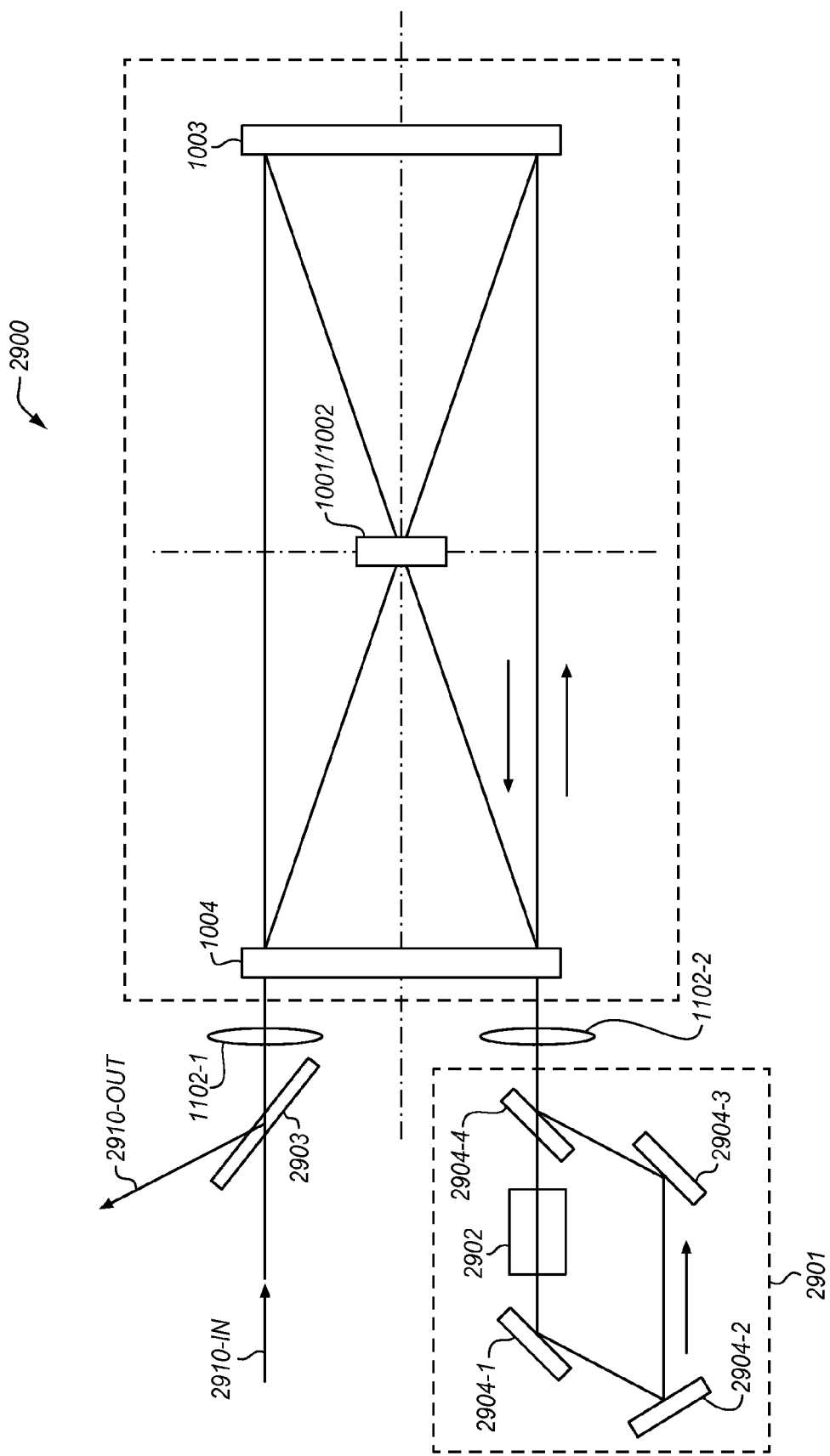

FIG. 24 illustrates another optical configuration 2900 that employs the WOMPA system 1600 of FIG. 11. In this embodiment, laser energy 2910-IN enters WOMPA system 1600 through the optical element 1102-1 (e.g., an optional lens) after passing through a polarization beam splitter 2903 in a particular polarization. The laser energy 2910 experiences multiple passes through the thin disk gain medium 1001 depending on the tilt of the reflective elements (e.g., the reflective element configured with the thin disk gain medium 1001 and/or the reflective element 1002). The laser energy then exits the WOMPA system 1600 into the pulse selection module 2901 through the optical element 1102-2 (e.g., an optional lens).

The pulse selection module 2901 includes a plurality of reflective elements 2904 (e.g., 2904-1 . . . 4) that are operable to direct the laser energy 2910 back into the WOMPA system 1600. The pulse selection module 2901 is operable as a switch, providing a certain optical path length based on the number of reflective elements 2904 within the pulse selection module 2901. For example, the pulse selection module 2901 may be used to block ASE except for a short time window, which is matched to allow the amplified pulse to pass. The pulse selection module 2901 is synchronized with respect to the input pulse to open just in time and let the amplified pulse through, closing shortly thereafter. It is important to note that the pulse selection module 2901 has no requirement for the disposition of the pulse energy 2910 when the pulse selection module 2901 is not configured to pass the pulse energy 2910. Unlike optical configurations for traditional regenerative amplifiers, this pulse selection module 2901 is used to suppress unwanted radiation and allow passage of the amplified pulses. The pulse selection module 2901 does not necessarily need to redirect pulse energy.

The pulse selection module 2901 may include an electro-optic modulator 2902 or other polarization rotator to rotate the polarization of the laser pulses in the laser energy 2910 to a particular polarization. One or more of the reflective elements 2904 may be polarization beam splitters that filter off the undesirable polarizations within the laser energy 2910 to allow the laser pulses of the desired polarization to return to the WOMPA system 1600 for further amplification. In this regard, the reflective element 2904-4 may be a polarization beam splitter that allows the laser energy 2910 to pass into the pulse selection module 2901 just as the polarization beam splitter 2903 allows the laser energy 2910 to enter into the WOMPA system 1600.

After entering into the pulse selection module 2901, the electro-optic modulator 2902 rotates the polarization of the laser energy 2910. The laser energy 2910 then propagates through the pulse selection module 2901 according to the reflective elements 2904-1 through 2904-3 until it reaches the reflective element 2904-4. From there, the laser energy 2910, due to its changed polarization, reflects off the reflective element 2904-4 to return into the WOMPA system 1600 through the optical element 1102-2. The laser energy then undergoes multiple passes again through the WOMPA system 1600 to exit the WOMPA system 1600 through the optical element 1102-1 (i.e., the laser energy 2910-OUT). For example, due to its change polarization, the laser energy 2910 reflects off the polarization beam splitter 2903 and exits the optical configuration 2900. Thus, the optical configuration 2900 has provided a 2× factor of gain via the WOMPA system 1600. In one embodiment, one of the reflective elements 2904 may be partially transmissive so as to allow a portion of the laser energy 2910 to pass and be detected by an optical detector such that the gain of the WOMPA system 1600 may be feedback controlled, as described above. It should be noted that the electro-optic modulator 2902 may be a passive nonlinear device, where nonlinear self-rotation of the polarization is used to self-select the transmission of high intensity pulses.

Figure 25:
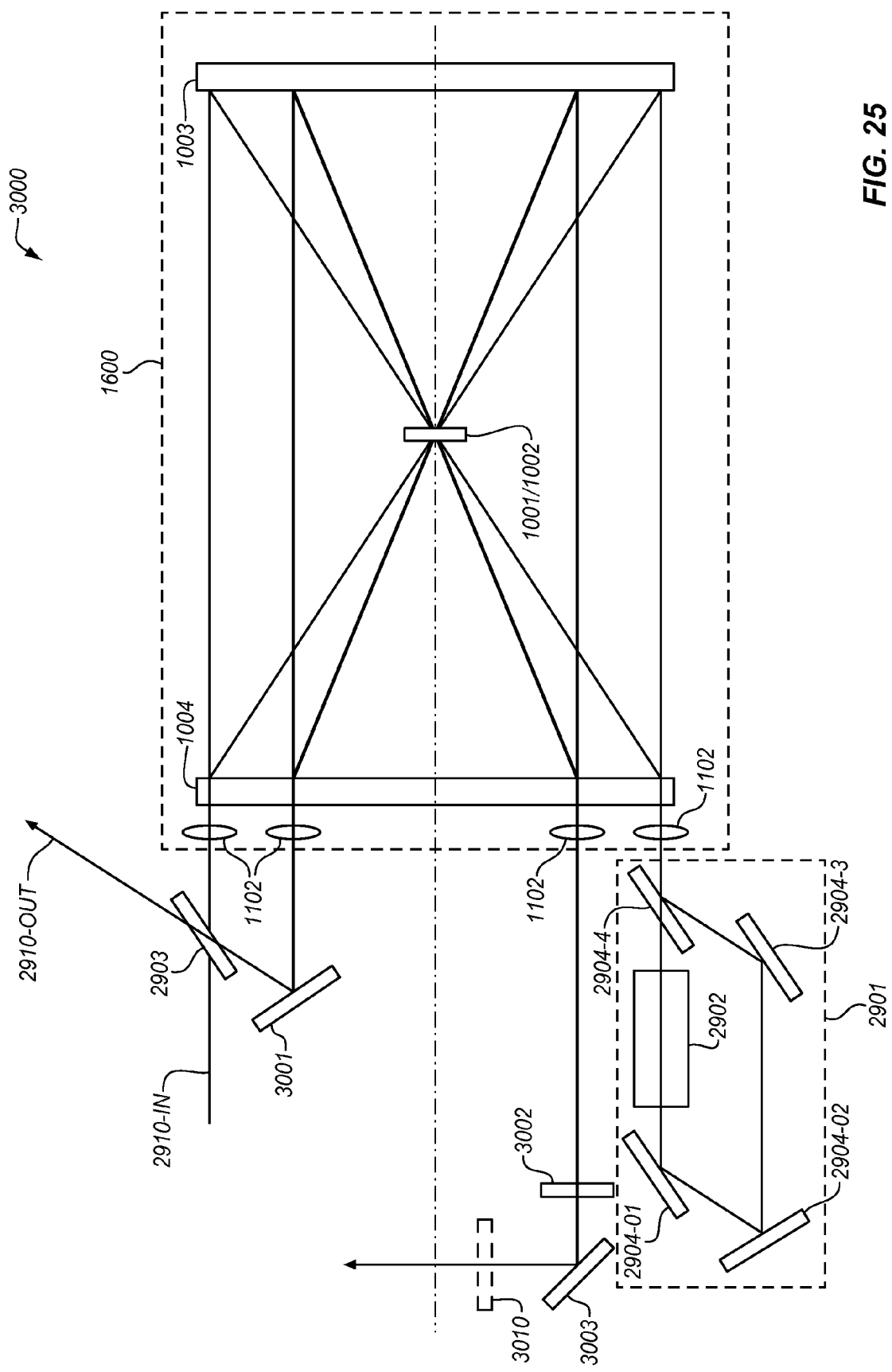

FIG. 25 illustrates another optical configuration 3000 that employs the WOMPA system 1600 of FIG. 11. In this embodiment, the laser energy 2910-IN enters the WOMPA system 1600 by first passing through the polarization beam splitter 2903 and the optional optical element 1102. The laser energy 2910 passes through the thin disk gain medium 1001 multiple times before entering the pulse selection module 2901. Again, the electro-optic module 2902 of the pulse selection module 2901 rotates the polarization of the laser energy 2910 such it that may reenter the WOMPA system 1600. Differing from the optical configuration 2900 illustrated in FIG. 24, however, is that the beam polarization splitter 2903 is positioned to reflect the laser energy to the reflective element 3001 such that it reenters the WOMPA system 1600 as opposed to exiting the optical configuration 3000. In this regard, the laser energy propagates along a different path through the WOMPA system 1600 such that it again impinges the thin disk gain medium 1001 multiple times and exits the WOMPA system 1600 (i.e., on a different path). The laser energy then impinges an optical element 3002 (e.g., a quarter wave plate or 45 degree polarization rotator, such that the polarization is rotated by 90 degrees after double passing) such that the polarization of the laser energy 2910 is again modified in polarization. In this regard, a portion of the laser energy 2910 may pass through the optical element 3002 and reflects off the reflective element 3003 to exit the system 3000 (e.g., for diagnostic purposes and/or feedback control). For example, a thin-film polarizer may be partially transmissive such that a portion of the laser energy passes through while returning the remaining portion of the laser energy in a rotated polarization to the WOMPA system 1600. After reentering the WOMPA system 1600, the laser energy 2910 propagates through the WOMPA system 1600 multiple times, again impinging the thin disk gain medium 1001 multiple times before finally exiting the WOMPA system 1600 to the reflective element 3001. As the polarization of the laser energy 2910 has been rotated by the optical element 3002, the laser energy then reflects off the optical element 3001 through the beam polarization splitter 2903 to exit the optical configuration 3000. Accordingly, the gain has been increased by a factor of 2× over the embodiment illustrated in FIG. 24 with the relatively simple addition and positioning of a few optical elements (i.e., 2903, 3001, and 3002).

Optionally, the laser energy passing through the optical element 3002 may reflect off the reflective element 3003 and impinge a mirror 3010 to direct a signal beam back through the WOMPA system 1600. If 3002 is a quarter wave plate or 45 degree polarization rotator, then the returned polarization will rotate by 90 degrees and pass out through 2910-OUT. Without the optical element 3002 and a mirror 3010, the signal beam simply exits after reflecting from the reflective element 3003. Thus, the optical configuration 3000 illustrates two means for ejecting the laser energy 2910.

FIGS. 26A and 26B illustrate another optical configuration 3100 that employs the WOMPA system 1600 of FIG. 11. More specifically, FIG. 26A illustrates the WOMPA system 1600 is configured with a background suppression module 3101. The background suppression module may consist of a saturable absorber mirror (e.g. a SESAM) to suppress background low level radiation. Alternatively, the background suppression module 3101 may consist of multiple components. FIG. 26B provides a more detailed illustration of one embodiment of the background suppression module 3101.

In this embodiment, the laser energy 2910 enters the WOMPA system 1600 by passing through the polarization beam splitter 2903 and the optical element 1102-1 making multiple passes through the gain medium 1001. The laser energy exits the WOMPA system 1600 through the optical element 1102-2 where it passes through a quarter wave plate 3102 (or polarization rotator, so that the polarization is rotated by 90 degrees after double passing). The quarter wave plate 3102 rotates the polarization of the laser energy 2910 where it enters the background suppression module 3101.

As illustrated in FIG. 26B, the background suppression module 3101 may be configured of a variety of optical elements so as to suppress background radiation, including a transmissive saturable absorber 3106, lenses 3103 and 3104, and a highly reflective mirror 3105. The lenses 3103 and 3104 are operable to provide high intensities in a smaller spot size within the transmissive saturable absorber 3106. The saturable absorber 3106 operates to allow passage of only high intensity light and block (or less efficiently transmit) less intense light. The laser energy 2910-A passes through the saturable absorber 3106 and is recollimated for reflection from highly reflective mirror 3105. After reflection from the highly reflective mirror 3105, the laser energy 2910-B reverses propagation direction for a second pass through the saturable absorber 3106 and is recollimated for exit from the background suppression module 3101. The background suppression module 3101 is operable to absorb background optical energy and ASE and improve the pulse contrast ratio of the amplified output pulses. Once the laser energy 2910-B exits the background suppression module 3101, it return propagates to the WOMPA system 1600 for multiple return passes through the gain medium 1001. In return propagating to the WOMPA system 1600, the laser energy 2910 passes through the thin film polarizer 3102 for another polarization rotation such that the laser energy 2910 may exit the optical configuration 3100. For example, once the laser energy 2910 exits the WOMPA system 1600 from its return propagation, the laser energy 2910 is rotated in polarization such that it reflects off the beam polarization splitter 2903 to exit the optical configuration 3100.

Figure 27:
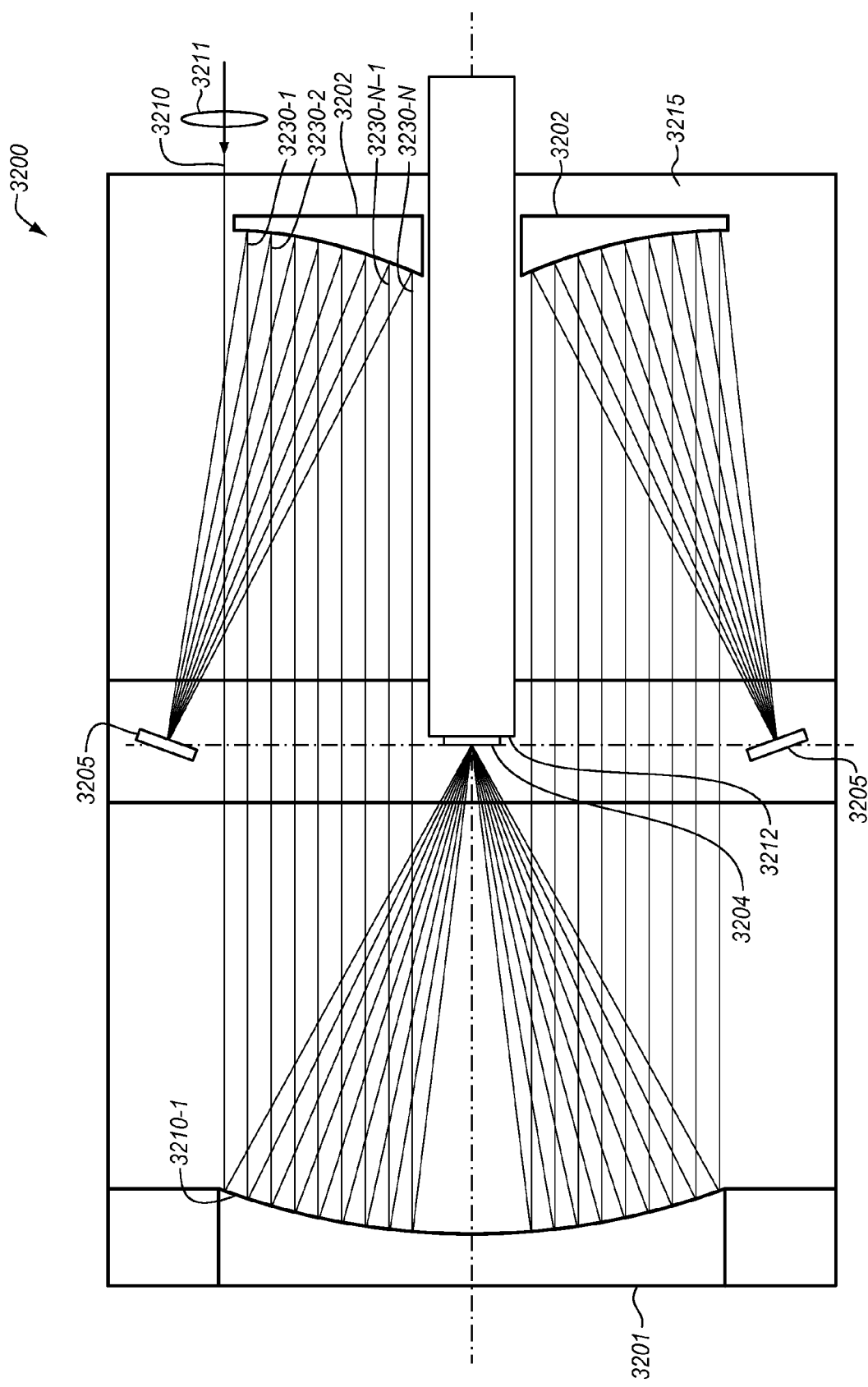
Figure 28:
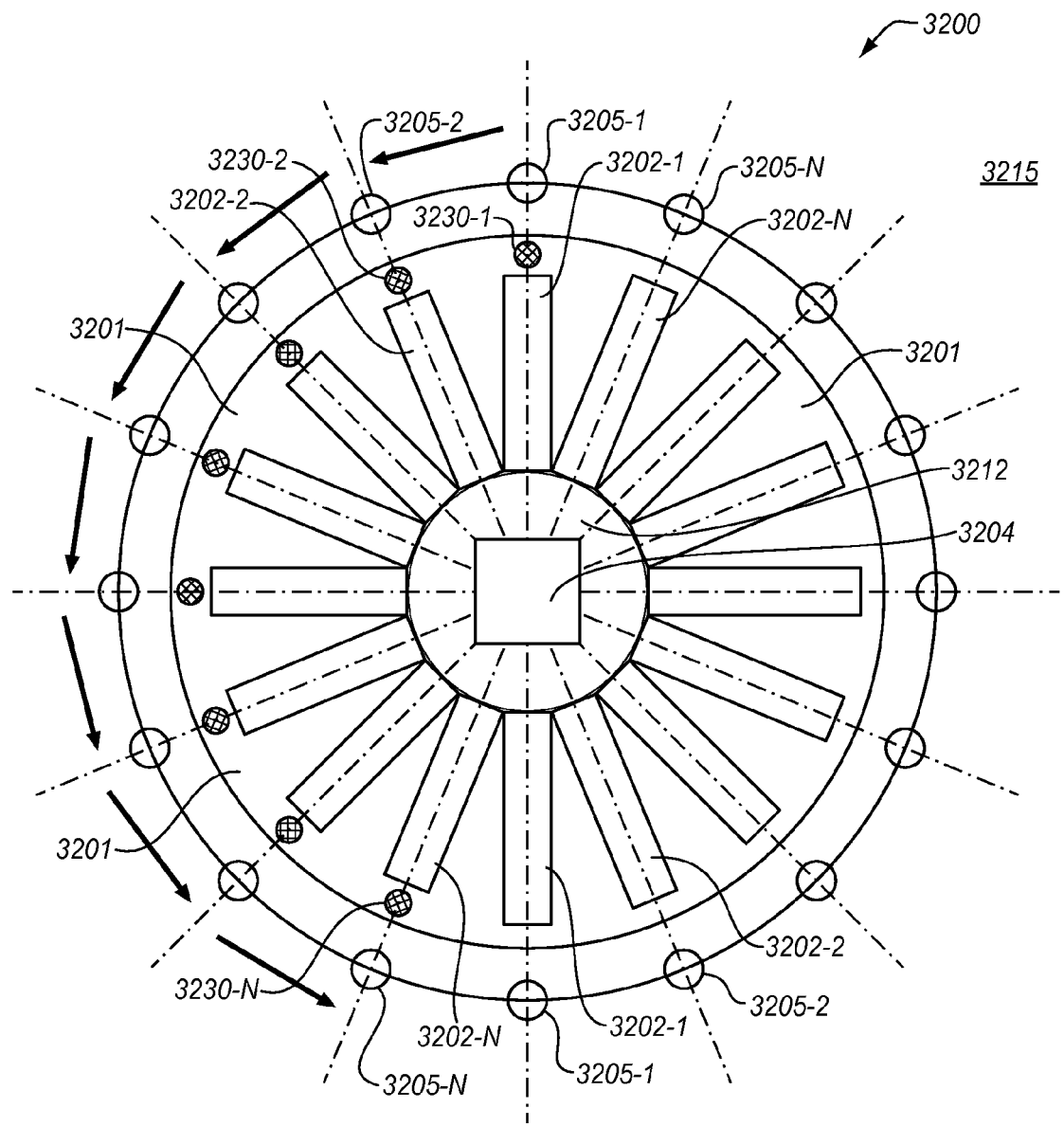

FIGS. 27 and 28 illustrate an alternative WOMPA system 3200 employing multiple OAPs 3202, and a parabolic reflector 3201. More specifically, FIG. 27 illustrates a side view of the WOMPA system 3200 whereas FIG. 28 illustrates an end in view 3215 of the WOMPA system. In this embodiment, the OAPs 3202 approximately comprise half the parabolic surface of the parabolic reflector 3201. With this configuration, laser energy 3210 enters the WOMPA system 3200 via the optical element 3211 (e.g., an optional lens) at an elevation above the OAP 3202 to propagate to the parabolic reflector 3201. The laser energy 3210 then reflects off the parabolic reflector 3201 at the beam spot location 3210-1 to the thin disk gain medium and reflector 3204 affixed to the mount 3212. The laser energy 3210 reflects back to the parabolic reflector 3201 for reflection to the lower OAP 3202. Once the laser energy 3210 impinges the lower OAP 3202, it propagates to the lower reflective element 3205 and back to the lower OAP 3202 for a return trip. That is, the laser energy 3210 reflects off the lower OAP 3202 to the parabolic reflector 3201, then to the gain medium 3204, then to the parabolic reflector 3201, then to the upper OAP 3202, and then to the upper reflective element 3205 for a single round-trip pass through the WOMPA system 3200. Also illustrated in this embodiment is optical element 3211 (e.g., a lens) that is operable to form an intermediate focus within the WOMPA system 3200.

The WOMPA system 3200 is configured to propagate the laser energy 3210 via such round-trip passes through the system multiple times until the laser energy 3210 exits the WOMPA system 3200 via the point at which it entered at the optical element 3211. For example, the laser energy 3210 may reflect off the upper OAP 3202 at the location 3230-1 during a single round-trip pass through the WOMPA system 3200. The laser energy 3210 may then reflect off the upper OAP 3202 at the location 3230-N on the next round-trip pass through the WOMPA system 3200 (i.e., where N is simply an integer greater than 1 although not necessarily equal to any other N integer designators referenced herein). On the next round-trip pass, the laser energy reflects off the location 3230-2, and then location 3230-(N−1), and so on. The laser energy 3210 makes a number of round-trip passes through the WOMPA system 3200 until the laser energy 3210 reflects off the OAP 3202 at the location 3230-1 during the last round-trip pass through the WOMPA system 3200 until exiting the WOMPA system 3200 via the optical element 3211.

Figure 29:
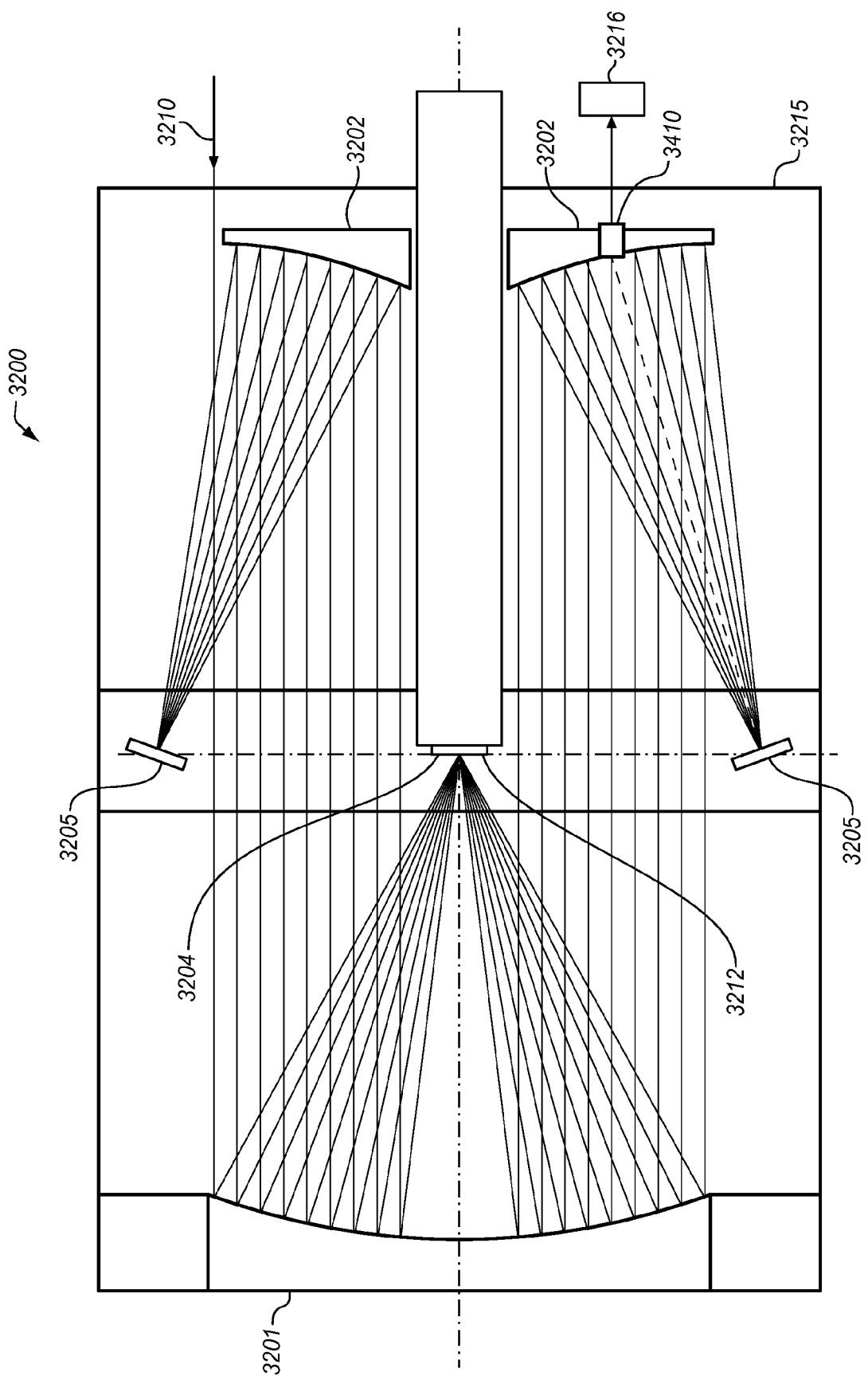

Although FIG. 27 shows the laser energy 3210 entering and exiting the WOMPA system 3200 along the same path, using concepts previously described in this description, it should be recognized that the laser energy entrance and exit beam paths may be displaced in a direction normal to the page of FIG. 29. In this case, separate lenses 3211, displaced in a direction perpendicular to the page of FIG. 27, may be required to focus the input laser energy 3210 and collimate the output laser energy 3210.

To make the laser energy 3210 exit the WOMPA system 3200, the upper OAP 3202 reflects the laser energy 3210 one less time than the lower OAP 3202. In this embodiment, the laser energy 3210 reflects off the upper OAP 3202 at eight locations 3230. Thus, the lower OAP 3202 includes nine locations at which to reflect the laser energy 3210. In this regard, the laser energy 3210 makes a total of 17 passes through the gain medium 3204 before exiting the WOMPA system 3200.

The number of complete passes of the laser energy 3210 through the gain medium 3204, however, is determined by the tilt of the reflective elements 3205, with consideration being given to the beam spot size of the laser energy 3210 on the OAPs. For example, tilting one or more of the reflective elements 3205 may change the number of times that the laser energy 3210 impinges the OAPs 3202 and 3203, accordingly changing the number of times the laser energy 3210 passes through the gain medium 3204. However, the tilt of the reflective elements 3205 may be such that the beam spots at the locations 3230-1 . . . 3230-N do not overlap as a consequence of aligning the system so that 3230-1 lies entirely on OAP 3202. More specifically the tilt should be sufficient to ensure that the laser energy 3210 impinging on the OAP 3202 at the location 3230-1 does not fall off the edge of the OAP 3202.

The number of passes that the laser energy 3210 makes through the gain medium 3204 may be further increased through the rotational propagation of the laser energy through WOMPA system 3200. Such is illustrated in FIG. 28. FIG. 28 illustrates an end view of the WOMPA system 3200. The laser energy 3210 enters the WOMPA system 3200 and impinges the parabolic reflector 3201 at the beam spot 3230-1. The laser energy 2910 then makes several passes through the WOMPA system 3200 via the OAPs 3202-1 (i.e., the first labeled pair of upper and lower OAPs 3202), the reflective elements 3205-1 (i.e., the first labeled pair of upper and lower reflective elements 3205), and the thin disk gain medium/reflective element 3204. That is, the laser energy 3210 enters the WOMPA system 3200 at the beam spot 3230-1 on the parabolic reflector 3201 and makes the plurality of passes through the WOMPA system 3200 based on the tilt of the reflective elements 3205-1 before exiting the WOMPA system 3200 from the OAP 3201 at the beam spot 3230-1.

This exiting laser energy 3210 may be redirected to the WOMPA system 3200 to enter at the beam spot 3230-2 on the parabolic reflector 3201 to again make multiple passes through the WOMPA system 3200. This recirculation of the laser energy 3210 through the WOMPA system 3200 may substantially increase the gain of the laser energy 3210. For example, assume that the pair of OAPs 3202-1 is capable of reflecting at a total of 17 non-overlapping locations, as illustrated in FIG. 27. By positioning OAP pairs about a circle, a number of multiple passes through the gain medium 3204 may be increased based on the number of OAP pairs about the circle. In this embodiment, eight pairs of OAPs 3202 about the circular WOMPA system 3200. Accordingly, the WOMPA system 3200 may be configured to propagate the laser energy 3210 through the gain medium 3204 a total of 136 times in this embodiment. However, the inventions is not intended to be so limited as the pairs of OAPs 3202 may be operable to reflect at more beam spot locations depending on the size of the beam spot. In some embodiments, a single pair of OAPs 3202 may be operable to propagate the laser energy 3210 through the gain medium 3204 by as much as 205 times or more.

To redirect the laser energy 3210 into the WOMPA system 3200 after the laser energy 3210 exits via the OAP location 3210-1, the WOMPA system 3200 may be configured with additional optical elements. For example, the laser energy 3210 may first pass through a beam thin film polarizer (not shown) and then a polarization modifying element (e.g. a polarization rotator or a quarter waveplate, so that after a return pass, the polarization is rotated by 90 degrees). Upon exiting the WOMPA system 3200 at the location 3230-1, the laser energy 3210 may again pass through the polarization modifying element, so that the polarization is rotated by 90 degrees relative to the input polarization and then is reflected from the thin film polarizer to another reflective element (not shown) that directs the laser energy 3210 into the WOMPA system 3200 at the location 3230-2 for interaction with the pair of OAPs 3202-2. This process may continue through the pair of OAPs 3205-N until the laser energy exits the WOMPA system 3200 from the beam spot 3230-N of the parabolic reflector 3201. Alternatively, if an odd number of round trips is used within each pair of the OAPs 3202 and a quarter-wave plate is utilized with one of the pair of reflectors 3205 as illustrated by quarter-wave plate 1010 in FIG. 5, the input and output polarization will be rotated by 90 degrees and can be separated by a thin film polarizer.

The number of pairs of OAPs 3202 is not intended to be limited to the illustrated example. For example, eight pairs of OAPs 3202 are illustrated in FIG. 28. However, the number of OAP pairs 3202 within the WOMPA system 3200 may only be limited by beam spot sizes and corresponding widths of the OAPs 3202. Moreover, the pairs of OAPs 3202 may be cut from a single parabolic reflector similar to that of the parabolic reflector 3201. Additionally, the invention is not intended to be limited to simply a single beam of laser energy 3210 (e.g., a signal beam) entering the WOMPA system 3200. As with other embodiments above, the WOMPA system 3200 may be configured to receive one or more pump beams through the input/output beam spot locations 3210-1-N through a corresponding number of pairs of OAPs 3202. For example, the pairs of OAPs 3202-1 and 3202-2 may be used to pump the gain medium 3204 while one or more of the remaining pairs of OAPs 3202 may be used to induce gain in the signal beam. In yet another embodiment, certain pairs of the OAPs 3202 may be used to pump the gain medium at different wavelengths to provide certain optical effects when a signal beam extracts gain from the gain medium 3204. Accordingly, the inputs of laser energy 3210 to various pairs of OAPs 3202 within the WOMPA system 3200 are not intended to be limited to any particular type of laser energy, as such may be a matter of design choice.

This embodiment may have certain other advantages in that the multi-pass WOMPA system 3200 may be configured in a relatively compact fashion even though the effective length of the optical region has been increased. Additionally, the mount 3212 for the thin disk gain medium 3204 may be configured along the length of the WOMPA system 3200 as shown so as to provide additional physical space for cooling mechanisms that may be used to cool the thin disk gain medium 3204. For example, the mount 3212 with a liquid cooling mechanism such as that disclosed in the '394 patent application.

Although shown and described with respect to the thin disk gain medium 3204 being configured with the mount 3212, the invention is not intended to be so limited. For example, thin disk gain mediums may be additionally or alternatively configured with a reflective element 3205. Such may have the effect of providing multiple gain mediums within a single laser system so as to further stimulate gain in the laser energy 3210.

Although FIG. 28 shows the laser energy 3210 entering and exiting the WOMPA system 3200 along the locations 3230-1 through 3230-N, using concepts previously described in this description, it should be recognized that the laser energy entrance and exit beam paths may be displaced for each of the of the locations 3230, so that the input pulse energy 3210 and output pulse energy for each OAP pair, need not overlap. Additionally, it should be noted that the beam paths for each pair of OAPs 3202 may be used for separate laser energies 2010. For example, a pair of OAPs 3202 may be used for the pump beam, one or more beam paths for distinct signal beams, and/or one or more beam paths for distinct beams for gain clearing.

Figure 30:
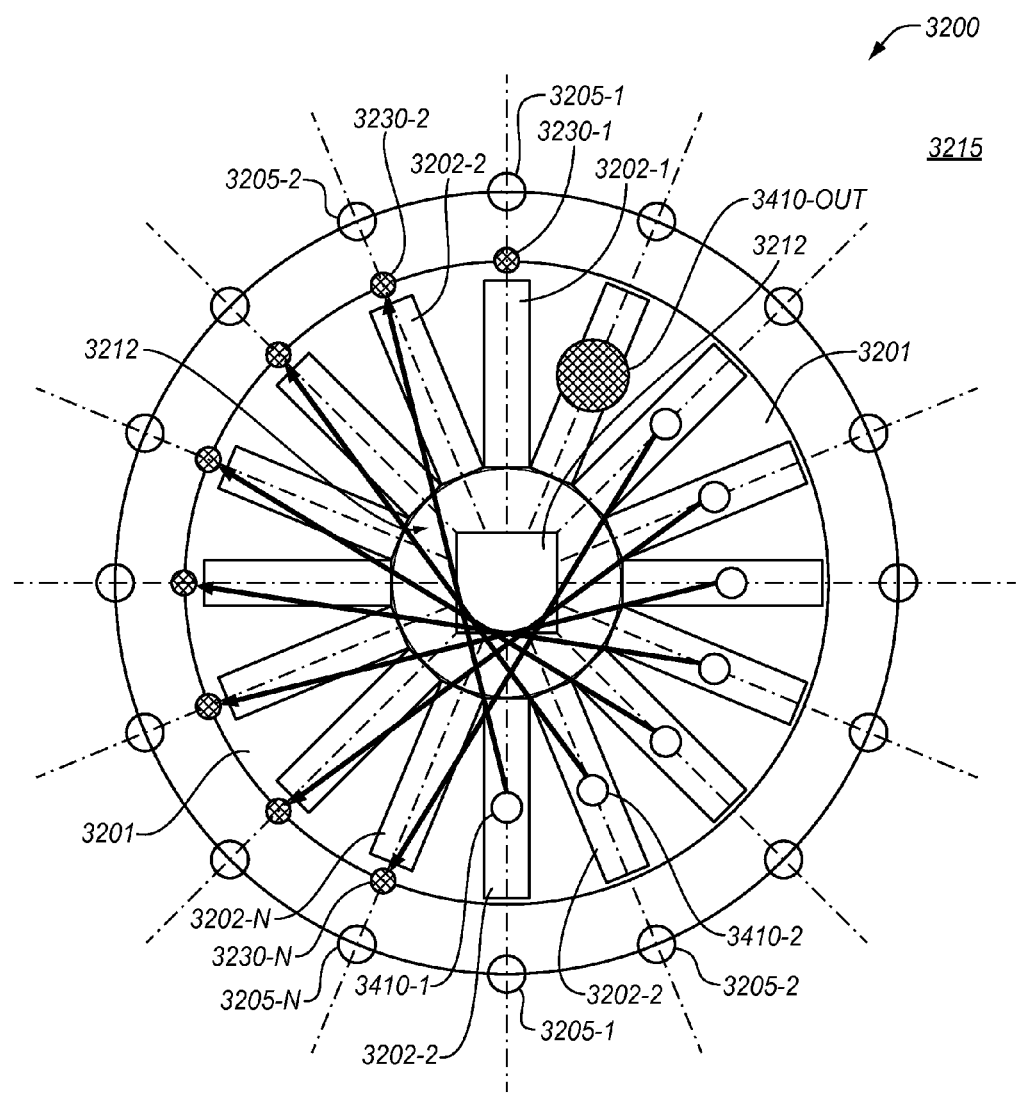

Alternatively, in FIG. 29, the WOMPA system 3200 is configured with apertures 3410 in the lower of the OAP pairs 3202 that are used to provide an output along a separate path from the input for laser energy 3210. The apertures 3410 are operable to output the laser energy 3210 from the WOMPA system 3200 after a certain number of passes through the gain medium 3204 as described above in FIG. 27. The dashed line from the aperture 3410 to the reflective lower reflective element 3205 is approximately perpendicular to the lower reflective element 3205. Thus, after exiting through the aperture 3410-1 of the lower OAP 3202-1, the laser energy is redirected by the optical redirector 3216 into the WOMPA system 3200 through the input beam spot location 3230-2 as illustrated in FIG. 30. The optical redirector 3216 may consist, simply of one or more mirrors. The lower OAP 3202 of the pair of OAPs 3202-2 may be similarly configured with an aperture 3410-2 that allows the laser energy 3210 to exit the WOMPA system 3200 for redirection into the WOMPA system 3200 and a return multi-pass trip. This process of redirection of laser energy 3210 into the WOMPA system 3200 may continue until the laser energy 3210 passes through each of the pairs of OAPs 3202, ultimately exiting from the output aperture 3230 of the WOMPA system 3200.

Figure 31:
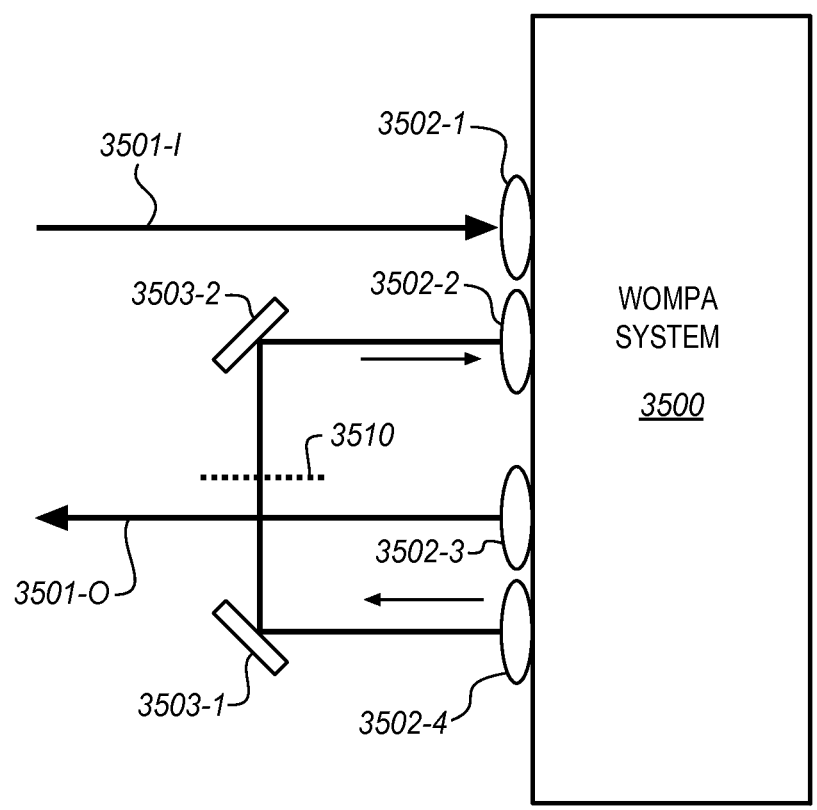

FIG. 31 illustrates a WOMPA system 3500 employing redirection of laser energy 3501 into the WOMPA system. The WOMPA system 3500 may be representative of any of the WOMPA systems described herein in which laser energy is redirected into the WOMPA system. This embodiment of the WOMPA system 3500 illustrates various focal considerations that may be used when redirecting the laser energy 3501 into the WOMPA system. In this regard, slight geometric corrections may be provided when redirecting the laser energy within the WOMPA system 3500 without the use polarization based or birefringent optics.

In this embodiment, the lenses 3502-1 through 3502-4 have focal lengths of approximately $f_L$. An input beam of the laser energy 3501-I enters the WOMPA system 3500 via the lens 3502-1. The laser energy 3501 exits a first loop of the WOMPA system 3500 and is collimated by the lens 3502-4. The mirrors 3503-1 and 3503-2 redirect the laser energy 3501 into the WOMPA system 3500 through lens 3502-2. The optical path length between the lens 3502-2 and the lens 3502-4 is approximately $2 \cdot f_L$. Thus, the image of the thin disk gain medium (not shown) inside the WOMPA system 3500 from the last bounce in the first loop is imaged at the location 3510, resulting in that image being imaged on the gain medium at the first bounce of the second loop through the WOMPA system 3500. In other words, laser energy 3501 from the lens 3502-1 to the lens 3502-4 is imaged on the position 3510 which is also matched with the image from the lens 3502-2 to the lens 3502-3. Accordingly, consistent conjugate image planes are maintained throughout multiple passes through the WOMPA system 3500. The laser energy 3501 ultimately exits the WOMPA system 3500 as the output beam 3501-O.

The WOMPA system 3500 provides the inherent ability to account for phase distortion in the laser energy 3501. For example, phase corrections and/or phase measurements can be made with relative ease at any of the conjugate image planes of the gain medium before, after, or within any of the WOMPA loops. The beam intensity profile on the gain medium of the WOMPA system 3500 is also more uniform on the subsequent loops through the WOMPA system. Although shown and described with respect to redirection of the laser energy 3501 into the WOMPA system 3500, the invention is not intended to be so limited. For example, the focal considerations described herein may also be employed for redirection of the laser energy 3501 into another WOMPA system. Accordingly, this embodiment merely intends to show that upstream conjugate image planes may be the same as downstream conjugate image planes based on the focal lengths of the WOMPA system 3500.

Figure 32:
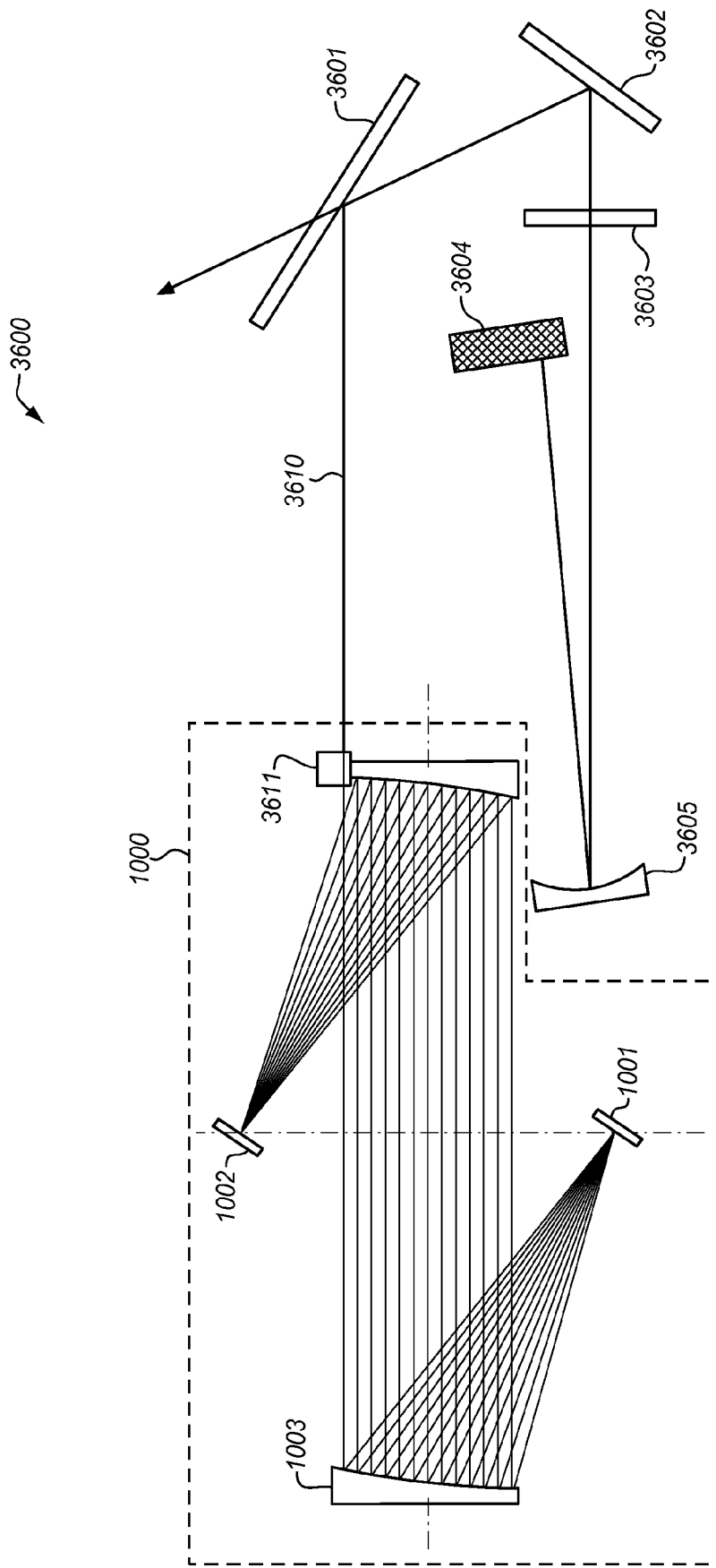

FIG. 32 illustrates another optical configuration 3600 that employs the WOMPA system 1000 as a gain element within an oscillator cavity. In this case, the laser energy 3610 is initiated from fluorescence within the cavity. In this embodiment, after previous round trip passes, the laser energy 3610 enters the WOMPA system 1000 by first passing through optical element 3611, which may be a lens to cause an intermediate focus to be formed in the beam between the two OAPs. On the return trip through the WOMPA system 1000, the laser energy 3610 reflects off the polarization beam splitter (e.g. thin film polarizer) 3601 to the reflective element 3602 (e.g., a highly reflective mirror). After reflecting off the reflective element 3602, the laser energy 3610 passes through a polarization adjusting element (e.g. a wave plate or polarization rotator) 3603, which creates a relatively small polarization component in the plane of the paper. Thereafter, the laser energy 3610 propagates to the focusing element 3605 and to a saturable absorbing mirror (SAM) 3604 (e.g., SESAM, or other device for saturable attenuation and reflection, as similarly illustrated in FIG. 26B) which is operable to configure the optical configuration 3600 as a mode locked system useful in generating ultra short laser pulses. The SAM 3604 may also be used to filter certain undesirable portions of the laser energy 3610 as described above. Optionally, the wave plate or polarization rotator 3603 may also include an electro-optic modulator to allow for cavity dumping operation the oscillator cavity.

Low intensity radiation within laser energy 3610 is attenuated by SAM 3604, whereas high intensity mode locked pulses within laser energy 3610 allowed to circulate with the cavity without attenuation. The laser energy 3610 is reflected back from SAM 3604 to focusing element 3605 and through polarization adjusting element 3603, further increasing a polarization component in the plane of the paper. After reflection from mirror 3602, laser energy impinges on the thin film polarizer 3601. The component of the laser energy 3610 (i.e. in the plane of the paper) is transmitted through the thin film polarizer 3601, whereas the remaining laser energy 3610 is reflected from thin film polarizer 3601 and cycled through a further loop of the WOMPA system 1000. The laser energy 3610 that cycles through the WOMPA system 1000 consists of mode locked cavity modes. Thin film polarizer 3601 is an output coupling for the laser cavity and transmits a pulse on every round trip of the laser energy 3610. By adjusting the polarization adjustment element 3603, the proportion of energy that is transmitted through the thin film polarizer 3601 on each round trip may be controlled. It is important to recognize that focusing element 3605 may be replaced by any number of combinations of transmitting or reflective optics to form an optical laser cavity. It should also be noted that the SAM 3604 may be replaced with other optical elements capable of attenuating low intensity radiation while passing high intensity radiation (e.g. saturable absorbers, nonlinear media and apertures). Additionally, dispersive optical components (e.g. prisms, chirped mirrors, gratings, dispersive transmissive materials) may be added to optimize the round trip dispersion for mode-locking.

The embodiment shown in FIG. 32 has several important features. For example, by adjusting the tilt on the reflective element 1002, the number of passes through the thin disk gain medium 1001 may be adjusted, thereby modifying the round trip gain within the oscillator and consequently modifying the output pulse energy. Since a modification of the number of round trips in the WOMPA system 1000 changes that total roundtrip time within the oscillator 3600, adjustments in tilt on the reflective element 1002 also can be used to adjust the repetition rate of oscillator output. It should also be noted that reflective element 1002 may be implemented as a dispersion management mirror or device (e.g., a Gires-Tournois Interferometer or "GTI" Mirror).

It should be noted, however, that the optical configuration 3600 may be configured to receive optical energy along the beam path 3610 from some external source to operate in the same or similar manner described herein. Accordingly, the invention is not intended to be limited to this exemplary embodiment.

Figure 33:
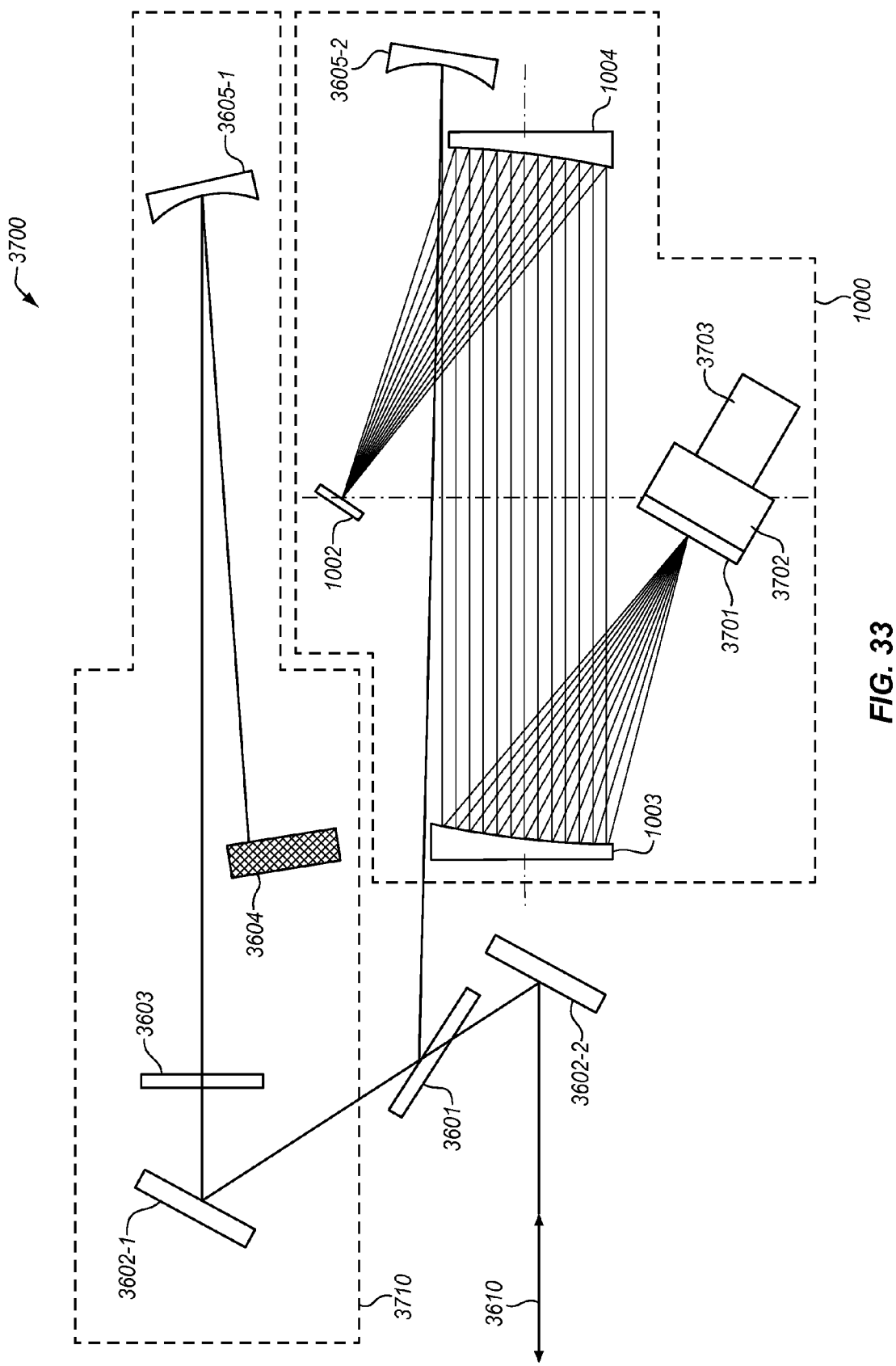

FIG. 33 illustrates another optical configuration 3700 that employs the WOMPA system 1000 as a gain element within an oscillator. This embodiment is very similar to configuration 3600, except that focusing element 3611 is replaced with a focusing mirror 3605-2. Because this embodiment does not have a refractive lens dispersion within the oscillator, it can be more easily managed in terms mode-locking.

The WOMPA system 1000, in this embodiment, is configured slightly different than previous embodiments. Accordingly, the invention is not intended to be limited to any particular embodiment. The reflector 3702 of the WOMPA system 1000 is configured with a saturable absorber 3701 (alternatively the saturable absorber 3701 and the reflector 3702 may be replaced with a SESAM). The reflective element 3702 is configured to pass a certain portion of the laser energy 3610 such that it may be detected by the detector 3703, which is placed behind the reflective element 3702, for diagnostic purposes. For example, with each single trip of the laser energy 3610 through the reflector 3702, the detector 3703 may be operable to determine the amount of gain being imparted on the laser energy 3610 by the WOMPA system 1000. If a change to that gain is desired, the reflective element 3702 may be tilted so as td change the number of locations that the laser energy 3610 impinges the OAPs 1003/1004, accordingly changing the number of times that the laser energy 3610 passes through the gain medium attached to the reflector 1002. Thus, the gain of the laser energy 3610 may be dynamically controlled.

The detector 3703 may be configured in a variety ways as a matter of design choice. For example, the detector 3703 may be an optical detector that digitally captures optical energy passing through the reflective element 3702. The detector 3703 may, in turn, generate an electronic signal representative of the detected optical energy such that a controller, processor, or the like may process the electronic signal to determine the gain of the optical energy. This processor may also be coupled to the reflective element 1002 to tilt the reflective element 1002 and correspondingly change that gain imparted on the laser energy 3610. For example, the reflective element 1002 may be configured with an electromechanical device that is operable to tilt the reflective element 1002 when actuated by a control signal from the processor. Alternatively, the detector 3703 may be configured as a camera (possibly including additional focusing optics) or a detector array so as to independently detect the angularly separated energy and beam size of each pass on the reflective element 3702. If the detector 3703 is configured as a camera, so as to detect the spot size of each pass of the laser energy 3610 on reflective element 3702, this information may be used to adjust the distance between the OAPs 1003 and 1004 to better compensate for any focus variations in the reflective element 1002 or the gain element affixed thereto.

FIGS. 34A and 34B illustrate an optical configuration 3800 employing the WOMPA system 1600 as an amplifying element within an oscillator. FIG. 34A is illustrative of a side view of the optical configuration 3800 and the WOMPA system 1600 whereas FIG. 34B is illustrative of a top view of the optical configuration 3800. In this embodiment, the WOMPA system 1600 is operable to pump the thin disk gain medium 1001 with the laser energy 3820. As an oscillator, the signal beam 3210 is generated initially from fluorescence in the gain medium. By tracing the beam path for the signal beam, a signal beam may enter the WOMPA system 1600 to extract energy from the thin disk gain medium 1001 deposited by the pump laser energy 3820. The signal beam may recirculate through the WOMPA system 1600 as recirculating laser energy 3810. The recirculating laser energy 3810 reflects off the OAPs 1003/1004 and the reflective element 1002 passing through the thin disk gain medium 1001 multiple times before exiting the WOMPA system 1600 at the reflective element 3801-1. The reflective element 3801-1 reflects the laser energy 3810 to the reflective element 3801-2 to redirect the laser energy 3810 into the WOMPA system 3800 for another set of passes through the thin disk gain medium 1001. The laser energy 3810 then exits the WOMPA system 3800 and reflects off the focusing mirror 3605 to the end mirror 3608 (which may be configured as a saturable absorber mirror SAM 3604). If the end mirror 3604 is configured as a SAM it operates to pass only high intensity mode-locked pulses of the laser energy 3810 during amplification, as described above. The end mirror 3604 reflects the laser energy 3810 to the focusing mirror 3605 to enter the WOMPA system 1600 for subsequent sets of passes through the thin disk gain medium 1001. The laser energy 3810 continually recirculates through the optical cavity defined by the end mirror 3604 and the output coupler 3802. On reflection of the circulating signal laser energy 3810 from the end mirror 3802, a portion of laser energy is transmitted as output laser energy 3830. If the end mirror 3604 is configured as a saturable absorber and the cavity is configured to generate mode locked pulses, the laser energy will circulate the cavity as a pulse that will transmit an output pulse through the output coupler 3602 on each round trip. The optical configuration 3800 may also be utilized as a high gain CW cavity, where power is continuously re-circulated through the cavity and transmitted from coupler 3602. Additionally, the optical configuration 3800 may be utilized as a Q-switched laser cavity if the output coupler 3802 further includes means for switching transmission (e.g., an electro-optic modulator).

Although shown and described with respect to the pump laser energy 3820 being directed towards the center elevation of the WOMPA system 1600, the invention is not intended to be so limited. For example, additional pump lasers may be configured to stimulate the gain medium 1001 as shown and described above. Additionally, the optical configuration 3800 may be configured in other ways so as to redirect the signal beam laser energy 3810 through the thin disk gain medium 1001 more times than illustrated. Accordingly, this embodiment and those embodiments described above may be combined in a variety ways to yield other configurations that fall within the scope and spirit of the invention.

Figure 35A:
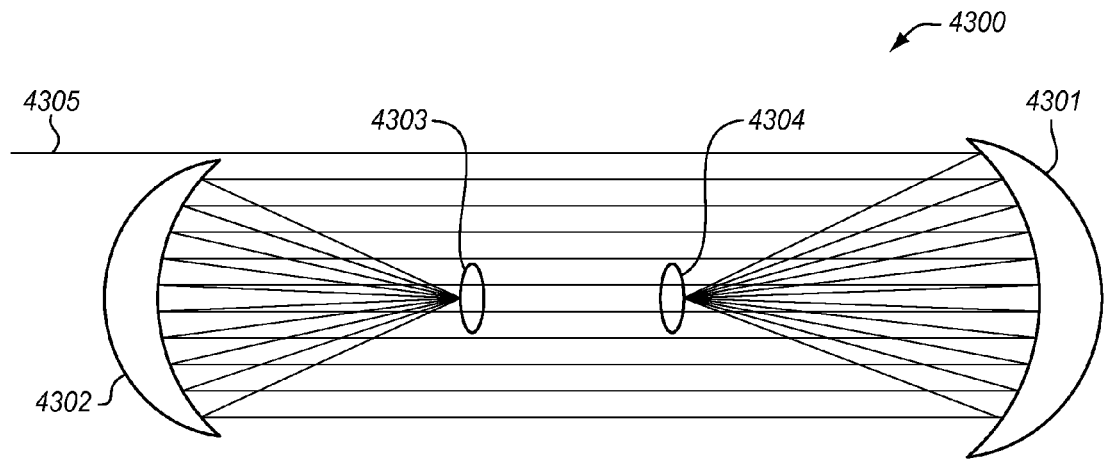
Figure 35B:
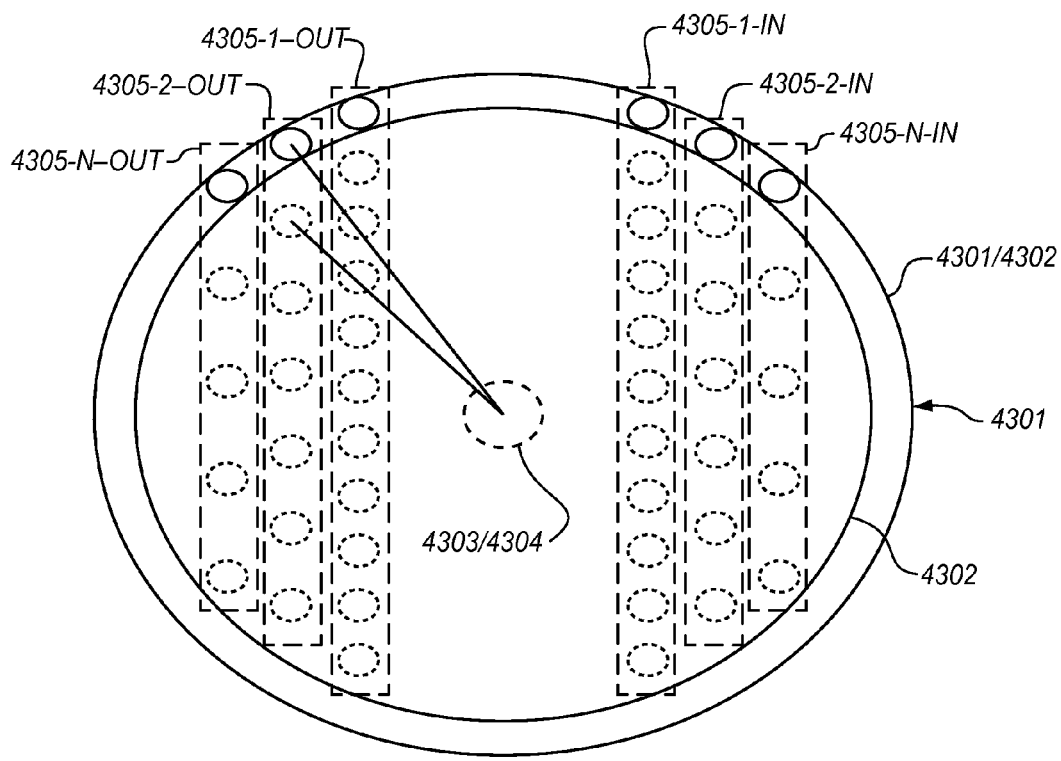

FIGS. 35A and 35B illustrate an axial WOMPA architecture in the WOMPA system 4300. More specifically, FIG. 35A represents a side view of the WOMPA system 4300 whereas FIG. 35B represents a face of a parabolic mirror 4301/4302 used to reflect the optical energy 4305 within the optical configuration of the WOMPA system 4300. In this configuration, the optical axis of the parabolic mirrors 4301 and 4302 are substantially the same, whereas the WOMPA systems 1000 and 1600 above utilize corresponding parabolic reflective elements in which the optical axis are parallel, but distinct. Differing from the WOMPA systems 1000 and 1600 above, the WOMPA system 4300 employs the reflective elements 4303 and 4304 within the optical configuration defined by the parabolic mirrors 4301 and 4302. For example, in the WOMPA systems 1000 and 1600 above, the reflective elements 1001 and 1002 are positioned outside the optical configuration defined by the OAPs 1003 and 1004 to provide an off axis WOMPA embodiment. In this embodiment, however, the optical energy 4305 propagates within the optical region defined by the parabolic mirrors 4301/4302 and 4302, while maintaining an intermediate focus as described in FIGS. 4A and 4B. Similarly, the parabolic mirrors 4301/4302 may be adjusted as described above to compensate for thermally induced focusing/defocusing phase deformation.

The optical energy 4305 enters the WOMPA system 4300 by passing over the parabolic mirror 4302 to reflect off the parabolic mirror 4301. From there, the optical energy propagates to the mirror 4304 to the parabolic mirror 4301 for reflection to the parabolic mirror 4302. The optical energy 4305 then reflects off the parabolic mirror 4302 to the reflective element 4303 for reflection to the parabolic mirror 4302. The parabolic mirror 4302 reflects the optical energy 4305 to the parabolic mirror 4301 for one complete pass through the WOMPA system 4300. Subsequent passes of the optical energy 4305 through the WOMPA system 4300 propagate at different elevations from previous passes through the WOMPA system 4300. For example, subsequent passes of the optical energy 4305 impinges the parabolic mirror 4301 at different elevations in a manner similar to that of the other WOMPA systems above. FIG. 35B illustrates such with the sets of beam spots 4305-1, 4305-2, . . . 4305-N.

FIG. 35B illustrates an end view looking at the WOMPA system 4300 from the parabolic mirror 4302. In FIG. 35B, one beam of optical energy 4305 impinges the parabolic mirror 4301 at the uppermost location on the parabolic mirror 4301 within the set of beam spots 4305-1-IN. The reflective element 4304 reflects the optical energy 4305 to the lowermost location on the parabolic mirror 4301 within the set of beam spots 4305-1-OUT. The parabolic mirror 4301, in turn, reflects the optical energy 4305 to a corresponding beam spot on the parabolic mirror 4302 (i.e., at the same elevation) within the set of beam spots 4305-1-OUT. The parabolic mirror 4302 reflects the optical energy 4305 to the reflective element 4303 for reflection to the parabolic mirror 4302 at the next to the uppermost elevation within the set of beam spots 4305-1-IN. The parabolic mirror 4302 then reflects the optical energy 4305 at the same elevation to the parabolic mirror 4301 for the complete round trip pass through the WOMPA system 4300. On each subsequent round trip, the beam spots are elevated on the 4305-1-OUT column and the beam spot within the 4305-1-IN column is lowered. On the last round trip, the beam exits the WOMPA system 4300 along the uppermost beam spot 4305-1-OUT, clearing the slightly smaller parabolic mirror 4302 as it passes over the top.

As with the previous embodiments, the WOMPA system 4300 may be configured to provide multiple beam paths to a plurality of different beam inputs or even the same beam inputs. For example, FIG. 35B also shows the beam spot columns 4305-2-IN through 4305-N-IN and the corresponding columns 4305-2-OUT through 4305-N-OUT. Either or both of the reflective elements 4303 and 4304 may be configured with a thin disk gain medium that is operable to impart gain on a signal beam as it passes through the WOMPA system 4300. In this regard, the set of input and output beam spots 4305-1 (labeled -IN and -OUT, respectively) may be representative of a signal beam being amplified by the WOMPA system 4300. The set of input and output beam spots corresponding to 4305-2 through 4305-N (also labeled -IN and -OUT, respectively) may be representative of pump laser energy inputs to the WOMPA system 4300 that are used to stimulate the thin disk gain medium such that the gain may be extracted by the signal beam as similarly described above. In this embodiment, each beam path has a separate entrance port over the top and on the right side of element parabolic mirror 4302, and an exit port over the top and on the left side of parabolic mirror 4302. FIG. 35B illustrates the parabolas 4302 and 4301 as circular components, though they may also be configured as square or other shaped elements, so as to optimize the input and output port locations for each of the beam paths.

The invention, however, is not intended to be limited to any particular set of input beams as the WOMPA system 4300 may be configured in a variety of ways subject to design choice. For example, the sets of beam spots 4305-1 through 4305-N may be representative of any combination of signal beam or pump beam. In some embodiments, either above or herein, multiple signal beams may be used. For example, one signal beam may be amplified by the WOMPA systems presented herein while another signal beam of laser pulses may be used as a gain clearing means to assist in lowering the population of the upper energy states in the gain medium. In some embodiments, one set of beam spots may be representative of the redirection of a particular beam on a return trip through the WOMPA system 4300 as described above. Also, the number of beam spots on any particular parabolic mirror are merely intended as being exemplary. As with the above embodiments, the number of beam spots, and thus the number of trips through a thin disk gain medium, may be determined based on the size of the beam of the optical energy 4305, the amount of available real estate on the face of a parabolic mirror 4301/4302, and/or the tilt of one or more of the reflective elements 4303 and 4304. In this regard, the letter N designating a set of beam spots is merely intended as an integer greater than or equal to 1 and not necessarily equal to any other particular N reference designation described herein.

FIGS. 36A and 36B illustrate another axial WOMPA architecture in the WOMPA system 4400. More specifically, FIG. 36A illustrates a side view of the WOMPA system 4400 whereas FIG. 36B illustrates an end view of the WOMPA system 4400 showing rotational redirection of the laser energy 4410. In this embodiment, the WOMPA system 4400 includes the pair of parabolic reflectors 4401 and 4402, an active mirror 4406 (e.g., a highly reflective mirror configured with a thin disk gain medium), a redirection module 4405, a controller 4409, and a deformable mirror 4404. The deformable mirror 4404 is a reflective element that is operable to change its physical aspects when actuated by the controller 4409. For example, the deformable mirror 4400 may include one or more actuators such as piezoelectric devices or bimorph electrode regions for electronically controlling the curvature of the deformable mirror 4400. When a change is desired in the physical shape of the deformable mirror 4400 to, for example, change the direction of the propagation the laser energy 4410 and/or the focusing aspects of the laser energy 4410, the controller 4409 transfers the appropriate shape changing control signal to the actuator to change the shape of the deformable mirror 4404. The controller may also be used to change the spacing between parabolic reflectors 4401.

In terms of laser energy propagation, the WOMPA system 4400 operates in a similar axial manner as illustrated in the WOMPA system 4300 of FIG. 35. Different, however, is the manner in which the laser energy 4410 is redirected within the WOMPA system 4400, as illustrated in FIG. 36B. In FIG. 36B, the laser energy 4410 enters the WOMPA system 4400 through an aperture or clearance in the parabolic reflector 4401 and is incident on redirector module 4405 where it is reflected from the location 4410-1 to the location 4410-2 and directed to parabolic mirror 4402 at the beam spot in line with 4410-1, which reflects the laser energy to the deformable mirror 4404, which in turn reflects the laser energy 4410 to the lower portion of the parabolic mirror 4402, in line with location 4410-4. From there, the laser energy 4410 is incident at the location 4410-4 on the redirection module 4405, where it is reflected to the location 4410-5 on the redirection module prior to being directed to the parabolic mirror 4401. After being reflected from the parabolic mirror 4401, the laser energy 4410 is incident on the active mirror 4406 and is then reflected back to the parabolic mirror 4401 in line with the location 4410-6. The parabolic mirror reflects the laser energy 4410 to the redirection module 4405 at location 4410-6. The redirection module 4405, reflects the laser energy 4410 to location 4410-7 on the relocation module 4405, prior to direction the laser energy 4410 to the deformable mirror 4401. In this embodiment, the reflective elements (i.e., the active mirror 4406 and the deformable mirror 4404) are not tilted to modify the number of the passes. Rather, the ring of reflectors at the outer circumference of the redirection module 4405 is used for that purpose. The redirection module serves to provide multiple spatially separated passes on the active mirror.

The active mirror 4406 is imaged onto the deformable mirror 4404 and the deformable mirror 4404 is imaged onto the active mirror 4406, so that the elements are on conjugate image planes. In this regard, the deformable mirror 4404 of the WOMPA system 4400 may be adjusted without a pump laser energy source such that the conjugate image of the beam spot of the active mirror 4406 appears on the deformable mirror 4404. Thus, as power increases, the deformable mirror 4404 may be optimized to maintain maximum beam spot size.

To assist in this regard, the WOMPA system 4400 may also be configured with a detector 4407 and an optical element 4408 as a sort of feedback control to the controller 4409. For example, the deformable mirror 4404 may provide leakage that is focused by the optical element 4408 to the detector 4407 (e.g., a digital camera). The detector 4407 may detect the optical intensity of the leakage laser energy 4410 to determine the output intensity the WOMPA system 4404 as provided by the active mirror 4406 in a manner similar to that described above. Thus, if the optical energy being obtained is less than desired, the controller 4409 may actuate the deformable mirror 4404 to change the beam spot size of the laser energy 4410 (e.g., by changing the focusing aspects of the deformable mirror 4404).

The WOMPA system 4400 may be configured in a variety ways as a matter of design choice. For example, the WOMPA system 4400 may be configured with a mount (not shown) that is operable to assist in cooling the active mirror 4406. In this regard, the mount may include liquid cooling mechanisms and/or passive cooling mechanisms, such as heat spreaders. An example of a cooling technique shown and described below in the section entitled "Components Operable with a Multi-Pass Amplifier". Additionally, although shown and described with respect to a particular number of beam spots on the parabolic mirrors 4401 and 4402, the invention is not intended to be so limited. As mentioned, the controller 4409 may be operable to change the direction and/or beam spot size of the laser energy 4410 within the WOMPA system 4400.

Figure 37:
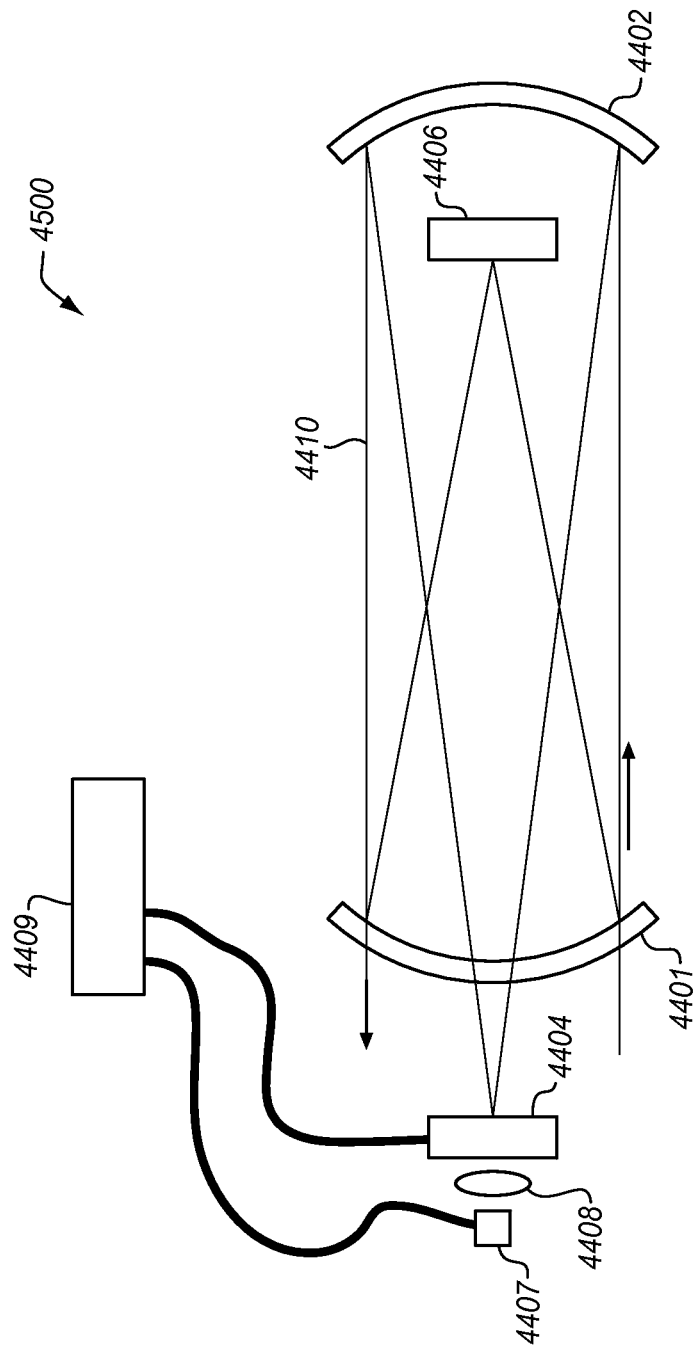

FIG. 37 illustrates another axial WOMPA architecture in the WOMPA system 4500. While this embodiment does not use a redirector as was shown in FIG. 36, it is similar to the embodiments shown in FIGS. 4 and 35. However, the reflective elements 4404 and 4406 are positioned away from the center line between the parabolic reflectors 4401 and 4402. This configuration requires a relatively strong focus on at least one of the reflectors 4404 and 4406. In this embodiment, the reflector 4404, may be deformable mirror. The reflector 4404 may be configured outside the region between the parabolic mirrors 4401 and 4402. The reflector 4406 may be an active mirror, including a gain medium. The reflector 4404 may be configured within the region between the parabolic mirrors 4401 and 4402. More fundamentally, the reflectors 4404 and 4406 are positioned to allow passage of laser energy 4410 without impediment. The reflector 4406 is positioned at the focal point of the parabolic mirror 4401. The reflector 4404 is positioned at the focal point of parabolic mirror 4402.

The reflector 4404 is operable to change the number of round trips through tilt variation. If the reflector 4404 is a deformable mirror, it is additionally operable to compensate for any phase deformations and/or distortions induced on the laser energy 4410 by the reflector 4406. Since the deformable mirror is at the conjugate image plane of the reflector 4406, the deformable mirror 4404 may correct phase distortions from reflector 4406 by inducing the precise opposite distortion on the laser energy 4410. By using a different focal length for the parabola 4401 and 4402, the size of the image spot from laser energy 4410 may be magnified on the reflector 4404, relative to the reflector 4406. More particularly, the deformable mirror 4404 provides reimaging for the active mirror 4406 of the WOMPA system 4500. That is, the laser energy from the active mirror 4406 is reimaged onto the deformable mirror 4404. This allows for phase error from the active mirror 4406 to be more easily compensated by the deformable mirror 4404.

3. Gain Control of a Multi-Pass Amplifier

Figure 38:
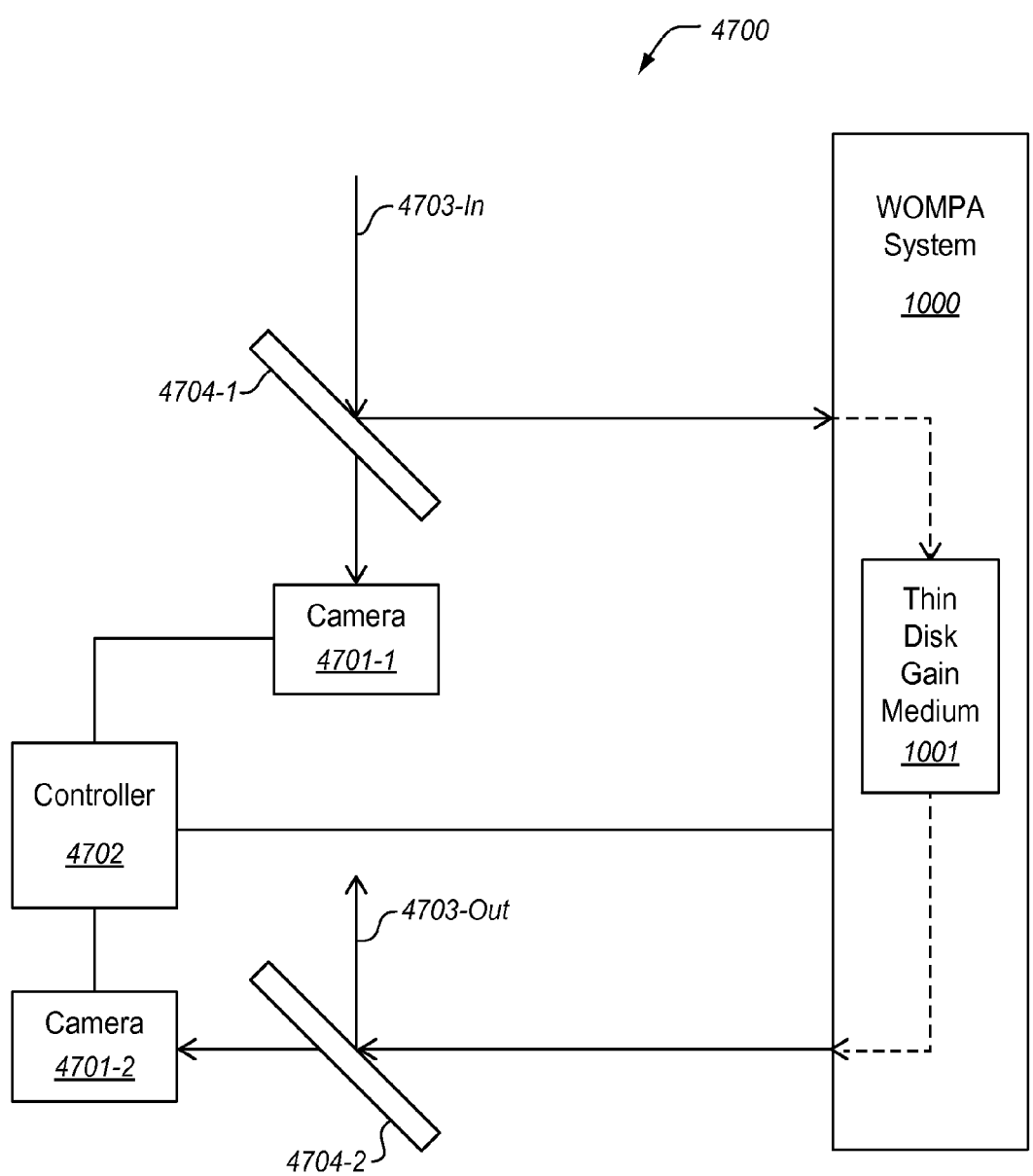
FIG. 38 is a block diagram illustrating exemplary gain detection and gain control of a WOMPA system.

As mentioned previously, the WOMPA system 1000 (or its variations such as the WOMPA system 1600) may be configured with a detector to assist in determining gain control. FIG. 38 illustrates one such optical configuration 4700. In this embodiment, the optical configuration 4700 has a pair of partially transmissive mirrors 4704-1 and 4704-2 that respectively direct the laser energy 4703 into and out of the WOMPA system 1000. More specifically, the laser energy 4703 enters the optical configuration 4700 and reflects off the mirror 4704-1 into the WOMPA system 1000 for multi-pass amplification via the thin disk gain medium 1001. The amplified laser energy 4703 exits the WOMPA system 1000 and the as the optical configuration 4700 via the mirror 4704-2.

A portion of the input laser energy 4703-In passes through the mirror 4704-1 and is detected by the camera 4701-1. The camera 4701-1 generates a digital image of the captured laser energy and transfers that image to the controller 4702 for processing. Similarly, a portion of the output laser energy 4703-Out passes through the mirror 4704-2 and is detected by the camera 4701-2 which also generates a digital image of the captured laser energy for transfer to the controller 4702.

With this configuration, a number of system parameters can be determined. For example, by comparing the digitally captured output laser energy to the digitally captured input laser energy, gain parameters relating to thin disk gain medium 1001 may be used to diagnose the effectiveness of the gain medium and/or control the number of passes through the thin disk gain medium 1001 as generally discussed above. In this regard, a comparison of the output power to the input power of the laser energy 4703 can be written as follows:

$$\frac{P_{OUT(x)}}{P_{IN(x)}} = e^{-2a(x)nd} \qquad 8)$$

where $P_{OUT}(x)$ is the output power of the laser energy 4703, $P_{IN}(x)$ is the input power of the laser energy 4703, $\alpha(x)$ is the absorption constant of the gain medium 1001, n is the number of passes of the laser energy 4703 through the thin disk gain medium 1001 while within the WOMPA system 1000, and d is the thickness of the thin disk gain medium 1001. To compute the absorption constant of the thin disk gain medium 1001, the input intensity of the laser energy 4703-In detected by the camera 4701-1 may be compared to the output intensity of the laser energy 4703-Out detected by the camera 4701-2 as follows:

$$\frac{\ln\left(\frac{I_{OUT}(x)}{I_{IN}(x)}\right)}{2\,nd} = a(x) \qquad 9)$$

where the absorption constant is the natural log is performed on the output intensity of the laser energy 4703 $I_{OUT}(x)$ divided by the input intensity of the laser energy $I_{IN}(x)$ and then divided by two times the number of passes n and the thickness d. Thus, if a different absorption coefficient of the thin disk gain medium 1001 is desired, the thickness of the gain medium 1001 may be changed or else material of the gain medium 1001 be replaced in its entirety. Similarly, the number of passes through the gain medium 1001 may be used to change the gain of the thin disk gain medium 1001. For example, if additional gain in the output laser energy 4703-Out is desired, the controller 4702 may dynamically compute the input and output laser energies so as to determine the absorption constant $\alpha(x)$ of the gain medium 1001. From there, the controller 4702 may generate a control signal to increase the number of passes n that the input laser energy 4703-In makes through the thin disk gain medium 1001. This control signal may be applied to an actuator (e.g., an electro-mechanical device) that is used to control the tilt of one or more of the reflective elements within the WOMPA system 1000 (e.g., the reflective element 1002 and/or the reflective element 1001 associated with the thin disk gain medium 1001). Thus, to increase the gain of the output laser energy 4703-Out, the controller 4702 may apply control signal that tilts the reflective element(s) in such a way as to increase the number of passes of the laser energy 4703-In through the WOMPA system 1000 as described above. Similarly, if less gain is desired in the output laser energy 4703-Out, the controller 4702 may tilt the reflective element(s) of the WOMPA system 1000 in the opposite way so as to decrease the number of passes of the laser energy 4703-In through the WOMPA system 1000. It should also be noted that the controller 4702 may tilt the reflective element(s) of the WOMPA system 1000 to stabilize the output "aiming" of the output laser energy 4703. Additionally, the controller 4702 may be configured to adjust other optical elements (e.g., an electro-optic modulator) to reduce variations in output pulse energy. Additionally, the controller 4702 may be configured to control a mirror actuator so as to adjust the round trip cavity length of a WOMPA system 1000 configured as or within an oscillator. Adjustments in the cavity length may be used to synchronize the output repetition rate of a mode-locked optical configuration to an externally controlled frequency.

The cameras 4701-1 and 4701-2 may also be used to detect the relative size of the input beam and output beam. In most configurations, the distances between the parabolic or OAP reflectors may be optimized to ensure that the input and output beam have the same size. Thus, the feedback from the cameras 4701-1 and 4701-2 may be used to drive an electronically controlled translation stage to adjust the distance between the OAP and/or the parabolic reflectors in any of the aforementioned WOMPA systems.

The cameras 4701-2 may also be configured as wavefront sensors (e.g. Shack-Hartmann wavefront sensors) and the controller 4702 may control a deformable mirror within the WOMPA system 1000. In this case, the controller 4702 may be used to select a phase deformation on a deformable mirror so as to optimize the phase distortions observed by the camera 4701-2. As mentioned previously, one of the reflective elements in a WOMPA system may be a deformable mirror to correct phase distortions imposed at any of the other reflective elements that are at a conjugate image plane. Additionally, a deformable mirror may be placed at a conjugate image plane to one of the reflectors, upstream from the to the entire WOMPA system. This allows a direct spatial correspondence of phase error imparted on a reflector, and phase correction imposed at the deformable mirror.

The camera 4701-1 may be placed at a position that is an upstream conjugate image plane to the disk, so that an image profile of the beam as observed by the disk on the first bounce can be detected. Likewise, the camera 4701-2 may be placed at a position that is a downstream conjugate image plane to the disk, so that an image that corresponds to the beam as observed at the last bounce from the disk can be observed.

It should be noted that multiple embodiments have been disclosed in which single parabolic or focusing elements are used to redirect multiple spatially separated optical beam paths. It should be understood that these optical elements used in the WOMPA systems may be cut or implemented as multiple independent optics, though described herein as single elements. For example parabolic reflectors may be implemented as multiple parabolic and/or off-axis parabolic reflectors whose surfaces conform to a single parabolic optical surface described herein.

4. Components Operable with a Multi-Pass Amplifier

The dramatically high gain capabilities of the WOMPA systems herein present many advantages. For example, an optical communication system may employ a WOMPA system to amplify an optical communication signal external to the generation thereof so as to prevent damage to certain optical components within the optical communication system and/or conserve power. Such an implementation may be particularly advantageous in certain space-based platforms (e.g., satellites) where long-distance optical communications may be desired yet where power management is a constant concern.

As the advantages of the WOMPA systems are many, certain additional components may be useful in controlling the amplified optical energy from the WOMPA systems. For example, the WOMPA systems described above may impart a gain on a signal beam that is so intense that it may damage optics that are downstream from the WOMPA systems. The gain imparted on a signal beam may also increase the likelihood of ASE. In this regard, the components and systems presented herein may increase the advantages and benefits of the WOMPA systems so as to make the gain imparted by the WOMPA systems more manageable.

In one embodiment, one or more Chirped Volume Bragg Gratings CVBG's may provide a means for temporarily decreasing the intensity of optical energy through pulse stretching and compression. When using the above described WOMPA systems to amplify laser pulses, Chirped Volume Bragg Gratings (CVBG's) may be used for stretching and compressing laser pulses. For very high peak power applications, pulse compression is typically performed with a pair of reflective gratings whereas stretching may be performed with a matched diffraction grating. Diffraction grating-based dispersion management is effective but generally requires large optical components and long optical paths. Accordingly, advantages occur when stretching and compression functions are performed with more compact devices, such as chirped volume Bragg gratings. Recent experimental results suggest that pulse energies up to 10 mJ may be compressed using a CVBG without damage.

Figure 39:
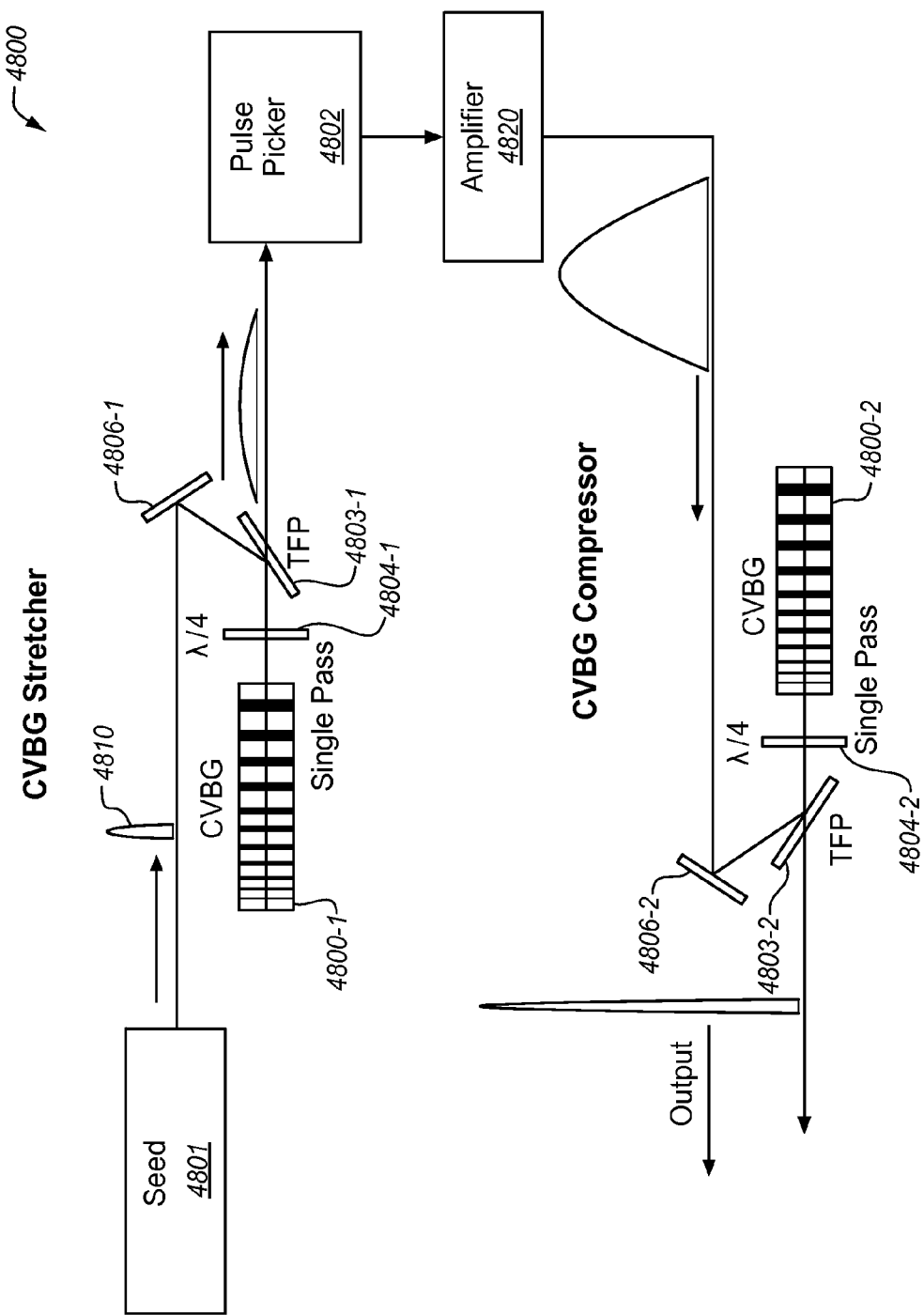
FIG. 39 is a block diagram of an exemplary CVBG-based architecture for stretching and compressing laser pulses.

FIG. 39 illustrates a block diagram of one exemplary CVBG-based system 4800 or performing laser pulse stretching and compression. In this embodiment, relatively low energy ultrashort pulses may be stretched by providing a wavelength dependent delay across the pulse spectrum using a CVBG 4800-1. Such generally reduces the peak intensity of a laser pulse without decreasing the total energy of the laser pulse. A WOMPA system 4820, such as those described above, may then be used to obtain relatively high pulse intensities. After amplification, a compensating wavelength-dependent delay may be introduced by way of a pulse compressor in the form of CVBG 4800-2, so that the total delay includes negligible wavelength dependence across the pulse bandwidth of the pulse.

The CVBG 4800-1 may be implemented between a mode-locked seed system 4801 and a pulse picker 4802. A thin film polarizer 4803 may be used to direct the signal (i.e., laser pulse 4810) by way of the mirror 4806-1 into the CVBG 4800-1 at normal incidence after passing through a quarter-wave plate 4804-1. The diffracted beam laser pulses may then exit the CVBG 4800-1 and, after traveling through the quarter-wave plate 4804-1 a second time, transmit through the thin film polarizer 4803. The stretched pulses may then pass through the pulse picker 4802 that is used to select pulses at a user defined repetition rate or at a desired modulation pattern. The pulses are then amplified with a WOMPA system 4830. After amplification, the pulses enter and exit the CVBG 4800-2 in the same manner as 4800-1 to compress the laser pulses and reverse the CVBG 4800-1 influence. It should be noted that, although shown separately, the CVBG 4800-1 may also be used as the CVBG 4800-2 so that only one CVBG is needed.

Figure 40:
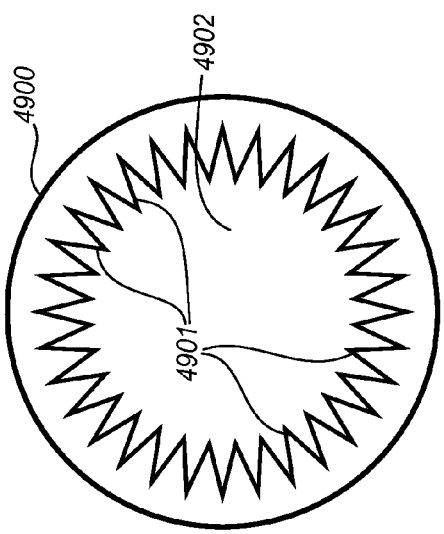
FIGS. 40-41 illustrate an exemplary serrated aperture for use in a WOMPA system.
Figure 41:
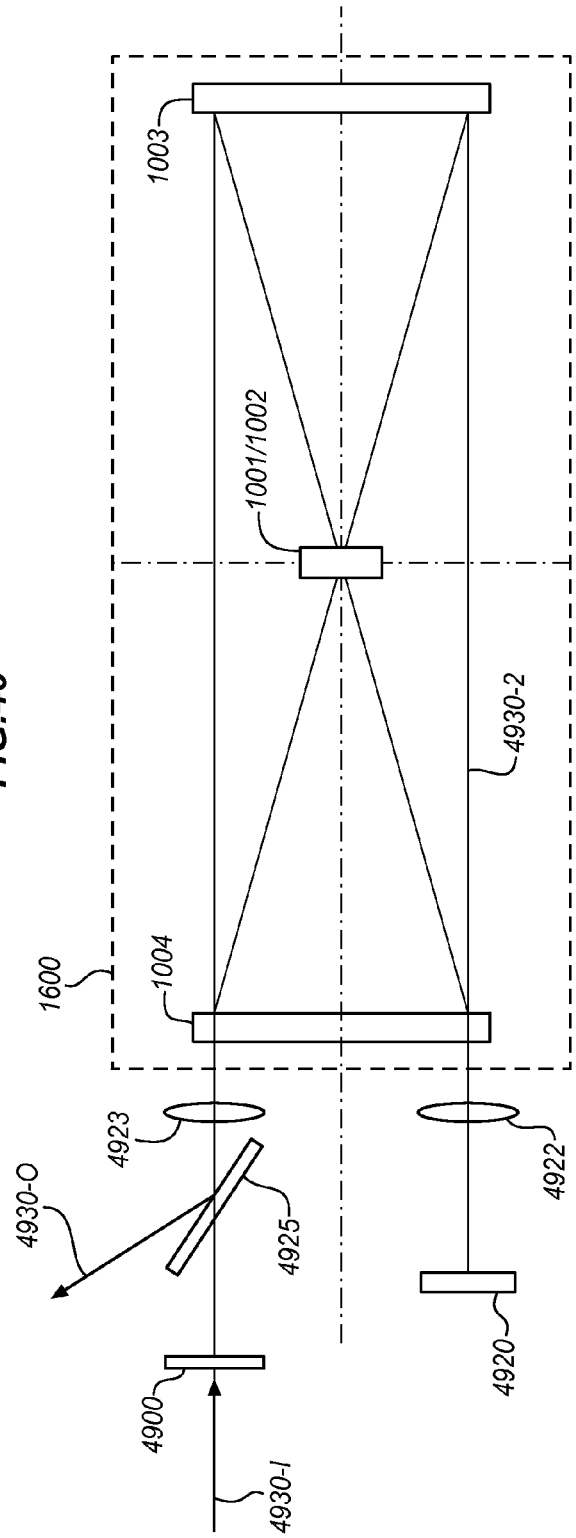

FIGS. 40 and 41 illustrate the use of an optical aperture 4900 in a WOMPA system 1600 so as to keep the input beam 4930-I free from a higher order distortion region around the rim of the pump beam spot on the thin disk gain medium 1001. More specifically, FIG. 40 illustrates the optical element 4900 where a plurality of teeth 4901 about an aperture 4902. Generally, the optical element 4900 may be a simple aperture without teeth, or may be a serrated aperture having teeth. A slight advantage of the serrated aperture is suppression of diffraction rings. However, if the diffraction rings fall outside of the pump spot on the gain medium 1001, then they are generally absorbed and do not affect the output beam. The aperture may reduce the formation of "hot spots" on the OAPs 1003 and 1004. The aperture 4901 assists in this regard if there are angular or spatial fluctuations of the input beam input beam 4930-I, which would otherwise result in fluctuations of the signal beam location on the thin disk gain medium 1001. As with some previous embodiments and again illustrated in FIG. 41, laser energy 4930 enters the WOMPA system 1600 along the path 4930-1, through the optical element 4900 and through a polarization beam splitter 4925 and a focusing lens 4923. Generally, the optical element 4900 is positioned so that it is imaged on to the reflective elements 1001/1002. After multiple passes through the WOMPA system 1600, the laser energy 4930 exits the WOMPA system 1600 along the path 4930-2. The laser energy 4930 passes through the lens 4922 for recollimation. The laser energy 4930 then reflects off the reflective element for another trip through the WOMPA system 1600 to ultimately exit as the amplified laser energy 4930-O.

Figure 42:
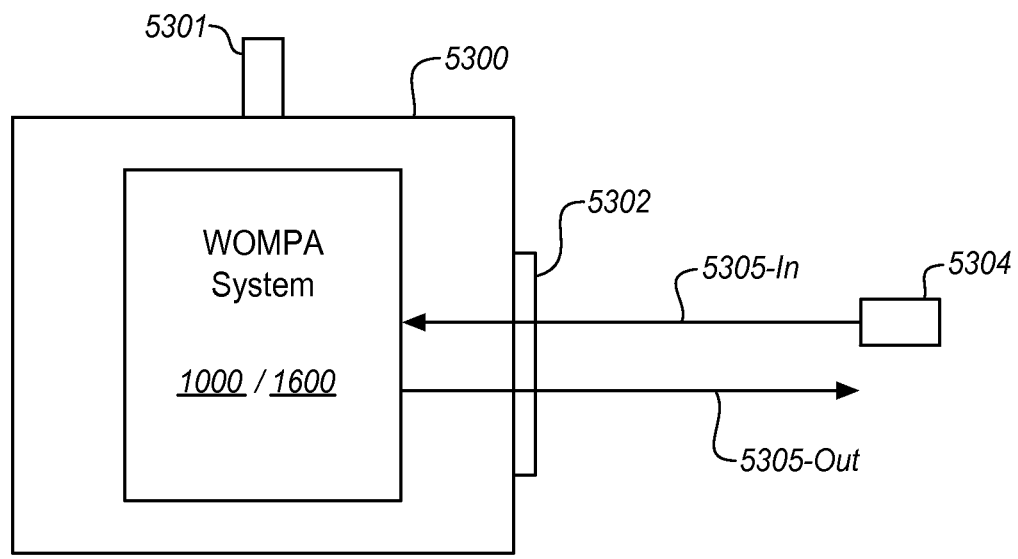
FIG. 42 is a block diagram of an exemplary chamber used in preventing optical breakdown within a WOMPA system.

FIG. 42 illustrates a WOMPA system 1000/1600 configured within a chamber 5300. The chamber 5300 may include a port 5301 that is operable to extract gas from the chamber 5300 to create a vacuum. Alternatively, the port 5301 may be operable to fill the chamber 5300 with a gas that is difficult to ionize. In either case, the chamber 5300 assists in preventing optical breakdown from occurring at the intermediate focal points between the OAPs. For example, as the WOMPA system 1000/1600 may be operable to substantially increase the gain of the laser energy 5305, the amplified laser energy may be intense enough to ionize the air and lead to absorption or distortion of the beam. Accordingly, by configuring the chamber 5300 as a vacuum or filling the chamber 5300 with a gas that is difficult to ionize, the potential for optical breakdown is reduced. Additionally, the use of a vacuum, partial vacuum, or well chosen gas can reduce other deleterious propagation effects (e.g. self-phase-modulation, nonlinear focusing, material dispersion through the air or gas).

In this embodiment, the chamber 5300 is also configured with an optical element 5302 that is operable to propagate the laser energy 5305 into the WOMPA system 1000/1600. For example, the optical element 5302 may be operable to propagate the laser energy 5305 to and from the WOMPA system 1000/1600 with little or no absorption/focus such that the optical element that 5302 has little effect on the laser energy 5305. Alternatively, the optical element 5302 may be operable to impart some focusing aspect on the laser energy 5305 as a matter of design choice. In any case, the chamber 5300 is operable to receive the laser energy 5305 from a source 5304 such that the WOMPA system 1000/1600 may impart gain on the input laser energy 5305. In this regard, the chamber 5300 may also be operable to transfer the amplified laser energy 5305 out of the chamber 5300 for use as desired.

It should be noted that the chamber 5300 may be operable to include fewer or more optical components than just the WOMPA system 1000/1600. Similarly, the chamber 5300 may be operable to retain any of the WOMPA systems disclosed herein. In this regard, the WOMPA system designation of 1000/1600 is merely intended to designate any of the various WOMPA systems, their combinations, and/or variations disclosed herein. Accordingly, the invention is not intended to be limited to merely the exemplary embodiments shown and described above.

Figure 43:
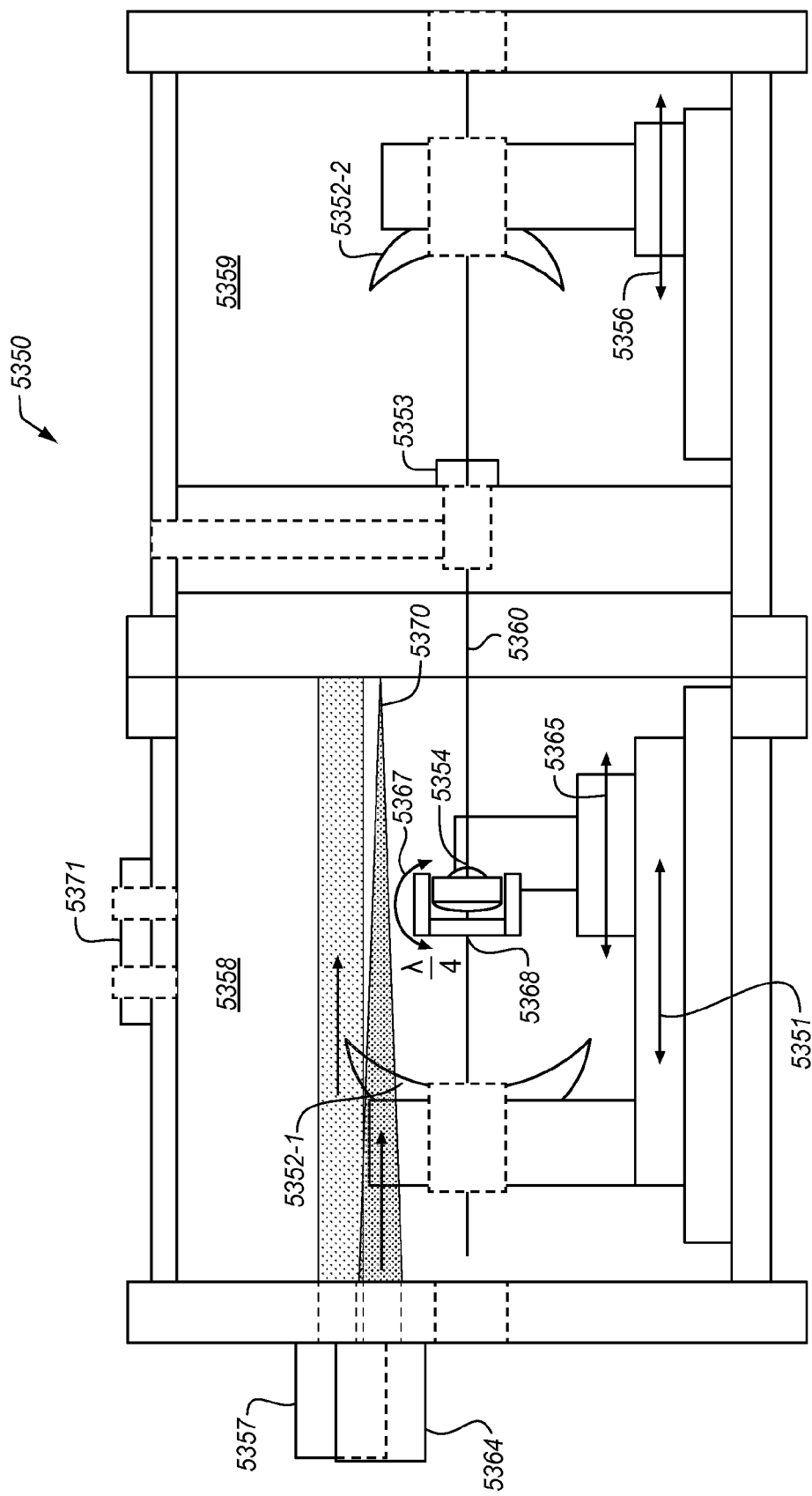
FIG. 43 illustrates another exemplary embodiment in which a WOMPA system is configured within a chamber.

FIG. 43 illustrates another exemplary embodiment in which a WOMPA system (e.g., as defined by the parabolic mirrors 5352-1 and 5352-2, the thin disk gain medium 5353, the reflective element 5354, and the ejection optics 5368) is configured within a chamber 5350. The chamber 5350 includes a port 5351 that is operable to extract gas from the chamber 5350 to create a vacuum or fill the chamber 5350 with a gas that is difficult to ionize, each of which being operable to prevent optical breakdown from occurring at the intermediate focal points between the parabolic mirrors 5352-1 and 5352-2. The chamber 5350 may be operable with either an axial WOMPA system or an off-axis WOMPA system. FIG. 43 also illustrates various components used within the chamber 5350 and their relative relationships. For example, the parabolic mirror 5352-1 may be movably mounted in a direction 5351. The parabolic mirror 5352-2 may be similarly mounted in a direction 5356. The reflective element 5354 may be movably mounted in a direction 5365 as well as the tilt direction 5367.

In this embodiment, the chamber 5350 includes two separable regions 5358 and 5359. The WOMPA system is operable to receive an input beam 5360 for multiple passes through the chamber 5350. That is, the beam 5360 makes multiple passes through the gain medium 5353 due to the positioning and the shape of the parabolic mirrors 5352-1/5352-2, the reflective element 5354, and the reflective element of the gain medium 5853 as described above. The WOMPA system ejects the gain increased beam 5360 from the chamber 5350 via the ejection optics 5368 (e.g., a quarter wave plate or other means for ejecting the beam as described above).

Input pump and signal lenses 5357 and 5367, respectively, are shown along with the entrance beam path 5360 for the pump and signal beams. The output lens for the signal beam is obscured in this view. As the pump power is increased the disk gain medium 5353 focus changes and the spacing between the two regions 5358 and 5359 generally require adjustment. This alignment includes the following steps:

1. Separate the regions 5358 and 5359.
2. The reflective element 5354 is tilted along 5367 and moved along direction 5365 so that the reflective surface is at the focus of parabolic mirror 5352-1 (additional adjustments can be made for the overall centering and a common or parallel optical axis).
3. The parabolic mirror 5352-2 is moved along the direction 5356 so that the thin disk gain medium 5353 is at the focal point of the parabolic mirror 5352-2.
4. The pump lens 5357 is adjusted so that the pump beam is aligned and prepared for imaging on the thin disk gain medium 5353.
5. The signal lens 5364 is then adjusted so that the signal focuses at the correct location (i.e., at the location 5370, the interface to region 5359).
6. The chamber 5350 is then assembled by configuring regions 5358 and 5359 proximate to one another such that a vacuum can be provided (or non ionizing gas) via the port 5361.
7. The ejection optics 5368 are tilted to adjust for multipass output.
8. The parabolic mirror 5352-1 and the reflective element 5354 may then be moved along the direction 5351 to adjust for appropriate output magnification.
9. The pump power of the pump beam may then be moderately increased and the steps 7-9 may be repeated as needed.
10. The power of the input signal beam may then be moderately increased and the steps 7-10 may be repeated as needed.

Figure 44B:
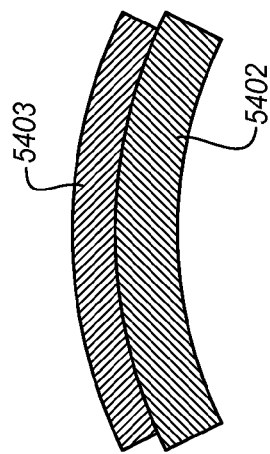
FIGS. 44A and 44B illustrate an exemplary cooling technique of an active mirror of a WOMPA system.
Figure 44A:
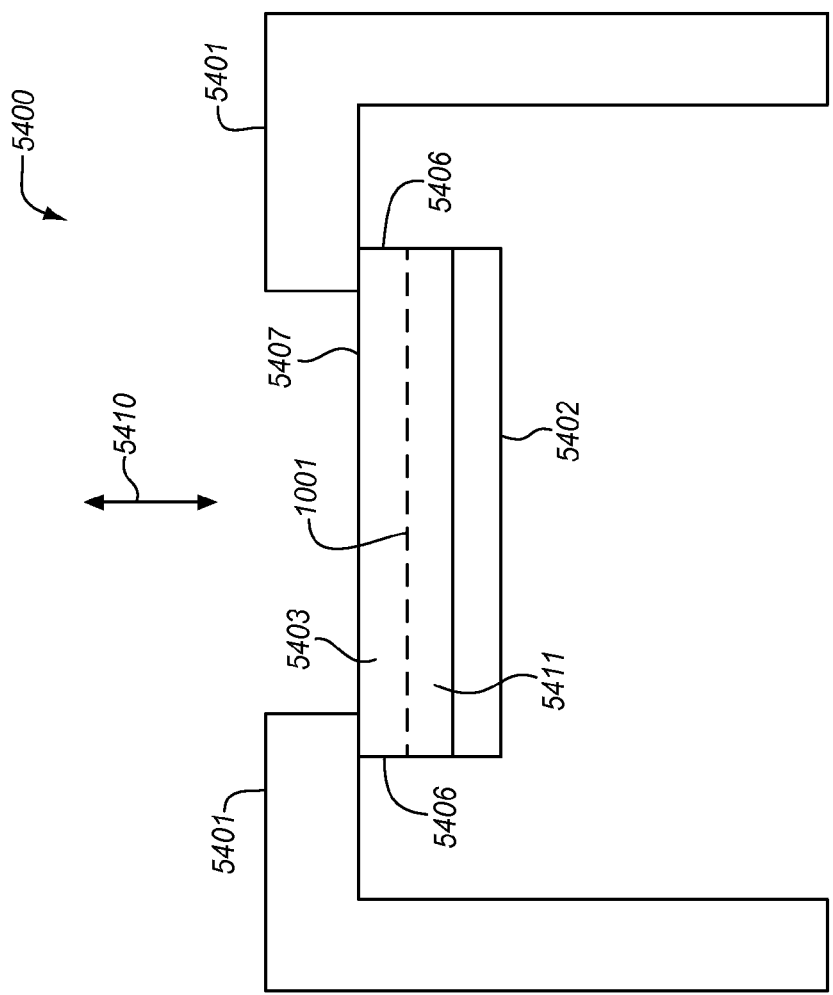

FIGS. 44A and 44B illustrate a mounting mechanism 5400 for retaining an active mirror 1001. For example, the reflective element 1001 (e.g., an active mirror) may be a highly reflective mirror configured with a relatively thin gain material 5403 adjacent to a highly reflective material 5411 so as to reflect laser energy 5410 while imparting gain on the laser energy 5410. In this regard, the thin gain material 5403 may be pumped with pump optical energy such that the laser energy 5410 (e.g., a signal beam) may extract the gain from the gain material 5403. As mentioned, a thin disk gain medium is particularly useful in implementing the above WOMPA systems. However, due to the substantially thin physical configuration of the gain material 5403, the thin disk gain medium has the potential for imparting optical distortion on the exiting laser energy 5410 due to the thermo mechanical distortion of the gain material 5403 from the absorption of the entering laser energy 5410. To compensate for such, the mounting mechanism rigidly retains the reflective element 1001 at the outer edges and disperses heat with a heat spreader 5402. The heat spreader may be designed to effectively spread heat due to a large thermal conductivity or through other effective thermal transport means (material flow, convection, etc.). The reflective element 1001 may be designed to provide a negative curvature when the heat spreader 5402 is cooled and the upper gain material 5403 is relatively hotter. This thermal distribution may provide a greater expansion within the gain material 5403 than the heat spreader 5402 and lead to a negative curvature, as illustrated FIG. 44B.

This embodiment also has the advantage of allowing the gain material 5403 to be edged pumped at the sides 5406 of the reflective element 1001 and/or through the surface that 5407 of the gain material 5403. Accordingly, the reflective elements 1001/1002 of the various WOMPA systems disclosed herein may be operable to edge pump and/or surface pump the gain material 5403. In this regard, the gain material 5403 may be pumped with multiple forms of optical energy. For example, the gain material 5403 may be pumped with a variety of diode sources to provide redundancy and/or scalable power as described above.

It should be also noted that the various WOMPA architectures may include multiple such reflective gain mediums but that the gain materials 5403 need not be necessarily the same. For example, in an embodiment where the reflective elements 1001 and 1002 are configured with gain materials, each reflective element 1001 may include a different gain material so as to provide a broader effective gain spectrum. One specific embodiment may have the reflective element 1001 of the WOMPA system configured with a gain material Yb:YAG while the reflective element 1002 has a gain medium of Yb is configured with a different host material to slightly shift the gain spectrum. Such a WOMPA system may be operated at cryo temperature to provide a narrowing of the gain bandwidth of the Yb:YAG alone and may be compensated by the composite gain bandwidth of the two separate crystals. However, the invention is not intended to be limited to any particular type of gain material 5403 being configured with the reflective elements 1001/1002 as the gain materials may be selected as a matter of design choice. Ytterbium doped materials are generally a good design choice, although Erbium, Chromium, Thulium, Holmium may be good dopant choices for other wavelengths. The host crystal may be YAG, but there are many other suitable crystal hosts, including KYW, and $Lu_2O_3$.

Figure 45:
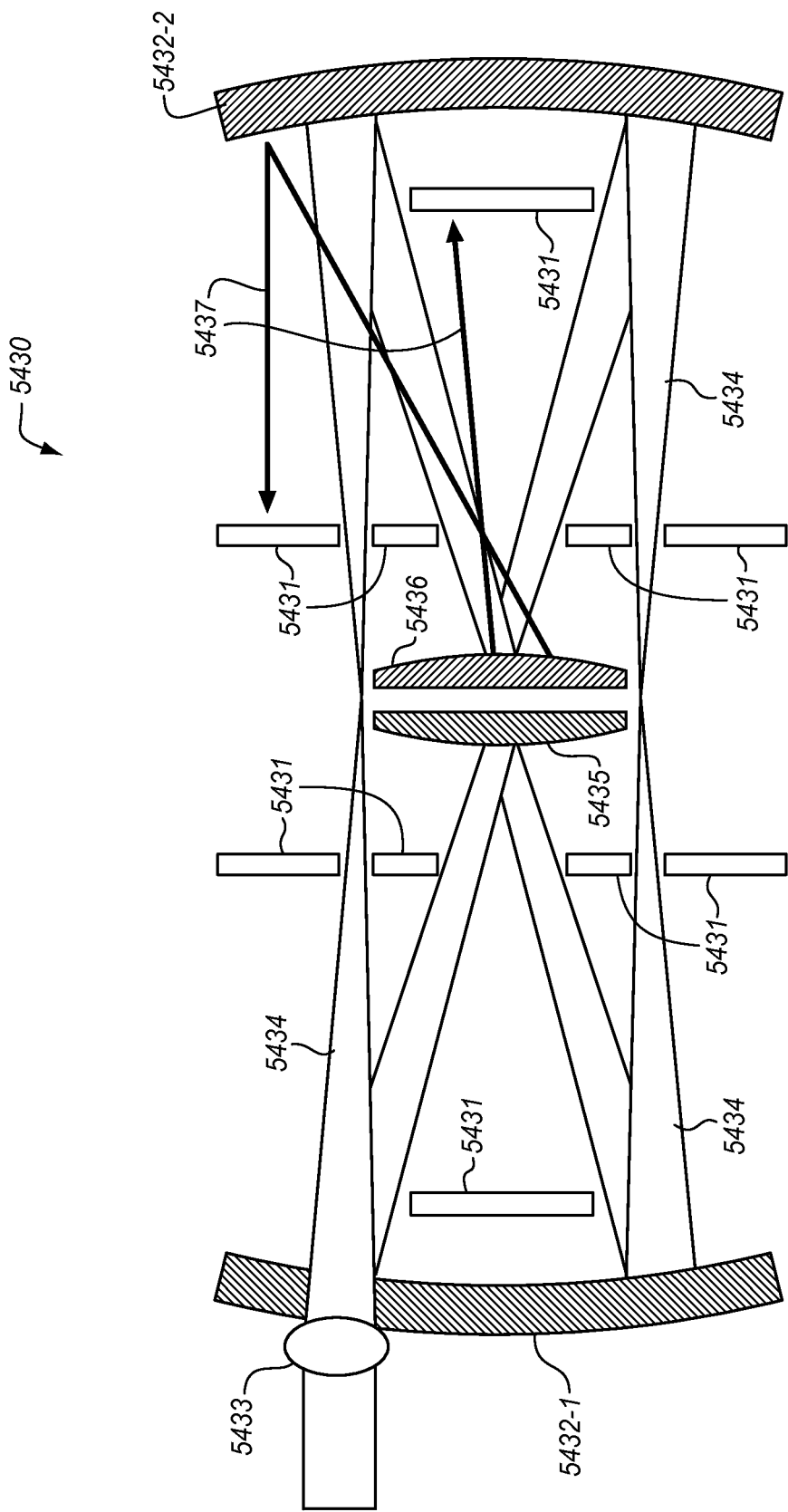
FIG. 45 illustrates a WOMPA system employing a plurality of baffles.

FIG. 45 illustrates a WOMPA system 5430 employing a plurality of baffles 5431 at various locations within the region between the parabolic mirrors 5432-1 and 5432-2. The baffles 5431 are generally configured from an opaque material so as to absorb fluorescence 5437 within the WOMPA system 5430. For example, if the thin disk gain medium 5436 (i.e., configured with a reflective element as described above) fluoresces due to the lack of a signal beam, the fluorescence 5437 may oscillate and reflect virtually everywhere within the WOMPA system 5430, potentially and undesirably extracting energy from the thin disk gain medium 5436. The baffles 5434 may prohibit unwanted fluorescence 5437 from being imaged back onto the thin disk gain medium 5436 and extracting energy that could otherwise be used to provide gain to the signal beam.

The baffles 5431 may be positioned at locations within the WOMPA system 5430 so as to allow the laser energy 5434 to propagate through the WOMPA system 5430 as desired. For example, the laser energy 5434 may enter the WOMPA system 5430 through the lens 5433 and reflect off the parabolic mirror 5432-2 to the thin disk gain medium 5436. The laser energy 5434 may then reflect to the parabolic mirror 5432-2 for reflection to the parabolic mirror 5432-1. The laser energy 5434 then reflects to the reflective element 5435, back to the parabolic mirror 5432-1 and returning to the parabolic mirror 5432-2 for a complete trip to the WOMPA system 5430, as similarly described above, unimpeded by the baffles 5431. These baffles 5431 may be implemented in any of the WOMPA systems shown are described herein. In this regard, the WOMPA system 5430 may be an axial WOMPA system (i.e., a top view) or an OAP based WOMPA system (i.e., a side view).

Figure 46:
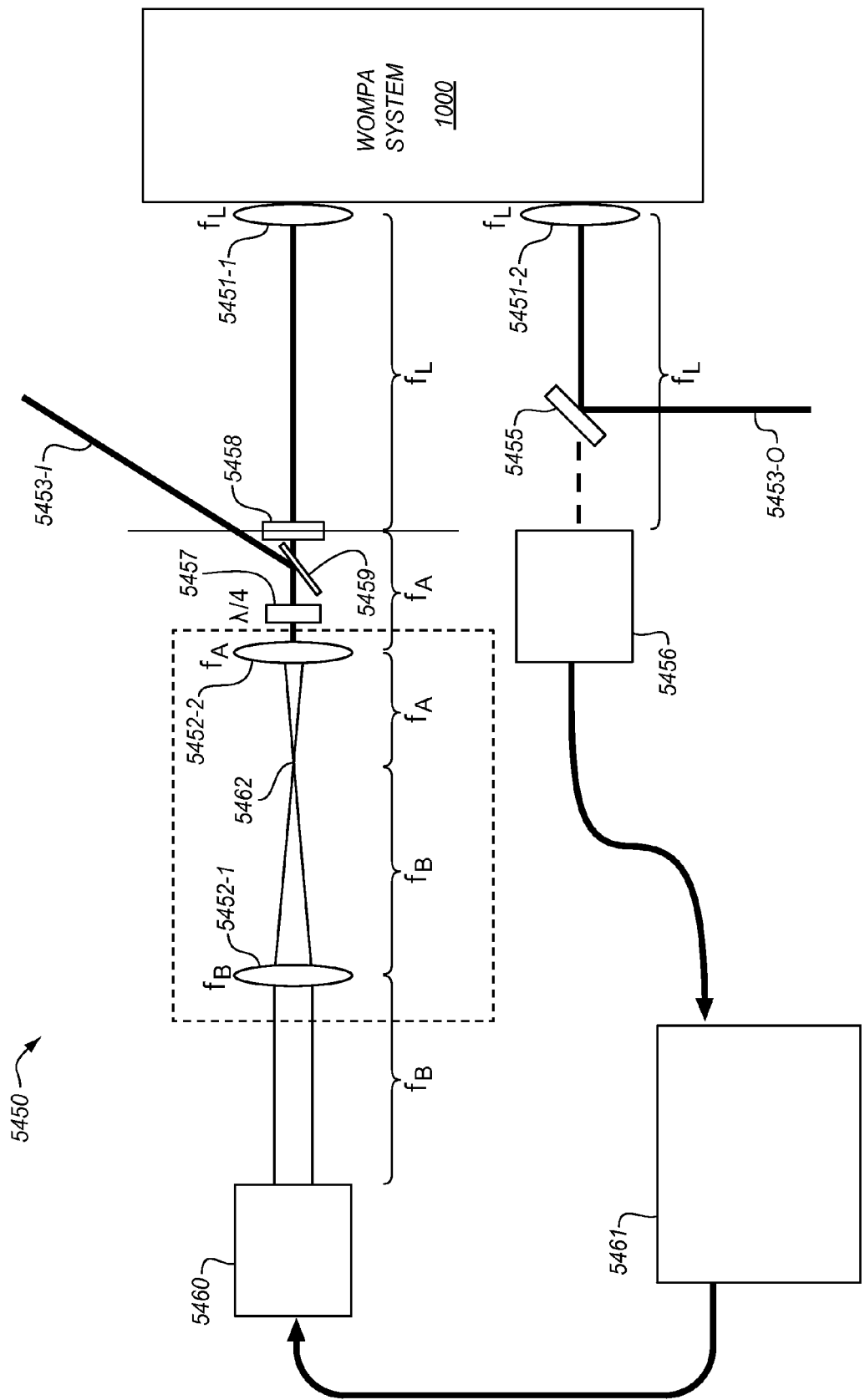
FIG. 46 illustrates an exemplary optical configuration having "closed-loop" control of a deformable mirror for use with a WOMPA system.

FIG. 46 illustrates an exemplary optical configuration 5450 having "closed-loop" control of a deformable mirror 5460 for use with a WOMPA system 1000. For example, the controller 5461 may adjust the deformable mirror 5460 to reduce or minimize wavefront distortion of the laser energy 5453 detected by a wavefront sensor 5456 as the laser energy 5453 exits from the WOMPA system 1000. In this embodiment, the optical configuration 5450 is also configured with a pair of focusing elements 5452-1 and 5452-2 (e.g., lenses), a quarter wave polarizer 5457, a beam splitter 5459, an aperture 5458, another pair of focusing elements 5451-1 and 5451-2, and a partially reflective mirror 5455. The laser energy 5453 enters the optical configuration 5450 along the beam 5453-I where it reflects off the beam splitter 5459 through the quarter wave polarizer 5457 and the focusing elements 5452-1 and 5452-2.

The focusing elements 5452-1 and 5452-2 form a beam expander that provides for less sensitive control of wavefront distortion. For example, with the beam of laser energy 5453 expanded, subtler correction of the wavefront may be imparted on the laser energy via the deformable mirror 5460. That is, it is more difficult to alter the wavefront of the laser energy 5453 when the beam encompasses a smaller area. In this regard, the beam expander may provide more design options as well as increase damage power thresholds to the deformable mirror 5460. For example, a larger beam of laser energy 5453 is less likely to damage the deformable mirror 5460 than a more tightly focused beam of laser energy 5453.

The focusing element 5452-2 has a focal length of $f_A$ such that the laser energy 5453 has an intermediate focus at the point 5462. This focal length $f_A$ is also the same distance between the focusing element 5452-2 and the aperture 5458 such that the aperture is imaged onto the thin disk gain medium of the WOMPA system 1000 upstream from the WOMPA system 1000. The focusing element 5452-1 has a focal length of $f_B$ from the intermediate focus 5462. In this regard, the deformable mirror 5460 is positioned at the same focal distance $f_B$ from the focusing element 5452-1. The laser energy 5453 reflects off the deformable mirror 5460, through the focusing elements 5452-1 and 5452-2 and the quarter wave polarizer 5457 such that the laser energy 5453 passes through the aperture 5458 to enter the WOMPA system 1000 through the focusing element 5451-1. The WOMPA system 1000 then imparts gain on the laser energy 5453, as described above, and exits the WOMPA system through the focusing element 5451-2 and a partially reflective mirror 5455 along the output beam path 5453-O.

A portion of the laser energy 5453 passes through the partially reflective mirror 5455 to the wavefront sensor 5456, which in turn detects any wavefront distortions imparted on the laser energy 5453 by the WOMPA system 1000. For example, due to the multiple passes through the WOMPA system 1000 and the various reflective elements therein, the laser energy 5453 may experience wavefront distortions. The wavefront sensor 5456 may detect these distortions such that they meet the handled/corrected outside the WOMPA system 1000. In this regard, the controller 5461 may compute an appropriate correction based on the detected wavefront of the laser energy 5453 passing through the partially reflective mirror 5455 and generate a control signal that is used to actuate (i.e., change the shape of) the deformable mirror 5460.

In this exemplary configuration 5450, the upstream image plane is imaged onto the gain medium by the WOMPA system 1000 and the input lens 5451-1. In this regard, the deformable mirror 5460 is imaged upstream from the WOMPA system 1000. Additionally, the optical configuration 5450 positions the aperture 5458 upstream from the WOMPA system 1000 such that the aperture 5458 is also imaged on the thin disk gain medium of the WOMPA system 1000, providing a virtual aperture on the thin disk gain medium. The advantages of such include reducing the risk of damage due to undesirable trajectories of the beam. Less than desirable forms of optical energy may propagate near the beam of the laser energy 5453. These undesirable forms of optical energy may produce "hotspots" on the reflective elements within the WOMPA system 1000 (or other elements downstream) due to the increasing gain imparted on the laser energy 5453 by the multiple passes through the thin disk gain medium. By placing the aperture 5458 upstream from the WOMPA system 1000, the aperture is virtually imaged on the thin disk gain medium and thereby removes these undesirable components of optical energy before they impinge downstream optics.

5. Exemplary Systems Employing Multi-Pass Amplifiers

Figure 47:
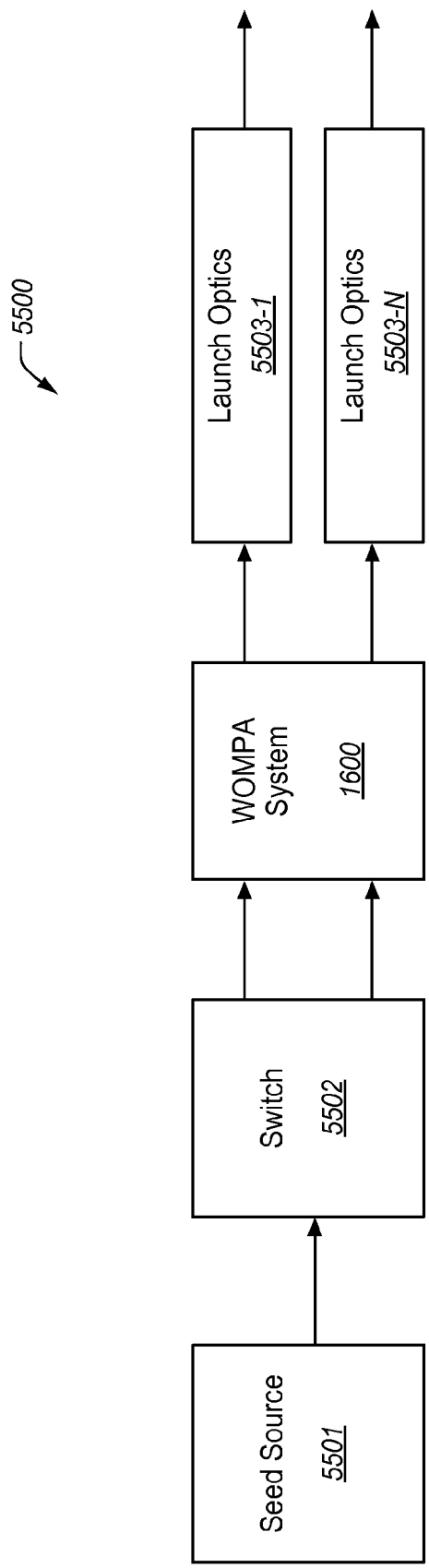
FIGS. 47 and 48 are block diagrams of exemplary systems employing a WOMPA system.

FIG. 47 is a block diagram of an exemplary use of the WOMPA system 1600. In this embodiment, a system 5500 may employ the WOMPA system 1600 such that multiple beam lines can be switched by an optical switch 5502 at relatively low power upstream from amplification by the WOMPA system 1600. For example, a seed source 5501 may provide a signal beam to the optical switch 5502 which demultiplexes the signal beam into various component beams. The optical switch 5502 may transfer the component beams to the WOMPA system 1600 for amplification. After amplification, the amplified component beams may be directed to separate launch optics 5503-1 ... N. In this regard, scanning operation of the launch optics 5503-1 ... N may be managed according to different spatial regions. Additionally, switching between separate launch optics 5503-1 ... N may be performed at lower power to allow for smaller and faster switching technologies.

Figure 48:
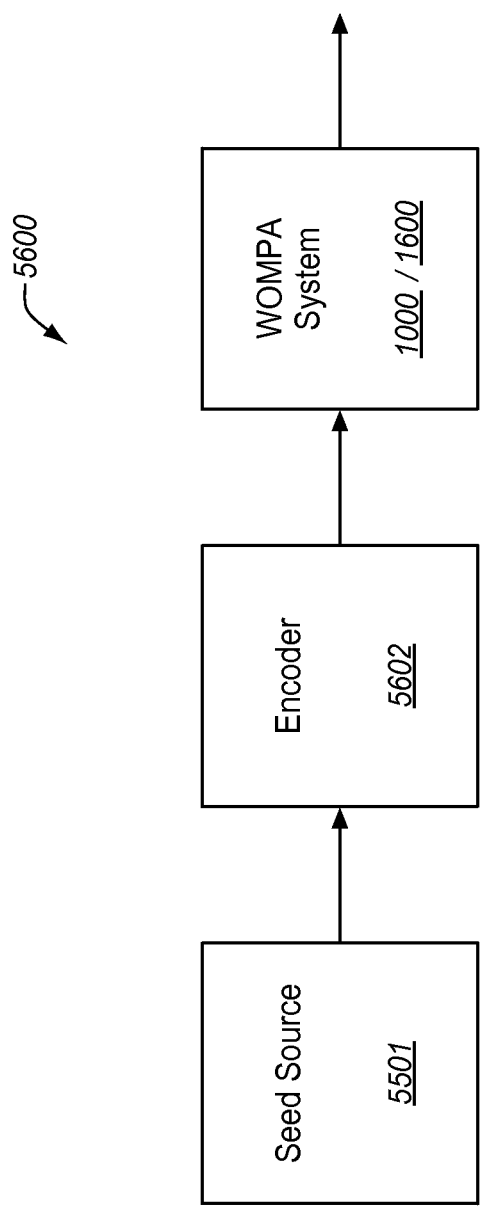

FIG. 48 is a block diagram of another exemplary system 5600 implying the WOMPA system 1000/1600. In this embodiment, the seed source 5501 provides a signal beam to an encoder 5602 for communication purposes. Because signals can be imparted on a signal beam by the encoder 5602 at relatively low power and then downstream amplified to high power, high power optical communications may be possible as damage to the encoder 5602 from a high power signal beam is avoided. Such may be particularly advantageous in long distance free space communications, including satellite communications and deep space missions.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

What is claimed is:

1. An optical system, including:
   a multipass optical amplifier including, a thin disk gain medium, a first reflective element optically coupled to the thin disk gain medium, a first parabolic reflector in optical communication with the thin disk gain medium and the first reflective element, a second parabolic reflector in optical communication with the first parabolic reflector, and a second reflective element in optical communication with the second parabolic reflector;
   a pump source operable to stimulate the this disk gain medium;
   a signal beam source to provide a signal beam of optical energy; and
   a chamber having first and second regions configured about the multipass optical amplifier and including a port that is operable to extract gas residing in the chamber,
   wherein the first region of the chamber includes the first parabolic reflector, the thin disk gain medium, and the first reflective element,
   wherein the second region of the chamber includes the second reflective element and the second parabolic reflector,
   wherein the second region of the chamber includes input and output optics,
   wherein the input optic is operable to receive the signal beam of optical energy and propagate the optical energy through the multipass optical amplifier to impinge the thin disk gain medium multiple times to impart gain on the signal beam before ejecting the optical energy through the output optic.

2. The optical system of claim 1, wherein the port is further operable to provide nitrogen into the chamber to suppress optical breakdown during operation of the optical system.

3. The optical system of claim 2, wherein the nitrogen has a gas pressure within the chamber between about 1 Torr and 760 Torr.

4. The optical system of claim 1, wherein the first and second parabolic mirrors each include an optical axis and wherein each optical axis is substantially parallel to the other.

* * * * *